(12) United States Patent
Van Os et al.

(10) Patent No.: US 11,516,537 B2
(45) Date of Patent: Nov. 29, 2022

(54) INTELLIGENT AUTOMATED ASSISTANT FOR TV USER INTERACTIONS

(71) Applicant: Apple Inc., Cupertino, CA (US)

(72) Inventors: Marcel Van Os, San Francisco, CA (US); Harry J. Saddler, Berkeley, CA (US); Lia T. Napolitano, San Francisco, CA (US); Jonathan H. Russell, Incline Village, CA (US); Patrick M. Lister, Cupertino, CA (US); Rohit Dasari, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/125,876

(22) Filed: Dec. 17, 2020

(65) Prior Publication Data

US 2021/0105528 A1    Apr. 8, 2021

Related U.S. Application Data

(63) Continuation of application No. 15/495,861, filed on Apr. 24, 2017, now Pat. No. 10,904,611, which is a
(Continued)

(51) Int. Cl.
*H04N 21/439* (2011.01)
*H04N 21/422* (2011.01)
(Continued)

(52) U.S. Cl.
CPC ......... *H04N 21/4394* (2013.01); *G06F 3/167* (2013.01); *G06F 16/73* (2019.01);
(Continued)

(58) Field of Classification Search
CPC ......... H04N 21/4394; H04N 21/42222; H04N 21/2541; H04N 21/25891; H04N 21/4316;
(Continued)

(56) References Cited

U.S. PATENT DOCUMENTS 7,603,684 B1  10/2009 Ellis
7,796,980 B1   9/2010 McKinney et al.
(Continued)

FOREIGN PATENT DOCUMENTS

AU   2014100581 B4   9/2014
AU   2015203483 A1   7/2015
(Continued)

OTHER PUBLICATIONS

AAAAPLAY, "Sony Media Remote for iOS and Android", Online available at: <https://www.youtube.com/watch?v=W8QoeQhlGok>, Feb. 4, 2012, 3 pages.
(Continued)

*Primary Examiner* — Anthony Bantamoi
(74) *Attorney, Agent, or Firm* — Dentons US LLP

(57) ABSTRACT

Systems and processes are disclosed for controlling television user interactions using a virtual assistant. In an example process, a virtual assistant can interact with a television set-top box to control content shown on a television display. Speech input for the virtual assistant can be received from a device with a microphone. The speech input can comprise a query associated with content shown on the television display. A user intent of the query can be determined based on one or more of the content shown on the television display and a viewing history of media content. A result of the query can be caused to be displayed based on the determined user intent.

51 Claims, 42 Drawing Sheets

Related U.S. Application Data continuation of application No. 15/085,465, filed on Mar. 30, 2016, now Pat. No. 9,668,024, which is a continuation of application No. 14/498,503, filed on Sep. 26, 2014, now Pat. No. 9,338,493.

(60) Provisional application No. 62/019,312, filed on Jun. 30, 2014.

(51) Int. Cl.
| | |
|---|---|
| *H04N 21/443* | (2011.01) |
| *H04N 21/482* | (2011.01) |
| *H04N 21/858* | (2011.01) |
| *H04N 21/488* | (2011.01) |
| *H04N 21/84* | (2011.01) |
| *G06F 16/73* | (2019.01) |
| *G06F 16/738* | (2019.01) |
| *G06F 16/78* | (2019.01) |
| *G10L 15/26* | (2006.01) |
| *H04N 21/41* | (2011.01) |
| *H04N 21/431* | (2011.01) |
| *G09C 1/00* | (2006.01) |
| *G10L 15/22* | (2006.01) |
| *G06F 3/16* | (2006.01) |
| *G10L 17/00* | (2013.01) |
| *G10L 17/22* | (2013.01) |
| *H04N 21/254* | (2011.01) |
| *H04N 21/258* | (2011.01) |
| *H04N 21/45* | (2011.01) |
| *H04N 21/4627* | (2011.01) |
| *G10L 15/18* | (2013.01) |
| *H04N 21/472* | (2011.01) |

(52) U.S. Cl.
CPC ........ *G06F 16/738* (2019.01); *G06F 16/7867* (2019.01); *G09C 1/00* (2013.01); *G10L 15/1815* (2013.01); *G10L 15/22* (2013.01); *G10L 15/26* (2013.01); *G10L 17/00* (2013.01); *G10L 17/22* (2013.01); *H04N 21/2541* (2013.01); *H04N 21/25891* (2013.01); *H04N 21/4122* (2013.01); *H04N 21/41265* (2020.08); *H04N 21/42203* (2013.01); *H04N 21/42222* (2013.01); *H04N 21/4312* (2013.01); *H04N 21/4316* (2013.01); *H04N 21/4438* (2013.01); *H04N 21/4532* (2013.01); *H04N 21/4627* (2013.01); *H04N 21/482* (2013.01); *H04N 21/4828* (2013.01); *H04N 21/4882* (2013.01); *H04N 21/84* (2013.01); *H04N 21/858* (2013.01); *G10L 2015/223* (2013.01); *H04N 21/47214* (2013.01)

(58) Field of Classification Search
CPC ........... H04N 21/4532; H04N 21/4627; H04N 21/482; H04N 21/4122; H04N 21/4312; H04N 21/42203; H04N 21/4126; H04N 21/4438; H04N 21/4828; H04N 21/858; H04N 21/4882; H04N 21/84; H04N 21/47214; G10L 17/00; G10L 15/1815; G10L 17/22; G10L 15/22; G10L 15/26; G10L 2015/223; G06F 3/167; G06F 16/73; G06F 16/738; G06F 16/7867; G09C 1/00

See application file for complete search history.

(56) References Cited

U.S. PATENT DOCUMENTS

| | | |
|---|---|---|
| 7,865,817 B2 | 1/2011 | Ryan et al. |
| 7,869,998 B1 | 1/2011 | Fabbrizio et al. |
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,523 B2 | 1/2011 | Potter et al. |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,329 B2 | 2/2011 | Wu et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,364 B2 | 3/2011 | Yacoub |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,933,399 B2 | 4/2011 | Knott et al. |
| 7,936,339 B2 | 5/2011 | Marggraff et al. |
| 7,936,861 B2 | 5/2011 | Knott et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,949,752 B2 | 5/2011 | White et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,176 B2 | 7/2011 | Latzina et al. |
| 7,987,244 B1 | 7/2011 | Lewis et al. |

(56) References Cited

U.S. PATENT DOCUMENTS

| | | |
|---|---|---|
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,001,125 B1 | 8/2011 | Magdalin et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,010,367 B2 | 8/2011 | Muschett et al. |
| 8,010,614 B1 | 8/2011 | Musat et al. |
| 8,014,308 B2 | 9/2011 | Gates, III et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,019,604 B2 | 9/2011 | Ma |
| 8,020,104 B2 | 9/2011 | Robarts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,032,409 B1 | 10/2011 | Mikurak |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,231 B2 | 10/2011 | Hirota et al. |
| 8,046,363 B2 | 10/2011 | Cha et al. |
| 8,046,374 B1 | 10/2011 | Bromwich |
| 8,050,500 B1 | 11/2011 | Batty et al. |
| 8,050,919 B2 | 11/2011 | Das |
| 8,054,180 B1 | 11/2011 | Scofield et al. |
| 8,055,296 B1 | 11/2011 | Persson et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |
| 8,078,473 B1 | 12/2011 | Gazdzinski |
| 8,078,978 B2 | 12/2011 | Perry et al. |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,103,947 B2 | 1/2012 | Lunt et al. |
| 8,107,401 B2 | 1/2012 | John et al. |
| 8,112,275 B2 | 2/2012 | Kennewick et al. |
| 8,112,280 B2 | 2/2012 | Lu |
| 8,117,026 B2 | 2/2012 | Lee et al. |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,368 B2 | 3/2012 | Eggenberger et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,170,966 B1 | 5/2012 | Musat et al. |
| 8,171,137 B1 | 5/2012 | Parks et al. |
| 8,175,872 B2 | 5/2012 | Kristjansson et al. |
| 8,175,876 B2 | 5/2012 | Bou-ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,194,827 B2 | 6/2012 | Jaiswal et al. |
| 8,195,460 B2 | 6/2012 | Degani et al. |
| 8,195,467 B2 | 6/2012 | Mozer et al. |
| 8,195,468 B2 | 6/2012 | Weider et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,555 B1 | 7/2012 | Mianji |
| 8,219,608 B2 | 7/2012 | alSafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,545 B2 | 8/2012 | Paek et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,117 B1 | 9/2012 | Xu et al. |
| 8,260,247 B2 | 9/2012 | Lazaridis et al. |
| 8,260,617 B2 | 9/2012 | Dhanakshirur et al. |
| 8,260,619 B1 | 9/2012 | Bansal et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,275,736 B2 | 9/2012 | Guo et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,285,737 B1 | 10/2012 | Lynn et al. |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |

(56) References Cited

U.S. PATENT DOCUMENTS

| | | |
|---|---|---|
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati |
| 8,326,627 B2 | 12/2012 | Kennewick et al. |
| 8,332,205 B2 | 12/2012 | Krishnan et al. |
| 8,332,218 B2 | 12/2012 | Cross, Jr. et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,346,757 B1 | 1/2013 | Lamping et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka et al. |
| 8,391,844 B2 | 3/2013 | Novick et al. |
| 8,396,714 B2 | 3/2013 | Rogers et al. |
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,473,289 B2 | 6/2013 | Jitkoff et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1* | 8/2013 | Lloyd .................... G10L 15/00 |
| 8,521,531 B1 | 8/2013 | Kim |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,577,683 B2 | 11/2013 | Dewitt |
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,161 B2 | 11/2013 | Kennewick et al. |
| 8,589,374 B2 | 11/2013 | Chaudhari |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B1 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |

(56) References Cited

U.S. PATENT DOCUMENTS

| | | |
|---|---|---|
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottier et al. |
| 8,868,111 B1 | 10/2014 | Kahn et al. |
| 8,868,409 B1 | 10/2014 | Mengibar et al. |
| 8,868,469 B2 | 10/2014 | Xu |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,964,947 B1 | 2/2015 | Noolu et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-jefri et al. |
| 9,043,208 B2 | 5/2015 | Koch et al. |
| 9,043,211 B2 | 5/2015 | Haiut et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,076,448 B2 | 7/2015 | Bennett et al. |
| 9,076,450 B1 | 7/2015 | Sadek et al. |
| 9,081,411 B2 | 7/2015 | Kains et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,183,845 B1 | 11/2015 | Gopalakrishnan et al. |
| 9,190,062 B2 | 11/2015 | Haughay |
| 9,208,153 B1 | 12/2015 | Zaveri et al. |
| 9,213,754 B1 | 12/2015 | Zhan et al. |
| 9,218,122 B2 | 12/2015 | Thoma et al. |
| 9,218,809 B2 | 12/2015 | Bellegard et al. |
| 9,218,819 B1 | 12/2015 | Stekkelpa et al. |
| 9,223,537 B2 | 12/2015 | Brown et al. |
| 9,236,047 B2 | 1/2016 | Rasmussen |
| 9,241,073 B1 | 1/2016 | Rensburg et al. |
| 9,251,713 B1 | 2/2016 | Giovanniello et al. |
| 9,255,812 B2 | 2/2016 | Maeoka et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,280,535 B2 | 3/2016 | Varma et al. |
| 9,282,211 B2 | 3/2016 | Osawa |
| 9,286,910 B1 * | 3/2016 | Li .................... G10L 25/48 |
| 9,292,487 B1 | 3/2016 | Weber |
| 9,292,489 B1 | 3/2016 | Sak et al. |
| 9,292,492 B2 | 3/2016 | Sarikaya et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |

(56) References Cited

U.S. PATENT DOCUMENTS

| | | |
|---|---|---|
| 9,401,147 B2 | 7/2016 | Jitkoff et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,294 B1 | 10/2016 | Tunstall-pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,484,021 B1 | 11/2016 | Mairesse et al. |
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,531,862 B1 | 12/2016 | Vadodaria |
| 9,535,906 B2 | 1/2017 | Lee et al. |
| 9,536,527 B1 | 1/2017 | Carlson |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,575,964 B2 | 2/2017 | Yadgar et al. |
| 9,578,173 B2 | 2/2017 | Sanghavi et al. |
| 9,607,612 B2 | 3/2017 | Deleeuw |
| 9,619,200 B2 | 4/2017 | Chakladar et al. |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,691,378 B1 | 6/2017 | Meyers et al. |
| 9,697,822 B1 | 7/2017 | Naik et al. |
| 9,697,827 B1 | 7/2017 | Lilly et al. |
| 9,698,999 B2 | 7/2017 | Mutagi |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,755,605 B1 | 9/2017 | Li et al. |
| 9,760,566 B2 | 9/2017 | Heck et al. |
| 9,767,710 B2 | 9/2017 | Lee et al. |
| 9,786,271 B1 | 10/2017 | Combs et al. |
| 9,792,907 B2 | 10/2017 | Bocklet et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,830,044 B2 | 11/2017 | Brown et al. |
| 9,830,449 B1 | 11/2017 | Wagner |
| 9,842,584 B1 | 12/2017 | Hart et al. |
| 9,846,685 B2 | 12/2017 | Li |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,916,839 B1 | 3/2018 | Scalise et al. |
| 9,922,642 B2 | 3/2018 | Pitschel et al. |
| 9,934,777 B1 | 4/2018 | Joseph et al. |
| 9,934,785 B1 | 4/2018 | Hulaud |
| 9,946,862 B2 | 4/2018 | Yun et al. |
| 9,948,728 B2 | 4/2018 | Linn et al. |
| 9,959,129 B2 | 5/2018 | Kannan et al. |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,998,552 B1 | 6/2018 | Ledet |
| 10,001,817 B2 | 6/2018 | Zambetti et al. |
| 10,013,416 B1 | 7/2018 | Bhardwaj |
| 10,013,654 B1 | 7/2018 | Levy et al. |
| 10,013,979 B1 | 7/2018 | Roma et al. |
| 10,019,436 B2 | 7/2018 | Huang |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,681 B2 | 8/2018 | Brown et al. |
| 10,074,360 B2 | 9/2018 | Kim |
| 10,074,371 B1 | 9/2018 | Wang et al. |
| 10,083,213 B1 | 9/2018 | Podgorny et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,127,901 B2 | 11/2018 | Zhao et al. |
| 10,127,908 B1 | 11/2018 | Deller et al. |
| 10,134,425 B1 | 11/2018 | Johnson, Jr. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Ciepiinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,199,051 B2 | 2/2019 | Binder et al. |
| 10,200,824 B2 | 2/2019 | Gross et al. |
| 10,216,351 B2 | 2/2019 | Yang |
| 10,216,832 B2 | 2/2019 | Bangalore et al. |
| 10,223,066 B2 | 3/2019 | Martel et al. |

(56) References Cited

U.S. PATENT DOCUMENTS

| | | |
|---|---|---|
| 10,225,711 B2 | 3/2019 | Parks et al. |
| 10,229,356 B1 | 3/2019 | Liu et al. |
| 10,237,711 B2 | 3/2019 | Linn et al. |
| 10,248,308 B2 | 4/2019 | Karunamuni et al. |
| 10,255,922 B1 | 4/2019 | Sharifi et al. |
| 10,269,345 B2 | 4/2019 | Castillo Sanchez et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,332,513 B1 | 6/2019 | D'souza et al. |
| 10,332,518 B2 | 6/2019 | Garg et al. |
| 10,346,753 B2 | 7/2019 | Soon-Shiong et al. |
| 10,353,975 B2 | 7/2019 | Oh et al. |
| 10,354,677 B2 | 7/2019 | Mohamed et al. |
| 10,356,243 B2 | 7/2019 | Sanghavi et al. |
| 10,366,692 B1 | 7/2019 | Adams et al. |
| 10,372,814 B2 | 8/2019 | Gliozzo et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,417,037 B2 | 9/2019 | Gruber et al. |
| 10,417,554 B2 | 9/2019 | Scheffler |
| 10,446,142 B2 | 10/2019 | Lim et al. |
| 10,469,665 B1 | 11/2019 | Bell et al. |
| 10,474,961 B2 | 11/2019 | Brigham et al. |
| 10,496,705 B1 | 12/2019 | Irani et al. |
| 10,497,365 B2 | 12/2019 | Gruber et al. |
| 10,504,518 B1 | 12/2019 | Irani et al. |
| 10,521,946 B1 | 12/2019 | Roche et al. |
| 10,528,386 B2 | 1/2020 | Yu |
| 10,568,032 B2 | 2/2020 | Freeman et al. |
| 10,630,795 B2 | 4/2020 | Aoki et al. |
| 10,659,851 B2 | 5/2020 | Lister et al. |
| 10,755,032 B2 | 8/2020 | Douglas et al. |
| 10,757,499 B1 | 8/2020 | Vautrin et al. |
| 10,811,013 B1 | 10/2020 | Secker-walker et al. |
| 2004/0226042 A1 | 11/2004 | Ellis |
| 2005/0049862 A1 | 3/2005 | Choi et al. |
| 2006/0075429 A1 | 4/2006 | Istvan et al. |
| 2008/0015864 A1 | 1/2008 | Ross et al. |
| 2008/0271078 A1 | 10/2008 | Gossweiler et al. |
| 2009/0112592 A1 | 4/2009 | Candelore |
| 2009/0234655 A1 | 9/2009 | Kwon |
| 2010/0082567 A1 | 4/2010 | Rosenblatt et al. |
| 2011/0002487 A1 | 1/2011 | Panther et al. |
| 2011/0004475 A1 | 1/2011 | Bellegarda |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Wäller et al. |
| 2011/0022394 A1 | 1/2011 | Wide |
| 2011/0022472 A1 | 1/2011 | Zon |
| 2011/0022952 A1 | 1/2011 | Wu et al. |
| 2011/0028083 A1 | 2/2011 | Soitis |
| 2011/0029616 A1 | 2/2011 | Wang et al. |
| 2011/0029637 A1 | 2/2011 | Morse |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0039584 A1 | 2/2011 | Merrett |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047246 A1 | 2/2011 | Frissora et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055244 A1 | 3/2011 | Donelli |
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg |
| 2011/0060807 A1 | 3/2011 | Martin et al. |
| 2011/0060812 A1 | 3/2011 | Middleton |
| 2011/0064378 A1 | 3/2011 | Gharaat et al. |
| 2011/0064387 A1 | 3/2011 | Mendeloff et al. |
| 2011/0065456 A1 | 3/2011 | Brennan et al. |
| 2011/0066366 A1 | 3/2011 | Ellanti et al. |
| 2011/0066436 A1 | 3/2011 | Bezar |
| 2011/0066468 A1 | 3/2011 | Huang et al. |
| 2011/0066602 A1 | 3/2011 | Studer et al. |
| 2011/0066634 A1 | 3/2011 | Phillips et al. |
| 2011/0072033 A1 | 3/2011 | White et al. |
| 2011/0072114 A1 | 3/2011 | Hoffert et al. |
| 2011/0072492 A1 | 3/2011 | Mohler et al. |
| 2011/0075818 A1 | 3/2011 | Vance et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0086631 A1 | 4/2011 | Park et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard |
| 2011/0093272 A1 | 4/2011 | Isobe et al. |
| 2011/0099000 A1 | 4/2011 | Rai et al. |
| 2011/0099157 A1 | 4/2011 | LeBeau et al. |
| 2011/0102161 A1 | 5/2011 | Heubel et al. |
| 2011/0103682 A1 | 5/2011 | Chidlovskii et al. |
| 2011/0105097 A1 | 5/2011 | Tadayon et al. |
| 2011/0106534 A1 | 5/2011 | Lebeau et al. |
| 2011/0106536 A1 | 5/2011 | Klappert |
| 2011/0106736 A1 | 5/2011 | Aharonson et al. |
| 2011/0106878 A1 | 5/2011 | Cho et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Beilegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116480 A1 | 5/2011 | Li et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119713 A1 | 5/2011 | Chang et al. |
| 2011/0119715 A1 | 5/2011 | Chang et al. |
| 2011/0123004 A1 | 5/2011 | Chang et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |

(56) References Cited

U.S. PATENT DOCUMENTS

| | | |
|---|---|---|
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0137664 A1 | 6/2011 | Kho et al. |
| 2011/0138064 A1* | 6/2011 | Reriger .............. G06F 15/16 |
| 2011/0141141 A1 | 6/2011 | Kankainen |
| 2011/0143718 A1 | 6/2011 | Engelhart, Sr. |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151415 A1 | 6/2011 | Darling et al. |
| 2011/0151830 A1 | 6/2011 | Blanda, Jr. et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153325 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0154193 A1 | 6/2011 | Creutz et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0166855 A1 | 7/2011 | Vermeulen et al. |
| 2011/0166862 A1 | 7/2011 | Eshed et al. |
| 2011/0167350 A1 | 7/2011 | Hoellwarth |
| 2011/0173003 A1 | 7/2011 | Levanon et al. |
| 2011/0173537 A1 | 7/2011 | Hemphill |
| 2011/0175810 A1 | 7/2011 | Markovic et al. |
| 2011/0178804 A1 | 7/2011 | Inoue et al. |
| 2011/0179002 A1 | 7/2011 | Dumitru et al. |
| 2011/0179372 A1 | 7/2011 | Moore et al. |
| 2011/0183627 A1 | 7/2011 | Ueda et al. |
| 2011/0183650 A1 | 7/2011 | McKee |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0184789 A1 | 7/2011 | Kirsch |
| 2011/0185288 A1 | 7/2011 | Gupta et al. |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0197128 A1 | 8/2011 | Assadollahi |
| 2011/0199312 A1 | 8/2011 | Okuta |
| 2011/0201385 A1 | 8/2011 | Higginbotham |
| 2011/0201387 A1 | 8/2011 | Paek et al. |
| 2011/0202526 A1 | 8/2011 | Lee et al. |
| 2011/0202594 A1 | 8/2011 | Ricci |
| 2011/0202874 A1 | 8/2011 | Ramer et al. |
| 2011/0205149 A1 | 8/2011 | Tom |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231189 A1 | 9/2011 | Anastasiadis et al. |
| 2011/0231218 A1 | 9/2011 | Tovar |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |
| 2011/0242007 A1 | 10/2011 | Gray et al. |
| 2011/0244888 A1 | 10/2011 | Ohki |
| 2011/0246471 A1 | 10/2011 | Rakib |
| 2011/0249144 A1 | 10/2011 | Chang |
| 2011/0250570 A1 | 10/2011 | Mack |
| 2011/0252108 A1 | 10/2011 | Morris et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264530 A1 | 10/2011 | Santangelo et al. |
| 2011/0264643 A1 | 10/2011 | Cao |
| 2011/0264999 A1 | 10/2011 | Bells et al. |
| 2011/0270604 A1 | 11/2011 | Qi et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0280143 A1 | 11/2011 | Li et al. |
| 2011/0282663 A1 | 11/2011 | Talwar et al. |
| 2011/0282888 A1 | 11/2011 | Koperski et al. |
| 2011/0282903 A1 | 11/2011 | Zhang |
| 2011/0282906 A1 | 11/2011 | Wong |
| 2011/0283189 A1 | 11/2011 | McCarty |
| 2011/0283190 A1 | 11/2011 | Poltorak |
| 2011/0288852 A1 | 11/2011 | Dymetman et al. |
| 2011/0288855 A1 | 11/2011 | Roy |
| 2011/0288861 A1 | 11/2011 | Kurzwei et al. |
| 2011/0288863 A1 | 11/2011 | Rasmussen |
| 2011/0288866 A1 | 11/2011 | Rasmussen |
| 2011/0288917 A1 | 11/2011 | Wanek et al. |
| 2011/0289530 A1 | 11/2011 | Dureau et al. |
| 2011/0298585 A1 | 12/2011 | Barry |
| 2011/0301943 A1 | 12/2011 | Patch |
| 2011/0302162 A1 | 12/2011 | Xiao et al. |
| 2011/0302645 A1 | 12/2011 | Headley |
| 2011/0306426 A1 | 12/2011 | Novak et al. |
| 2011/0307241 A1 | 12/2011 | Waibel et al. |
| 2011/0307254 A1 | 12/2011 | Hunt et al. |
| 2011/0307491 A1 | 12/2011 | Fisk et al. |
| 2011/0307810 A1 | 12/2011 | Hilerio et al. |
| 2011/0313775 A1 | 12/2011 | Laligand et al. |
| 2011/0313803 A1 | 12/2011 | Friend et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0314539 A1 | 12/2011 | Horton |
| 2011/0320187 A1 | 12/2011 | Motik et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0020503 A1 | 1/2012 | Endo et al. |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |

(56) References Cited

U.S. PATENT DOCUMENTS

| | | |
|---|---|---|
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0026395 A1 | 2/2012 | Jin et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0039578 A1 | 2/2012 | Issa et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0052945 A1 | 3/2012 | Miyamoto et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0055253 A1* | 3/2012 | Sinha .................. G01N 29/04 |
| 2012/0056815 A1 | 3/2012 | Mehra |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0064975 A1 | 3/2012 | Gault et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084087 A1 | 4/2012 | Yang et al. |
| 2012/0084089 A1 | 4/2012 | Lloyd et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0089659 A1 | 4/2012 | Halevi et al. |
| 2012/0094645 A1 | 4/2012 | Jeffrey |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109753 A1 | 5/2012 | Kennewick et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0117590 A1 | 5/2012 | Agnihotri et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130995 A1 | 5/2012 | Risvik et al. |
| 2012/0135714 A1 | 5/2012 | King, II |
| 2012/0136529 A1 | 5/2012 | Curtis et al. |
| 2012/0136572 A1 | 5/2012 | Norton |
| 2012/0136649 A1 | 5/2012 | Freising et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0149342 A1 | 6/2012 | Cohen et al. |
| 2012/0149394 A1 | 6/2012 | Singh et al. |
| 2012/0150532 A1 | 6/2012 | Mirowski et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0163710 A1 | 6/2012 | Skaff et al. |
| 2012/0166177 A1 | 6/2012 | Beld et al. |
| 2012/0166196 A1 | 6/2012 | Ju et al. |
| 2012/0166429 A1 | 6/2012 | Moore et al. |
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0176255 A1 | 7/2012 | Choi et al. |
| 2012/0179457 A1 | 7/2012 | Newman et al. |
| 2012/0179467 A1 | 7/2012 | Williams et al. |
| 2012/0179471 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0203767 A1 | 8/2012 | Williams et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0210378 A1 | 8/2012 | Mccoy et al. |
| 2012/0214141 A1 | 8/2012 | Raya et al. |
| 2012/0214517 A1 | 8/2012 | Singh et al. |
| 2012/0215640 A1 | 8/2012 | Ramer et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239403 A1 | 9/2012 | Cano et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |

(56) References Cited

U.S. PATENT DOCUMENTS

| | | |
|---|---|---|
| 2012/0262296 A1 | 10/2012 | Bezar |
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265787 A1 | 10/2012 | Hsu et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0290657 A1 | 11/2012 | Parks et al. |
| 2012/0290680 A1 | 11/2012 | Hwang |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297341 A1 | 11/2012 | Glazer et al. |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0304239 A1 | 11/2012 | Shahraray et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316774 A1 | 12/2012 | Yariv et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0316955 A1 | 12/2012 | Panguluri et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Cortes et al. |
| 2012/0324391 A1 | 12/2012 | Tocci |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |
| 2013/0018863 A1 | 1/2013 | Regan et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0036200 A1* | 2/2013 | Roberts .................. G06F 15/16 |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0055099 A1 | 2/2013 | Yao et al. |
| 2013/0055147 A1 | 2/2013 | Vasudev et al. |
| 2013/0060571 A1 | 3/2013 | Soemo et al. |
| 2013/0061139 A1 | 3/2013 | Mahkovec et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0082967 A1 | 4/2013 | Hillis et al. |
| 2013/0085755 A1 | 4/2013 | Bringert et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | LeBeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0107053 A1 | 5/2013 | Ozaki |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |

(56) References Cited

U.S. PATENT DOCUMENTS

| | | |
|---|---|---|
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0225128 A1 | 8/2013 | Gomar |
| 2013/0226935 A1 | 8/2013 | Bai et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238326 A1 | 9/2013 | Kim et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0339256 A1 | 12/2013 | Shroff |

(56) References Cited

U.S. PATENT DOCUMENTS

| | | |
|---|---|---|
| 2013/0339454 A1 | 12/2013 | Walker et al. |
| 2013/0339991 A1 | 12/2013 | Ricci |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0347018 A1* | 12/2013 | Limp .................... H04N 21/24 |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006030 A1 | 1/2014 | Fleizach et al. |
| 2014/0006153 A1 | 1/2014 | Thangam et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028029 A1 | 1/2014 | Jochman |
| 2014/0028477 A1 | 1/2014 | Michalske |
| 2014/0028735 A1 | 1/2014 | Williams et al. |
| 2014/0032453 A1 | 1/2014 | Eustice et al. |
| 2014/0033071 A1 | 1/2014 | Gruber et al. |
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040918 A1 | 2/2014 | Li |
| 2014/0040961 A1 | 2/2014 | Green et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0068751 A1 | 3/2014 | Last |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095601 A1 | 4/2014 | Abuelsaad et al. |
| 2014/0095965 A1 | 4/2014 | Li |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108391 A1 | 4/2014 | Volkert |
| 2014/0112556 A1 | 4/2014 | Kalinli-akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0123022 A1 | 5/2014 | Lee et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157319 A1 | 6/2014 | Kimura et al. |
| 2014/0157422 A1 | 6/2014 | Livshits et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |

(56) References Cited

U.S. PATENT DOCUMENTS

| | | |
|---|---|---|
| 2014/0164953 A1 | 6/2014 | Lynch et al. |
| 2014/0169795 A1 | 6/2014 | Clough |
| 2014/0171064 A1 | 6/2014 | Das |
| 2014/0172878 A1 | 6/2014 | Clark et al. |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181865 A1 | 6/2014 | Koganei |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1 | 10/2014 | Weilhammer et al. |
| 2014/0324884 A1 | 10/2014 | Lindahl et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |

(56) References Cited

U.S. PATENT DOCUMENTS

| | | |
|---|---|---|
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0343834 A1 | 11/2014 | Demerchant et al. |
| 2014/0343943 A1 | 11/2014 | Al-telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |
| 2014/0358523 A1 | 12/2014 | Sheth et al. |
| 2014/0358549 A1 | 12/2014 | O'connor et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0379798 A1 | 12/2014 | Bunner et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0019219 A1 | 1/2015 | Tzirkel-Hancock et al. |
| 2015/0019221 A1 | 1/2015 | Lee et al. |
| 2015/0019944 A1 | 1/2015 | Kalgi |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Softer et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russeii et al. |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067822 A1 | 3/2015 | Randail |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095268 A1 | 4/2015 | Greenzeiger et al. |
| 2015/0095278 A1 | 4/2015 | Flinn et al. |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106093 A1 | 4/2015 | Weeks et al. |
| 2015/0106737 A1 | 4/2015 | Montoy-Wilson et al. |
| 2015/0113407 A1 | 4/2015 | Hoffert et al. |
| 2015/0113435 A1 | 4/2015 | Phillips |
| 2015/0120296 A1 | 4/2015 | Stern et al. |
| 2015/0120641 A1 | 4/2015 | Soon-shiong et al. |
| 2015/0120723 A1 | 4/2015 | Deshmukh et al. |
| 2015/0121216 A1 | 4/2015 | Brown et al. |
| 2015/0123898 A1 | 5/2015 | Kim et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142447 A1 | 5/2015 | Kennewick et al. |
| 2015/0142851 A1 | 5/2015 | Gupta et al. |

(56) References Cited

U.S. PATENT DOCUMENTS

| | | |
|---|---|---|
| 2015/0143419 A1 | 5/2015 | Bhagwat et al. |
| 2015/0148013 A1 | 5/2015 | Baldwin et al. |
| 2015/0149177 A1 | 5/2015 | Kains et al. |
| 2015/0149182 A1 | 5/2015 | Kains et al. |
| 2015/0149354 A1 | 5/2015 | Mccoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |
| 2015/0154185 A1 | 6/2015 | Waibel |
| 2015/0154976 A1 | 6/2015 | Mutagi |
| 2015/0160855 A1 | 6/2015 | Bi |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0178785 A1 | 6/2015 | Salonen |
| 2015/0179176 A1 | 6/2015 | Ryu et al. |
| 2015/0181285 A1 | 6/2015 | Zhang et al. |
| 2015/0185964 A1 | 7/2015 | Stout |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234636 A1 | 8/2015 | Barnes, Jr. |
| 2015/0234800 A1 | 8/2015 | Patrick et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0269139 A1 | 9/2015 | McAteer et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0301796 A1 | 10/2015 | Visser et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0309997 A1 | 10/2015 | Lee et al. |
| 2015/0310114 A1 | 10/2015 | Ryger et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319411 A1 | 11/2015 | Kasmir et al. |
| 2015/0324041 A1 | 11/2015 | Varley et al. |
| 2015/0324334 A1 | 11/2015 | Lee et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |

(56) References Cited

U.S. PATENT DOCUMENTS

| | | |
|---|---|---|
| 2015/0340033 A1 | 11/2015 | Di Fabbrizio et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Beilegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371665 A1 | 12/2015 | Naik et al. |
| 2015/0373183 A1 | 12/2015 | Woolsey et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2016/0004690 A1 | 1/2016 | Bangalore et al. |
| 2016/0005320 A1 | 1/2016 | deCharms et al. |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0021414 A1 | 1/2016 | Padi et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0062605 A1 | 3/2016 | Agarwal et al. |
| 2016/0063094 A1 | 3/2016 | Udupa et al. |
| 2016/0063998 A1 | 3/2016 | Krishnamoorthy et al. |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091967 A1 | 3/2016 | Prokofieva et al. |
| 2016/0092434 A1 | 3/2016 | Beilegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Beilegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Paiakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0111091 A1 | 4/2016 | Bakish |
| 2016/0112746 A1 | 4/2016 | Zhang et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0148610 A1 | 5/2016 | Kennewick, Jr. et al. |
| 2016/0150020 A1 | 5/2016 | Farmer et al. |
| 2016/0154624 A1 | 6/2016 | Son et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170966 A1 | 6/2016 | Kolo |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0203002 A1 | 7/2016 | Kannan et al. |
| 2016/0210551 A1 | 7/2016 | Lee et al. |
| 2016/0210981 A1 | 7/2016 | Lee |
| 2016/0212488 A1 | 7/2016 | Os et al. |
| 2016/0217784 A1 | 7/2016 | Gelfenbeyn et al. |
| 2016/0224540 A1 | 8/2016 | Stewart et al. |
| 2016/0224774 A1 | 8/2016 | Pender |

(56) References Cited

U.S. PATENT DOCUMENTS

| | | |
|---|---|---|
| 2016/0225372 A1 | 8/2016 | Cheung et al. |
| 2016/0227107 A1 | 8/2016 | Beaumont |
| 2016/0232500 A1 | 8/2016 | Wang et al. |
| 2016/0239645 A1 | 8/2016 | Heo et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0266871 A1 | 9/2016 | Schmid et al. |
| 2016/0267904 A1 | 9/2016 | Biadsy et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293157 A1 | 10/2016 | Chen et al. |
| 2016/0293168 A1 | 10/2016 | Chen |
| 2016/0294755 A1 | 10/2016 | Prabhu |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0307566 A1 | 10/2016 | Beilegarda |
| 2016/0308799 A1 | 10/2016 | Schubert et al. |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0317924 A1 | 11/2016 | Tanaka et al. |
| 2016/0321239 A1 | 11/2016 | Iso-Sipilä et al. |
| 2016/0321261 A1 | 11/2016 | Spasojevic et al. |
| 2016/0321358 A1 | 11/2016 | Kanani et al. |
| 2016/0322043 A1 | 11/2016 | Beilegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335532 A1 | 11/2016 | Sanghavi et al. |
| 2016/0336007 A1 | 11/2016 | Hanazawa et al. |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0350650 A1 | 12/2016 | Leeman-Munk et al. |
| 2016/0351190 A1 | 12/2016 | Piernot et al. |
| 2016/0352567 A1 | 12/2016 | Robbins et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0003931 A1 | 1/2017 | Dvortsov et al. |
| 2017/0004824 A1 | 1/2017 | Yoo et al. |
| 2017/0005818 A1 | 1/2017 | Gould |
| 2017/0011091 A1 | 1/2017 | Chehreghani |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |
| 2017/0026509 A1 | 1/2017 | Rand |
| 2017/0031576 A1 | 2/2017 | Saoji et al. |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0047063 A1 | 2/2017 | Ohmura et al. |
| 2017/0053652 A1 | 2/2017 | Choi et al. |
| 2017/0055895 A1 | 3/2017 | Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0075653 A1 | 3/2017 | Dawidowsky et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0084277 A1 | 3/2017 | Sharifi |
| 2017/0085547 A1 | 3/2017 | De Aguiar et al. |
| 2017/0090569 A1 | 3/2017 | Levesque |
| 2017/0091168 A1 | 3/2017 | Beilegarda et al. |
| 2017/0091169 A1 | 3/2017 | Beilegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0105190 A1 | 4/2017 | Logan et al. |
| 2017/0110117 A1 | 4/2017 | Chakladar et al. |
| 2017/0116177 A1 | 4/2017 | Walia |
| 2017/0116982 A1 | 4/2017 | Gelfenbeyn et al. |
| 2017/0116989 A1 | 4/2017 | Yadgar et al. |
| 2017/0124190 A1 | 5/2017 | Wang et al. |

(56) References Cited

U.S. PATENT DOCUMENTS

| | | |
|---|---|---|
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0140041 A1 | 5/2017 | Dotan-Cohen et al. |
| 2017/0140644 A1 | 5/2017 | Hwang et al. |
| 2017/0140760 A1 | 5/2017 | Sachdev |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0155940 A1 | 6/2017 | Jin et al. |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0162191 A1 | 6/2017 | Grost et al. |
| 2017/0162203 A1 | 6/2017 | Huang et al. |
| 2017/0169818 A1 | 6/2017 | Vanblon et al. |
| 2017/0169819 A1 | 6/2017 | Mese et al. |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195636 A1 | 7/2017 | Child et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0206899 A1 | 7/2017 | Bryant et al. |
| 2017/0215052 A1 | 7/2017 | Koum et al. |
| 2017/0221486 A1 | 8/2017 | Kurata et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0238039 A1 | 8/2017 | Sabattini |
| 2017/0242653 A1 | 8/2017 | Lang et al. |
| 2017/0242657 A1 | 8/2017 | Jarvis et al. |
| 2017/0243468 A1 | 8/2017 | Dotan-Cohen et al. |
| 2017/0243576 A1 | 8/2017 | Millington et al. |
| 2017/0243586 A1 | 8/2017 | Civelli et al. |
| 2017/0256256 A1 | 9/2017 | Wang et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0264451 A1 | 9/2017 | Yu et al. |
| 2017/0264711 A1 | 9/2017 | Natarajan et al. |
| 2017/0270912 A1 | 9/2017 | Levit et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0337035 A1 | 11/2017 | Choudhary et al. |
| 2017/0337478 A1 | 11/2017 | Sarikaya et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0365251 A1 | 12/2017 | Park et al. |
| 2017/0371509 A1 | 12/2017 | Jung et al. |
| 2017/0371885 A1 | 12/2017 | Aggarwal et al. |
| 2017/0374093 A1 | 12/2017 | Dhar et al. |
| 2017/0374176 A1 | 12/2017 | Agrawal et al. |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0024985 A1 | 1/2018 | Asano |
| 2018/0033431 A1 | 2/2018 | Newendorp et al. |
| 2018/0033436 A1 | 2/2018 | Zhou |
| 2018/0047201 A1 | 2/2018 | Filev et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Beilegarda et al. |
| 2018/0069743 A1 | 3/2018 | Bakken et al. |
| 2018/0075847 A1 | 3/2018 | Lee et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0102914 A1 | 4/2018 | Kawachi et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0113673 A1 | 4/2018 | Sheynblat |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0129967 A1 | 5/2018 | Herreshoff |

(56) References Cited

U.S. PATENT DOCUMENTS

| | | |
|---|---|---|
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143967 A1 | 5/2018 | Anbazhagan et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0157372 A1 | 6/2018 | Kurabayashi |
| 2018/0157992 A1 | 6/2018 | Susskind et al. |
| 2018/0158548 A1 | 6/2018 | Taheri et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0182376 A1 | 6/2018 | Gysel et al. |
| 2018/0188840 A1 | 7/2018 | Tamura et al. |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0210874 A1 | 7/2018 | Fuxman et al. |
| 2018/0213448 A1 | 7/2018 | Segal et al. |
| 2018/0218735 A1 | 8/2018 | Hunt et al. |
| 2018/0225274 A1 | 8/2018 | Tommy et al. |
| 2018/0232203 A1 | 8/2018 | Gelfenbeyn et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0268106 A1 | 9/2018 | Velaga |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293984 A1 | 10/2018 | Lindahl |
| 2018/0293988 A1 | 10/2018 | Huang et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0314552 A1 | 11/2018 | Kim et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336920 A1 | 11/2018 | Bastian et al. |
| 2018/0341643 A1 | 11/2018 | Alders et al. |
| 2018/0343557 A1 | 11/2018 | Naik et al. |
| 2018/0349084 A1 | 12/2018 | Nagasaka et al. |
| 2018/0349346 A1 | 12/2018 | Hatori et al. |
| 2018/0349349 A1 | 12/2018 | Beilegarda et al. |
| 2018/0349447 A1 | 12/2018 | Maccartney et al. |
| 2018/0349472 A1 | 12/2018 | Kohlschuetter et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0373487 A1 | 12/2018 | Gruber et al. |
| 2018/0374484 A1 | 12/2018 | Huang et al. |
| 2019/0012141 A1 | 1/2019 | Piersol et al. |
| 2019/0012449 A1 | 1/2019 | Cheyer |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035405 A1 | 1/2019 | Haughay |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0045040 A1 | 2/2019 | Lee et al. |
| 2019/0051309 A1 | 2/2019 | Kim et al. |
| 2019/0057697 A1 | 2/2019 | Giuli et al. |
| 2019/0065144 A1 | 2/2019 | Sumner |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0080685 A1 | 3/2019 | Johnson, Jr. |
| 2019/0080698 A1 | 3/2019 | Miller |
| 2019/0087412 A1 | 3/2019 | Seyed Ibrahim et al. |
| 2019/0087455 A1 | 3/2019 | He et al. |
| 2019/0095050 A1 | 3/2019 | Gruber et al. |
| 2019/0095171 A1 | 3/2019 | Carson et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129615 A1 | 5/2019 | Sundar et al. |
| 2019/0132694 A1 | 5/2019 | Hanes et al. |
| 2019/0139541 A1 | 5/2019 | Andersen et al. |
| 2019/0141494 A1 | 5/2019 | Gross et al. |
| 2019/0147880 A1 | 5/2019 | Booker et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0164546 A1 | 5/2019 | Piernot et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0197053 A1 | 6/2019 | Graham et al. |

(56) References Cited

U.S. PATENT DOCUMENTS

| | | |
|---|---|---|
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0236130 A1 | 8/2019 | Li et al. |
| 2019/0236459 A1 | 8/2019 | Cheyer et al. |
| 2019/0244618 A1 | 8/2019 | Newendorp et al. |
| 2019/0251339 A1 | 8/2019 | Hawker |
| 2019/0251960 A1 | 8/2019 | Maker et al. |
| 2019/0259386 A1 | 8/2019 | Kudurshian et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |
| 2019/0287522 A1 | 9/2019 | Lambourne et al. |
| 2019/0295544 A1 | 9/2019 | Garcia et al. |
| 2019/0303442 A1 | 10/2019 | Peitz et al. |
| 2019/0310765 A1 | 10/2019 | Napolitano et al. |
| 2019/0318739 A1 | 10/2019 | Garg et al. |
| 2019/0339784 A1 | 11/2019 | Lemay et al. |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0348022 A1 | 11/2019 | Park et al. |
| 2019/0354548 A1 | 11/2019 | Orr et al. |
| 2019/0355346 A1 | 11/2019 | Bellegarda |
| 2019/0361729 A1 | 11/2019 | Gruber et al. |
| 2019/0369748 A1 | 12/2019 | Hindi et al. |
| 2019/0369842 A1 | 12/2019 | Dolbakian et al. |
| 2019/0370292 A1 | 12/2019 | Irani et al. |
| 2019/0370323 A1 | 12/2019 | Davidson et al. |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2020/0019609 A1 | 1/2020 | Yu et al. |
| 2020/0042334 A1 | 2/2020 | Radebaugh et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0053218 A1 | 2/2020 | Gray |
| 2020/0058299 A1 | 2/2020 | Lee et al. |
| 2020/0075018 A1 | 3/2020 | Chen |
| 2020/0091958 A1 | 3/2020 | Curtis et al. |
| 2020/0092625 A1 | 3/2020 | Raffle |
| 2020/0098362 A1 | 3/2020 | Piernot et al. |
| 2020/0098368 A1 | 3/2020 | Lemay |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot et al. |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0135209 A1 | 4/2020 | Delfarah et al. |
| 2020/0137230 A1 | 4/2020 | Spohrer |
| 2020/0143812 A1 | 5/2020 | Walker, II et al. |
| 2020/0159579 A1 | 5/2020 | Shear et al. |
| 2020/0160179 A1 | 5/2020 | Chien et al. |
| 2020/0169637 A1 | 5/2020 | Sanghavi et al. |
| 2020/0175566 A1 | 6/2020 | Bender et al. |
| 2020/0184964 A1 | 6/2020 | Myers et al. |
| 2020/0193997 A1 | 6/2020 | Piernot et al. |
| 2020/0221155 A1 | 7/2020 | Hansen et al. |
| 2020/0227034 A1 | 7/2020 | Summa et al. |
| 2020/0227044 A1 | 7/2020 | Lindahl |
| 2020/0249985 A1 | 8/2020 | Zeitlin |
| 2020/0252508 A1 | 8/2020 | Gray |
| 2020/0267222 A1 | 8/2020 | Phipps et al. |
| 2020/0272485 A1 | 8/2020 | Karashchuk et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0327895 A1 | 10/2020 | Gruber et al. |
| 2020/0356243 A1 | 11/2020 | Meyer et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0365155 A1 | 11/2020 | Milden |
| 2020/0372904 A1 | 11/2020 | Vescovi et al. |
| 2020/0374243 A1 | 11/2020 | Jina et al. |
| 2020/0379610 A1 | 12/2020 | Ford et al. |
| 2020/0379640 A1 | 12/2020 | Beilegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2021/0006943 A1 | 1/2021 | Gross et al. |
| 2021/0011557 A1 | 1/2021 | Lemay et al. |
| 2021/0012776 A1 | 1/2021 | Peterson et al. |

FOREIGN PATENT DOCUMENTS

| | | |
|---|---|---|
| AU | 2015101171 A4 | 10/2015 |
| AU | 2018100187 A4 | 3/2018 |
| AU | 2017222436 A1 | 10/2018 |
| CA | 2792412 A1 | 7/2011 |
| CA | 2666438 C | 6/2013 |
| CN | 1585479 A | 2/2005 |
| CN | 101939740 A | 1/2011 |
| CN | 101951553 A | 1/2011 |
| CN | 101958958 A | 1/2011 |
| CN | 101971250 A | 2/2011 |
| CN | 101992779 A | 3/2011 |
| CN | 102056026 A | 5/2011 |
| CN | 102122506 A | 7/2011 |
| CN | 102124515 A | 7/2011 |
| CN | 102137085 A | 7/2011 |
| CN | 102137193 A | 7/2011 |
| CN | 102160043 A | 8/2011 |
| CN | 102201235 A | 9/2011 |
| CN | 102214187 A | 10/2011 |
| CN | 102237088 A | 11/2011 |
| CN | 102246136 A | 11/2011 |
| CN | 202035047 U | 11/2011 |
| CN | 102282609 A | 12/2011 |
| CN | 202092650 U | 12/2011 |
| CN | 102340590 A | 2/2012 |
| CN | 102346557 A | 2/2012 |
| CN | 102368256 A | 3/2012 |
| CN | 102402985 A | 4/2012 |
| CN | 102405463 A | 4/2012 |
| CN | 102498457 A | 6/2012 |
| CN | 102510426 A | 6/2012 |
| CN | 102629246 A | 8/2012 |
| CN | 102651217 A | 8/2012 |
| CN | 102681896 A | 9/2012 |
| CN | 102682769 A | 9/2012 |

(56) References Cited

FOREIGN PATENT DOCUMENTS

| | | | |
|---|---|---|---|
| CN | 102682771 A | 9/2012 |
| CN | 102685295 A | 9/2012 |
| CN | 102693725 A | 9/2012 |
| CN | 102694909 A | 9/2012 |
| CN | 202453859 U | 9/2012 |
| CN | 102722478 A | 10/2012 |
| CN | 102737104 A | 10/2012 |
| CN | 102750087 A | 10/2012 |
| CN | 102792320 A | 11/2012 |
| CN | 102801853 A | 11/2012 |
| CN | 102820033 A | 12/2012 |
| CN | 102844738 A | 12/2012 |
| CN | 102866828 A | 1/2013 |
| CN | 102870065 A | 1/2013 |
| CN | 102882752 A | 1/2013 |
| CN | 102917004 A | 2/2013 |
| CN | 102917271 A | 2/2013 |
| CN | 102918493 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103093334 A | 5/2013 |
| CN | 103135916 A | 6/2013 |
| CN | 103198831 A | 7/2013 |
| CN | 103209369 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103280218 A | 9/2013 |
| CN | 103292437 A | 9/2013 |
| CN | 103327063 A | 9/2013 |
| CN | 103365279 A | 10/2013 |
| CN | 103366741 A | 10/2013 |
| CN | 103390016 A | 11/2013 |
| CN | 103412789 A | 11/2013 |
| CN | 103426428 A | 12/2013 |
| CN | 103455234 A | 12/2013 |
| CN | 103456306 A | 12/2013 |
| CN | 103533143 A | 1/2014 |
| CN | 103533154 A | 1/2014 |
| CN | 103543902 A | 1/2014 |
| CN | 103562863 A | 2/2014 |
| CN | 103608859 A | 2/2014 |
| CN | 103645876 A | 3/2014 |
| CN | 103716454 A | 4/2014 |
| CN | 103727948 A | 4/2014 |
| CN | 103744761 A | 4/2014 |
| CN | 103760984 A | 4/2014 |
| CN | 103765385 A | 4/2014 |
| CN | 103792985 A | 5/2014 |
| CN | 103794212 A | 5/2014 |
| CN | 103795850 A | 5/2014 |
| CN | 103841268 A | 6/2014 |
| CN | 103902373 A | 7/2014 |
| CN | 103930945 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 104038621 A | 9/2014 |
| CN | 104090652 A | 10/2014 |
| CN | 104113471 A | 10/2014 |
| CN | 104125322 A | 10/2014 |
| CN | 104144377 A | 11/2014 |
| CN | 104169837 A | 11/2014 |
| CN | 104180815 A | 12/2014 |
| CN | 104243699 A | 12/2014 |
| CN | 104281259 A | 1/2015 |
| CN | 104284257 A | 1/2015 |
| CN | 104335207 A | 2/2015 |
| CN | 104335234 A | 2/2015 |
| CN | 104374399 A | 2/2015 |
| CN | 104423625 A | 3/2015 |
| CN | 104427104 A | 3/2015 |
| CN | 104463552 A | 3/2015 |
| CN | 104487929 A | 4/2015 |
| CN | 104516522 A | 4/2015 |
| CN | 104573472 A | 4/2015 |
| CN | 104575501 A | 4/2015 |
| CN | 104584010 A | 4/2015 |
| CN | 104604274 A | 5/2015 |
| CN | 104679472 A | 6/2015 |
| CN | 104769584 A | 7/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105190607 A | 12/2015 |
| CN | 105247511 A | 1/2016 |
| CN | 105264524 A | 1/2016 |
| CN | 105278681 A | 1/2016 |
| CN | 105320251 A | 2/2016 |
| CN | 105320726 A | 2/2016 |
| CN | 105379234 A | 3/2016 |
| CN | 105430186 A | 3/2016 |
| CN | 105471705 A | 4/2016 |
| CN | 105472587 A | 4/2016 |
| CN | 105556592 A | 5/2016 |
| CN | 105808200 A | 7/2016 |
| CN | 105830048 A | 8/2016 |
| CN | 105869641 A | 8/2016 |
| CN | 106030699 A | 10/2016 |
| CN | 106062734 A | 10/2016 |
| CN | 106415412 A | 2/2017 |
| CN | 106462383 A | 2/2017 |
| CN | 106463114 A | 2/2017 |
| CN | 106465074 A | 2/2017 |
| CN | 106534469 A | 3/2017 |
| CN | 106776581 A | 5/2017 |
| CN | 107450800 A | 12/2017 |
| CN | 107480161 A | 12/2017 |
| CN | 107491468 A | 12/2017 |
| CN | 107545262 A | 1/2018 |
| CN | 107608998 A | 1/2018 |
| CN | 107615378 A | 1/2018 |
| CN | 107871500 A | 4/2018 |
| CN | 107919123 A | 4/2018 |
| CN | 107924313 A | 4/2018 |
| CN | 107978313 A | 5/2018 |
| CN | 108647681 A | 10/2018 |
| CN | 109447234 A | 3/2019 |
| CN | 109657629 A | 4/2019 |
| CN | 110135411 A | 8/2019 |
| CN | 110531860 A | 12/2019 |
| CN | 110598671 A | 12/2019 |
| CN | 110647274 A | 1/2020 |
| CN | 110825469 A | 2/2020 |
| DE | 202016008226 U1 | 5/2017 |
| EP | 1094406 A2 | 4/2001 |
| EP | 2309491 A1 | 4/2011 |
| EP | 2329348 A1 | 6/2011 |
| EP | 2339576 A2 | 6/2011 |
| EP | 2355093 A2 | 8/2011 |
| EP | 2393056 A1 | 12/2011 |
| EP | 2400373 A1 | 12/2011 |
| EP | 2431842 A2 | 3/2012 |
| EP | 2523109 A1 | 11/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2639792 A1 | 9/2013 |
| EP | 2669889 A2 | 12/2013 |
| EP | 2672229 A2 | 12/2013 |

(56) References Cited

FOREIGN PATENT DOCUMENTS

| | | |
|---|---|---|
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2743846 A2 | 6/2014 |
| EP | 2760015 A1 | 7/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |
| EP | 2957986 A1 | 12/2015 |
| EP | 2985984 A2 | 2/2016 |
| EP | 2891049 A4 | 3/2016 |
| EP | 3032532 A1 | 6/2016 |
| EP | 3035329 A1 | 6/2016 |
| EP | 3038333 A1 | 6/2016 |
| EP | 3115905 A1 | 1/2017 |
| EP | 3125097 A2 | 2/2017 |
| EP | 3224708 A1 | 10/2017 |
| EP | 3246916 A1 | 11/2017 |
| EP | 3300074 A1 | 3/2018 |
| EP | 2983065 B1 | 8/2018 |
| EP | 3392876 A1 | 10/2018 |
| EP | 3401773 A1 | 11/2018 |
| EP | 3506151 A1 | 7/2019 |
| JP | 2001-325052 A | 11/2001 |
| JP | 2002-41276 A | 2/2002 |
| JP | 2007-34960 A | 2/2007 |
| JP | 2007-235912 A | 9/2007 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-237621 A | 11/2011 |
| JP | 2011-238022 A | 11/2011 |
| JP | 2011-250027 A | 12/2011 |
| JP | 2012-14394 A | 1/2012 |
| JP | 2012-502377 A | 1/2012 |
| JP | 2012-22478 A | 2/2012 |
| JP | 2012-33997 A | 2/2012 |
| JP | 2012-37619 A | 2/2012 |
| JP | 2012-63536 A | 3/2012 |
| JP | 2012-508530 A | 4/2012 |
| JP | 2012-89020 A | 5/2012 |
| JP | 2012-116442 A | 6/2012 |
| JP | 2012-142744 A | 7/2012 |
| JP | 2012-147063 A | 8/2012 |
| JP | 2012-150804 A | 8/2012 |
| JP | 2012-518847 A | 8/2012 |
| JP | 2012-211932 A | 11/2012 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-517566 A | 5/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-200423 A | 10/2013 |
| JP | 2013-205999 A | 10/2013 |
| JP | 2013-238936 A | 11/2013 |
| JP | 2013-258600 A | 12/2013 |
| JP | 2014-2586 A | 1/2014 |
| JP | 2014-10688 A | 1/2014 |
| JP | 20145-2445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-191272 A | 10/2014 |
| JP | 2014-219614 A | 11/2014 |
| JP | 2014-222514 A | 11/2014 |
| JP | 2015-4928 A | 1/2015 |
| JP | 2015-8001 A | 1/2015 |
| JP | 2015-12301 A | 1/2015 |
| JP | 2015-18365 A | 1/2015 |
| JP | 2015-501022 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-536648 A | 11/2016 |
| JP | 2017-19331 A | 1/2017 |
| JP | 2017-516153 A | 6/2017 |
| JP | 2017-537361 A | 12/2017 |
| JP | 6291147 B1 | 2/2018 |
| JP | 2018-525950 A | 9/2018 |
| KR | 10-2011-0005937 A | 1/2011 |
| KR | 10-2011-0013625 A | 2/2011 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |
| KR | 10-2011-0115134 A | 10/2011 |
| KR | 10-2012-0020164 A | 3/2012 |

(56) References Cited

FOREIGN PATENT DOCUMENTS

| | | |
|---|---|---|
| KR | 10-2012-0031722 A | 4/2012 |
| KR | 10-2012-0066523 A | 6/2012 |
| KR | 10-2012-0082371 A | 7/2012 |
| KR | 10-2012-0084472 A | 7/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0024271 A | 2/2014 |
| KR | 10-2014-0031283 A | 3/2014 |
| KR | 10-2014-0033574 A | 3/2014 |
| KR | 10-2014-0042994 A | 4/2014 |
| KR | 10-2014-0055204 A | 5/2014 |
| KR | 10-2014-0068752 A | 6/2014 |
| KR | 10-2014-0088449 A | 7/2014 |
| KR | 10-2014-0106715 A | 9/2014 |
| KR | 10-2014-0147557 A | 12/2014 |
| KR | 10-2015-0013631 A | 2/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-2015-0095624 A | 8/2015 |
| KR | 10-1555742 B1 | 9/2015 |
| KR | 10-2015-0113127 A | 10/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101198 A | 8/2016 |
| KR | 10-2016-0105847 A | 9/2016 |
| KR | 10-2016-0121585 A | 10/2016 |
| KR | 10-2016-0140694 A | 12/2016 |
| KR | 10-2017-0036805 A | 4/2017 |
| KR | 10-2017-0107058 A | 9/2017 |
| KR | 10-2018-0032632 A | 3/2018 |
| KR | 10-2018-0034637 A | 4/2018 |
| KR | 10-1959328 B1 | 3/2019 |
| TW | 201110108 A | 3/2011 |
| TW | 201142823 A1 | 12/2011 |
| TW | 201227715 A | 7/2012 |
| TW | 201245989 A | 11/2012 |
| TW | 201312548 A | 3/2013 |
| WO | 2008/142472 A1 | 11/2008 |
| WO | 2010/054373 A2 | 5/2010 |
| WO | 2011/028842 A2 | 3/2011 |
| WO | 2011/057346 A1 | 5/2011 |
| WO | 2011/060106 A1 | 5/2011 |
| WO | 2011/082521 A1 | 7/2011 |
| WO | 2011/088053 A2 | 7/2011 |
| WO | 2011/093025 A1 | 8/2011 |
| WO | 2011/100142 A2 | 8/2011 |
| WO | 2011/116309 A1 | 9/2011 |
| WO | 2011/123122 A1 | 10/2011 |
| WO | 2011/133543 A1 | 10/2011 |
| WO | 2011/133573 A2 | 10/2011 |
| WO | 2011/097309 A3 | 12/2011 |
| WO | 2011/150730 A1 | 12/2011 |
| WO | 2011/163350 A1 | 12/2011 |
| WO | 2011/088053 A3 | 1/2012 |
| WO | 2012/008434 A1 | 1/2012 |
| WO | 2012/019020 A1 | 2/2012 |
| WO | 2012/019637 A1 | 2/2012 |
| WO | 2012/063260 A2 | 5/2012 |
| WO | 2012/092562 A1 | 7/2012 |
| WO | 2012/112331 A2 | 8/2012 |
| WO | 2012/129231 A1 | 9/2012 |
| WO | 2012/063260 A3 | 10/2012 |
| WO | 2012/135157 A2 | 10/2012 |
| WO | 2012/154317 A1 | 11/2012 |
| WO | 2012/154748 A1 | 11/2012 |
| WO | 2012/155079 A2 | 11/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/118988 A1 | 8/2013 |
| WO | 2013/122310 A1 | 8/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/047047 A1 | 3/2014 |
| WO | 2014/066352 A1 | 5/2014 |
| WO | 2014/070872 A2 | 5/2014 |
| WO | 2014/078965 A1 | 5/2014 |
| WO | 2014/093339 A1 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/204659 A2 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |

(56) References Cited

FOREIGN PATENT DOCUMENTS

| | | |
|---|---|---|
| WO | 2015/116151 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/213682 A1 | 12/2017 |
| WO | 2017/218194 A1 | 12/2017 |
| WO | 2018/009397 A1 | 1/2018 |
| WO | 2018/213401 A1 | 11/2018 |
| WO | 2018/213415 A1 | 11/2018 |
| WO | 2019/067930 A1 | 4/2019 |
| WO | 2019/078576 A1 | 4/2019 |
| WO | 2019/079017 A1 | 4/2019 |
| WO | 2019/147429 A1 | 8/2019 |
| WO | 2019/236217 A1 | 12/2019 |
| WO | 2020/010530 A1 | 1/2020 |

OTHER PUBLICATIONS

Android Authority, "How to use Tasker: A Beginner's Guide", Online available at: —<https://youtube.com/watch?v=rDpdS_YWzFc>, May 1, 2013, 1 page.
Asakura et al., "What LG thinks; How the TV should be in the Living Room", HiVi, vol. 31, No. 7, Stereo Sound Publishing, Inc., Jun. 17, 2013, pp. 68-71 (Official Copy Only). {See communication under 37 CFR § 1.98(a) (3)}.
Ashingtondctech & Gaming, "SwipeStatusBar—Reveal the Status Bar in a Fullscreen App", Online Available at: <https://www.youtube.com/watch?v=wA_tT9lAreQ>, Jul. 1, 2013, 3 pages.
"Ask Alexa—Things That Are Smart Wiki", Online available at: —<http://thingsthataresmart.wiki/index.php?title=Ask_Alexa&oldid=4283>, Jun. 8, 2016, pp. 1-31.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.
Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
Beointegration.com, "BeoLink Gateway—Programming Example", Online Available at: <https:/ /www.youtube.com/watch?v=TXDaJFm5UH4>, Mar. 4, 2015, 3 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Cambria et al., "Jumping NLP curves: A Review of Natural Language Processing Research.", IEEE Computational Intelligence magazine, 2014, vol. 9, May 2014, pp. 48-57.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen, Yi, "Multimedia Siri Finds and Plays Whatever You Ask For", PSFK Report, Feb. 9, 2012, pp. 1-9.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Coulouris et al., "Distributed Systems: Concepts and Design (Fifth Edition)", Addison-Wesley, 2012, 391 pages.
Czech Lucas, "A System for Recognizing Natural Spelling of English Words", Diploma Thesis, Karlsruhe Institute of Technology, May 7, 2014, 107 pages.
Delcroix et al., "Context Adaptive Deep Neural Networks For Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at: —<https://www.lifewire.com/set-up-google-home-multiple-users-4685691>, Jun. 8, 2020, 9 pages.
Dihelson, "How Can I Use Voice or Phrases as Triggers to Macrodroid?", Macrodroid Forums, Online Available at: —<https://www.tapatalk.com/groups/macrodroid/how-can-i-use-voice-or-phrases-as-triggers-to-macr-t4845.html>, May 9, 2018, 5 pages.
"Directv™ Voice", Now Part of the DIRECTTV Mobile App for Phones, Sep. 18, 2013, 5 pages.
Earthling1984, "Samsung Galaxy Smart Stay Feature Explained", Online available at:—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Filipowicz, Luke, "How to use the QuickType keyboard in iOS 8", Online available at: —<https://www.imore.com/comment/568232>, Oct. 11, 2014, pp. 1-17.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at :—<https://www.youtube.com/watch?v=n6e1WKUS2ww>, Jun. 9, 2016, 1 page.
Gasic et al., "Effective Handling of Dialogue State in the Hidden Information State POMDP-based Dialogue Manager", ACM Transactions on Speech and Language Processing, May 2011, pp. 1-25.
Ghauth et al., "Text Censoring System for Filtering Malicious Content Using Approximate String Matching and Bayesian Filter-

(56) References Cited

OTHER PUBLICATIONS ing", Proc. 4th INNS Symposia Series on Computational Intelligence in Information Systems, Bandar Seri Begawan, Brunei, 2015, pp. 149-158.
Google Developers, "Voice search in your app", Online available at:—<https://www.youtube.com/watch?v=PS1FbB5qWEI>, Nov. 12, 2014, 1 page.
Gupta et al., "I-vector-based Speaker Adaptation of Deep Neural Networks For French Broadcast Audio Transcription", ICASSP, 2014, 2014, pp. 6334-6338.
Gupta, Naresh, "Inside Bluetooth Low Energy", Artech House, 2013, 274 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
"How To Enable Google Assistant on Galaxy S7 and Other Android Phones (No Root)", Online available at:—<https://www.youtube.com/watch?v=HeklQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One For Dummies", 3rd Edition, 2013, 98 pages.
Ikeda, Masaru, "beGLOBAL SEOUL 2015 Startup Battle: Talkey", YouTube Publisher, Online Available at: —<https://www.youtube.com/watch?v=4Wkp7sAAldg>, May 14, 2015, 1 page.
Inews and Tech,"How To Use The QuickType Keyboard In IOS 8", Online available at:—<http://www.inewsandtech.com/how-to-use-the-quicktype-keyboard-in-ios-8/>, Sep. 17, 2014, 6 pages.
Internet Services and Social Net, "How to Search for Similar Websites", Online available at: —<https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.
Isik et al., "Single-Channel Multi-Speaker Separation using Deep Clustering", Interspeech 2016, Sep. 8-12, 2016, pp. 545-549.
Jonsson et al., "Proximity-based Reminders Using Bluetooth", 2014 IEEE International Conference on Pervasive Computing and Communications Demonstrations, 2014, pp. 151-153.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new Al bot on Monday", The Verge, Online available at: —<https://web.archive.org/web/20160505090418/https://www.theverge.com/2016/5/4/11593564/viv-labs-unveiling-monday-new-ai-from-siri-creators>, May 4, 2016, 3 pages.
King et al., "Robust Speech Recognition Via Anchor Word Representations", Interspeech 2017, Aug. 20-24, 2017, pp. 2471-2475.
Lee, Sungjin, "Structured Discriminative Model For Dialog State Tracking", Proceedings of the SIGDIAL 2013 Conference, Aug. 22-24, 2013, pp. 442-451.
"Link Your Voice to Your Devices with Voice Match, Google Assistant Help", Online available at: —<https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Marketing Land,"Amazon Echo: Play music", Online Available at:—<https://www.youtube.com/watch?v=A7V5NPbsXi4>, Apr. 27, 2015, 3 pages.
Mhatre et al., "Donna Interactive Chat-bot acting as a Personal Assistant", International Journal of Computer Applications (0975-8887), vol. 140, No. 10, Apr. 2016, 6 pages.
Mikolov et al., "Linguistic Regularities in Continuous Space Word Representations", Proceedings of NAACL-HLT, Jun. 9-14, 2013, pp. 746-751.
Modern Techies, "Braina-Artificial Personal Assistant for PC(like Cortana,Siri)!!!!", Online available at: <https://www.youtube.com/watch?v=_Coo2P8ilqQ>, Feb. 24, 2017, 3 pages.
Nakamura et al., "Study of Information Clouding Methods to Prevent Spoilers of Sports Match", Proceedings of the International Working Conference on Advanced Visual Interfaces (AVI' 12), ISBN: 978-1-4503-1287-5, May 2012, pp. 661-664.
Nakamura et al., "Study of Methods to Diminish Spoilers of Sports Match: Potential of a Novel Concept "Information Clouding"", vol. 54, No. 4, ISSN: 1882-7764. Online available at: <https://ipsj.ixsq.nii.ac.jp/ej/index.php?active_action=repository_view_main_item_detail&page_id=13&block_id=8&item_id=91589&item_no=1>, Apr. 2013, pp. 1402-1412 (Official Copy Only). {See communication under 37 CFR § 1.98(a) (3)}.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group, Feb. 28, 2011, 11 pages (Official Copy Only). {See communication under 37 CFR § 1.98(a) (3)}.
Notice of Allowance received for Japanese Patent Application No. 2018-136037, dated Dec. 4, 2020, 4 pages (1 page of English Translation and 3 pages of Official Copy).
Nozawa et al., "iPhone 4S Perfect Manual", vol. 1, First Edition, Nov. 11, 2011, 4 pages (Official Copy Only). {See communication under 37 CFR § 1.98(a) (3)}.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch7v=nSkSuXziJSg>, Apr. 11, 2016, 3 pages.
pocketables.com,"AutoRemote example profile", Online available at: https://www.youtube.com/watch?v=kC_zhUnNZj8, Jun. 25, 2013, 1 page.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at: —<https://www.youtube.com/watch?v=0CldLR4fhVU>, Jun. 3, 2014, 3 pages.
Rasch, Katharina, "Smart Assistants for Smart Homes", Doctoral Thesis in Electronic and Computer Systems, 2013, 150 pages.
Ritchie, Rene, "QuickType keyboard in iOS 8: Explained", Online Available at: —<https://www.imore.com/quicktype-keyboards-ios-8-explained>, Jun. 21, 2014, pp. 1-19.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at:—<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.

(56) References Cited

OTHER PUBLICATIONS

Seehafer Brent, "Activate Google Assistant on Galaxy S7 with Screen off", Online available at:—<https://productforums.google.eom/forum/#!topic/websearch/lp3qlGBHLVl>, Mar. 8, 2017, 4 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Simonite, Tom, "Confronting Siri: Microsoft Launches Digital Assistant Cortana", 2014, 2 pages (Official Copy). {See communication under 37 CFR § 1.98(a) (3)}.
Siou, Serge, "How To Control Apple TV 3rd Generation Using Remote app", Online available at: <https://www.youtube.com/watch?v=PhyKftZ0S9M>, May 12, 2014, 3 pages.
Smith, Jake, "Amazon Alexa Calling: How to Set it up and Use it on Your Echo", iGeneration, May 30, 2017, 5 pages.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Sundermeyer et al., "LSTM Neural Networks for Language Modeling", INTERSPEECH 2012, Sep. 9-13, 2012, pp. 194-197.
Tan et al., "Knowledge Transfer In Permutation Invariant Training For Single-channel Multi-talker Speech Recognition", ICASSP 2018, 2018, pp. 5714-5718.
Vaswani et al., "Attention Is All You Need", 31st Conference on Neural Information Processing Systems (NIPS 2017), 2017, pp. 1-11.
Villemure et al., "The Dragon Drive Innovation Showcase: Advancing the State-of-the-art in Automotive Assistants", 2018, 7 pages.
Vodafone Deutschland, "Samsung Galaxy S3 Tastatur Spracheingabe", Online available at —<https://www.youtube.com/watch?v=6kOd6Gr8uFE>, Aug. 22, 2012, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Home Automation", Online Available at: —<https://en.wikipedia.org/w/index.php?title=Home_automation&oldid=686569068>, Oct. 19, 2015, 9 pages.
Wikipedia, "Siri", Online Available at: —<https://en.wikipedia.org/w/index.php?title=Siri&oldid=689697795>, Nov. 8, 2015, 13 Pages.
Wikipedia, "Virtual Assistant", Wikipedia, Online Available at: —<https://en.wikipedia.org/w/index.php?title=Virtual_assistant&oldid=679330666>, Sep. 3, 2015, 4 pages.
X.AI, "How it Works", Online available at: —<https://web.archive.org/web/20160531201426/https://x.ai/how-it-works/>, May 31, 2016, 6 pages.
Xu et al., "Policy Optimization of Dialogue Management in Spoken Dialogue System For Out-of-Domain Utterances", 2016 International Conference on Asian Language Processing (IALP), IEEE, Nov. 21, 2016, pp. 10-13.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Yang Astor, "Control Android TV via Mobile Phone APP RKRemoteControl", Online Available at : <https://www.youtube.com/watch?v=zpmUeOX_xro>, Mar. 31, 2015, 4 pages.

Yates Michaelc., "How Can I Exit Google Assistant After I'm Finished with it", Online available at: —<https://productforums.google.com/forum/#!msg/phone-by-google/faECnR2RJwA/gKNtOkQgAQAJ>, Jan. 11, 2016, 2 pages.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Yousef, Zulfikara., "Braina (A.I) Artificial Intelligence Virtual Personal Assistant", Online available at: —<https://www.youtube.com/watch?v=2h6xpB8bPSA>, Feb. 7, 2017, 3 pages.
Yu et al., "Permutation Invariant Training of Deep Models For Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zmolikova et al., "Speaker-Aware Neural Network Based Beamformer For Speaker Extraction In Speech Mixtures", Interspeech 2017, Aug. 20-24, 2017, pp. 2655-2659.
Board Opinion received for Chinese Patent Application No. 201580029053.9, dated Apr. 8, 2021, 9 pages (2 pages of English Translation and 7 pages of Official Copy).
Adium, "AboutAdium—Adium X—Trac", Online available at: —<http://web.archive.org/web/20070819113247/http://trac.adiumx.com/wiki/AboutAdium>, retrieved on Nov. 25, 2011, 2 pages.
"Alexa, Turn Up the Heat!, Smartthings Samsung [online]", Online available at: —<https://web.archive.org/web/20160329142041/https://blog.smartthings.com/news/smartthingsupdates/alexa-turn-up-the-heat/>, Mar. 3, 2016, 3 pages.
Alfred App, "Alfred", Online available at: —<http://www.alfredapp.com/>, retrieved on Feb. 8, 2012, 5 pages.
Anania Peter, "Amazon Echo with Home Automation (Smartthings)", Online available at: —<https://www.youtube.com/watch?v=LMW6aXmsWNE>, Dec. 20, 2015, 1 page.
Api.Ai, "Android App Review—Speaktoit Assistant", Online available at: —<https://www.youtube.com/watch?v=myE498nyfGw>, Mar. 30, 2011, 3 pages.
Apple, "VoiceOver for Os X", Online available at: —<http://www.apple.com/accessibility/voiceover/>, May 19, 2014, pp. 1-3.
Applicant-Initiated Interview Summary received for U.S. Appl. No. 15/495,861, dated Aug. 25, 2020, 5 pages.
Applicant-Initiated Interview Summary received for U.S. Appl. No. 15/495,861, dated Feb. 10, 2020, 3 pages.
Berry et al., "PTIME: Personalized Assistance for Calendaring", ACM Transactions on Intelligent Systems and Technology, vol. 2, No. 4, Article 40, Jul. 2011, pp. 1-22.
Bertolucci, Jeff, "Google Adds Voice Search to Chrome Browser", PC World, Jun. 14, 2011, 5 pages.
Butcher, Mike, "EVI Arrives in Town to go Toe-to-Toe with Siri", TechCrunch, Jan. 23, 2012, pp. 1-2.
Caraballo et al., "Language Identification Based on a Discriminative Text Categorization Technique", Iberspeech 2012—VII Jornadas En Tecnologia Del Habla and III Iberian Sltech Workshop, Nov. 21, 2012, pp. 1-10.
Castleos, "Whole House Voice Control Demonstration", Online available at: —<https://www.youtube.com/watch?v=9SRCoxrZ_W4>, Jun. 2, 2012, 1 pages.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Cheyer, Adam, "Adam Cheyer—About", Online available at: —<http://www.adam.cheyer.com/about.html>, retrieved on Sep. 17, 2012, pp. 1-2.
Choi et al., "Acoustic and Visual Signal based Context Awareness System for Mobile Application", IEEE Transactions on Consumer Electronics, vol. 57, No. 2, May 2011, pp. 738-746.
Colt, Sam, "Here's One Way Apple's Smartwatch Could Be Better Than Anything Else", Business Insider, Aug. 21, 2014, pp. 1-4.
Decision to Refuse received for European Patent Application No. 15717712.2, dated Jan. 4, 2019, 11 pages.

(56) References Cited

OTHER PUBLICATIONS

Deedeevuu, "Amazon Echo Alarm Feature", Online available at: —<https://www.youtube.com/watch?v=fdjU8eRLk7c>, Feb. 16, 2015, 1 page.
Evi, "Meet Evi: The One Mobile Application that Provides Solutions for your Everyday Problems", Feb. 2012, 3 pages.
Extended European Search Report received for European Patent Application No. 19160560.9, dated May 17, 2019, 8 pages.
Final Office Action received for U.S. Appl. No. 15/495,861, dated Nov. 18, 2019, 16 pages.
Findlater et al., "Beyond QWERTY: Augmenting Touch-Screen Keyboards with Multi-Touch Gestures for Non-Alphanumeric Input", CHI '12, May 5-10, 2012, 4 pages.
Gannes, Liz, "Alfred App Gives Personalized Restaurant Recommendations", AllThingsD, Jul. 18, 2011, pp. 1-3.
Guay, Matthew, "Location-Driven Productivity with Task Ave", Online available at: —<http://iphone.appstorm.net/reviews/productivity/location-driven-productivity-with-task-ave/>, Feb. 19, 2011, 7 pages.
Guim, Mark, "How to Set a Person-Based Reminder with Cortana", Online available at: —<http://www.wpcentral.com/how-to-person-based-reminder-cortana>, Apr. 26, 2014, 15 pages.
Hardawar, Devindra, "Driving App Waze Builds its own Siri for Hands-Free Voice Control", Online available at: —<http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co., Ltd., vol. 1, Jul. 5, 2012, pp. 8, 130, 131.
"Headset Button Controller v7.3 APK Full APP Download for Andriod, Blackberry, iPhone", Online available at: —<http://fullappdownload.com/headset-button-controller-v7-3-apk/>, Jan. 27, 2014, 11 pages.
"Hear Voice from Google Translate", Online available at: —<https://www.youtube.com/watch?v=18AvMhFqD28>, Jan. 28, 2011, 1 page.
id3.org, "id3v2.4.0-Frames", Online available at: —<http://id3.org/id3v2.4.0-frames?action=print>, retrieved on Jan. 22, 2015, pp. 1-41.
"Interactive Voice", Online available at: —<http://www.helloivee.com/company/>, retrieved on Feb. 10, 2014, 2 pages.
International Preliminary Report on Patentability received for PCT Patent Application No. PCT/US2015/023089, dated Jan. 12, 2017, 12 pages.
International Search Report and Written Opinion received for PCT Patent Application No. PCT/US2015/023089, dated Aug. 20, 2015, 16 pages.
Invitation to Pay Additional Fees and Partial Search Report received for PCT Patent Application No. PCT/US2015/023089, dated Jun. 17, 2015, 7 pages.
Jawaid et al., "Machine Translation with Significant Word Reordering and Rich Target-Side Morphology", WDS'11 Proceedings of Contributed Papers, Part I, 2011, pp. 161-166.
Jouvet et al., "Evaluating Grapheme-to-phoneme Converters in Automatic Speech Recognition Context", IEEE, 2012, pp. 4821-4824.
Kazmucha Allyson, "How to Send Map Locations Using iMessage", iMore.com, Online available at: —<http://www.imore.com/how-use-imessage-share-your-location-your-iphone>, Aug. 2, 2012, 6 pages.
Kickstarter, "Ivee Sleek: Wi-Fi Vo ice-Activated Assistant", Online available at: —<https://www.kickstarter.com/projects/ivee/ivee-sleek-wi-fi-voice-activated-assistant>, retrieved on Feb. 10, 2014, pp. 1-13.
Lewis Cameron, "Task Ave for iPhone Review", Mac Life, Online available at: —<http://www.maclife.com/article/reviews/task_ave_iphone_review>, Mar. 3, 2011, 5 pages.
"Meet Ivee, Your Wi-Fi Voice Activated Assistant", Availale Online at: —<http://www.helloivee.com/>, retrieved on Feb. 10, 2014, 8 pages.
Miller Chance, "Google Keyboard Updated with New Personalized Suggestions Feature", Online available at: —<http://9to5google.com/2014/03/19/google-keyboard-updated-with-new-personalized-suggestions-feature/>, Mar. 19, 2014, 4 pages.
"Mobile Speech Solutions, Mobile Accessibility", SVOX AG Product Information Sheet, Online available at: —<http://www.svox.com/site/bra840604/con782768/mob965831936.aSQ?osLang=1>, Sep. 27, 2012, 1 page.
Morrison Jonathan, "iPhone 5 Siri Demo", Online Available at: —<https://www.youtube.com/watch?v=_wHWwG5lhWc>, Sep. 21, 2012, 3 pages.
My Cool Aids, "What's New", Online available at: —<http://www.mycoolaids.com/>, 2012, 1 page.
Myers, Brad A., "Shortcutter for Palm", Online Available at: —<http://www.cs.cmu.edu/~pebbles/v5/shortcutter/palm/index.html>, retrieved on Jun. 18, 2014, 10 pages.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony Smartwatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 15/085,465, dated Jul. 28, 2016, 5 pages.
Non-Final Office Action received for U.S. Appl. No. 15/495,861, dated Apr. 30, 2020, 15 pages.
Non-Final Office Action received for U.S. Appl. No. 15/495,861, dated Jun. 14, 2018, 11 pages.
Non-Final Office Action received for U.S. Appl. No. 15/495,861, dated Mar. 1, 2019, 26 pages.
Notice of Acceptance received for Australian Patent Application No. 2015284755, dated Oct. 19, 2017, 3 pages.
Notice of Acceptance received for Australian Patent Application No. 2018200679, dated Jan. 29, 2020, 3 pages.
Notice of Allowance received for Taiwan Patent Application No. 104113312, dated Jan. 18, 2017, 3 pages.
Notice of Allowance received for U.S. Appl. No. 14/498,503, dated Dec. 18, 2015, 8 pages.
Notice of Allowance received for U.S. Appl. No. 14/498,503, dated Feb. 26, 2016, 8 pages.
Notice of Allowance received for U.S. Appl. No. 15/085,465, dated Feb. 14, 2017, 9 pages.
Notice of Allowance received for U.S. Appl. No. 15/495,861, dated Sep. 18, 2020, 8 pages.
Office Action received for Australian Patent Application No. 2015284755, dated Oct. 21, 2016, 2 pages.
Office Action received for Australian Patent Application No. 2018200679, dated Jan. 29, 2019, 3 pages.
Office Action received for Australian Patent Application No. 2018200679, dated Nov. 14, 2019, 3 pages.
Office Action received for Chinese Patent Application No. 201580029053.9, dated Aug. 22, 2019, 18 pages.
Office Action received for Chinese Patent Application No. 201580029053.9, dated Dec. 2, 2019, 14 pages.
Office Action received for Chinese Patent Application No. 201580029053.9, dated Jan. 29, 2019, 16 pages.
Office Action received for European Patent Application No. 15717712.2, dated Sep. 11, 2017, 10 pages.
Office Action received for European Patent Application No. 19160560.9, dated Jun. 9, 2020, 6 pages.
Office Action received for Japanese Patent Application No. 2016-568608, dated Jun. 20, 2017, 7 pages.
Office Action received for Japanese Patent Application No. 2016-568608, dated Mar. 19, 2018, 6 pages.
Office Action received for Japanese Patent Application No. 2018-136037, dated Jul. 29, 2019, 5 pages.
Office Action received for Japanese Patent Application No. 2018-136037, dated Mar. 30, 2020, 6 pages.
Office Action received for Taiwan Patent Application No. 104113312, dated Jan. 25, 2016, 10 pages.
OSXDAILY, "Get a List of Siri Commands Directly from Siri", Online available at: —<http://osxdaily.com/2013/02/05/list-siri-commands/>, Feb. 5, 2013, 15 pages.
Pathak et al., "Privacy-preserving Speech Processing: Cryptographic and String-matching Frameworks Show Promise", In: IEEE

(56) References Cited

OTHER PUBLICATIONS signal processing magazine, Online available at: —<http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Rios Mafe, "New Bar Search for Facebook", YouTube, available at: —<https://www.youtube.com/watch?v=vwgN1WbvCas>, Jul. 19, 2013, 2 pages.
Routines, "SmartThings Support", Online available at: —<https://web.archive.org/web/20151207165701/https://support.smartthings.com/hc/en-us/articles/205380034-Routines>, 2015, 3 pages.
Sarawagi Sunita, "CRF Package Page", Online available at: —<http://crf.sourceforge.net/>, retrieved on Apr. 6, 2011, 2 pages.
Simonite, Tom, "One Easy Way to Make Siri Smarter", Technology Review, Oct. 18, 2011, 2 pages.
"Skilled at Playing my iPhone 5", Beijing Hope Electronic Press, Jan. 2013, 6 pages.
"SmartThings +Amazon Echo", Smartthings Samsung [online], Online available at: —<https://web.archive.org/web/20160509231428/https://blog.smartthings.com/featured/alexa-turn-on-my-smartthings/>, Aug. 21, 2015, 3 pages.
SRI, "SRI Speech: Products: Software Development Kits: EduSpeak", Online available at: —<http://web.archive.org/web/20090828084033/http://www.speechatsri.com/products/eduspeak>shtml, retrieved on Jun. 20, 2013, pp. 1-2.
Sullivan Danny, "How Google Instant's Autocomplete Suggestions Work", Online available at: —<http://searchengineland.com/how-google-instant-autocomplete-suggestions-work-62592>, Apr. 6, 2011, 12 pages.
Summon to Attend Oral Proceedings received for European Patent Application No. 15717712.2, dated Apr. 16, 2018, 2 pages.
Summon to Attend Oral Proceedings received for European Patent Application No. 15717712.2, dated Mar. 19, 2018, 9 pages.
Sundaram et al., "Latent Perceptual Mapping with Data-Driven Variable-Length Acoustic Units for Template-Based Speech Recognition", ICASSP 2012, Mar. 2012, pp. 4125-4128.
Tofel et al., "SpeakToit: A Personal Assistant for Older iPhones, iPads", Apple News, Tips and Reviews, Feb. 9, 2012, 7 pages.
Tucker Joshua, "Too Lazy to Grab Your TV Remote? Use Siri Instead", Engadget, Nov. 30, 2011, pp. 1-8.
Wikipedia, "Acoustic Model", Online available at: —<http://en.wikipedia.org/wiki/AcousticModel>, retrieved on Sep. 14, 2011, pp. 1-2.
Wikipedia, "Language Model", Online available at: —<http://en.wikipedia.org/wiki/Language_model>, retrieved on Sep. 14, 2011, 4 pages.
Wikipedia, "Speech Recognition", Online available at: —<http://en.wikipedia.org/wiki/Speech_recognition>, retrieved on Sep. 14, 2011, 12 pages.
Xiang et al., "Correcting Phoneme Recognition Errors in Learning Word Pronunciation through Speech Interaction", Speech Communication, vol. 55, No. 1, Jan. 1, 2013, pp. 190-203.
Ye et al., "iPhone 4S Native Secret", Jun. 30, 2012, 1 page.
Zainab, "Google Input Tools Shows Onscreen Keyboard in Multiple Languages [Chrome]", Online available at: —<http://www.addictivetips.com/internet-tips/google-input-tools-shows-multiple-language-onscreen-keyboards-chrome/>, Jan. 3, 2012, 3 pages.
Zangerle et al., "Recommending #—Tags in Twitter", proceedings of the Workshop on Semantic Adaptive Socail Web, 2011, pp. 1-12.
Zhan et al., "Play with Android Phones", Feb. 29, 2012, 1 page.
Zhong et al., "JustSpeak: Enabling Universal Voice Control on Android", W4A'14, Proceedings of the 11th Web for All Conference, No. 36, Apr. 7-9, 2014, 8 pages.
Office Action received for European Patent Application No. 19160560.9, dated Jul. 16, 2021, 5 pages.
Office Action received for Australian Patent Application No. 2020203023, dated Apr. 22, 2021, 3 pages.
Office Action received for Japanese Patent Application No. 2020-215571, dated Apr. 23, 2021, 4 pages (2 pages of English Translation and 2 pages of Official Copy).
Office Action received for Japanese Patent Application No. 2020-215571, dated Oct. 15, 2021, 3 pages (1 page of English Translation and 2 pages of Official Copy).
Board Decision received for Chinese Patent Application No. 201580029053.9, dated Aug. 19, 2021, 15 pages (1 page of English Translation and 14 pages of Official Copy).
Office Action received for Australian Patent Application No. 2020203023, dated Sep. 16, 2021, 5 pages.
Notice of Allowance received for Japanese Patent Application No. 2020-215571, dated Mar. 18, 2022, 4 pages (1 page of English Translation and 3 pages of Official Copy).
Office Action received for Australian Patent Application No. 2020203023, dated Mar. 22, 2022 4 pages.
Notice of Acceptance received for Australian Patent Application No. 2020203023, dated Apr. 8, 2022, 3 pages.

\* cited by examiner

INTELLIGENT AUTOMATED ASSISTANT FOR TV USER INTERACTIONS

CROSS-REFERENCE TO RELATED APPLICATIONS

This application is a continuation of U.S. patent application Ser. No. 15/495,861, filed Apr. 24, 2017, which is continuation of U.S. patent application Ser. No. 15/085,465, filed Mar. 30, 2016, now U.S. Pat. No. 9,668,024, issued May 30, 2017, which is a continuation of U.S. patent application Ser. No. 14/498,503, filed Sep. 26, 2014, now U.S. Pat. No. 9,338,493, issued May 10, 2016, which claims priority from U.S. Provisional Ser. No. 62/019,312, filed on Jun. 30, 2014, which are hereby each incorporated by reference in their entirety for all purposes.

This application also relates to the following provisional application: U.S. Patent Application Ser. No. 62/019,292, "Real-time Digital Assistant Knowledge Updates," filed Jun. 30, 2014, which is hereby incorporated by reference in its entirety.

FIELD

This relates generally to controlling television user interactions and, more specifically, to processing speech for a virtual assistant to control television user interactions.

BACKGROUND

Intelligent automated assistants (or virtual assistants) provide an intuitive interface between users and electronic devices. These assistants can allow users to interact with devices or systems using natural language in spoken and/or text forms. For example, a user can access the services of an electronic device by providing a spoken user input in natural language form to a virtual assistant associated with the electronic device. The virtual assistant can perform natural language processing on the spoken user input to infer the user's intent and operationalize the user's intent into tasks. The tasks can then be performed by executing one or more functions of the electronic device, and, in some examples, a relevant output can be returned to the user in natural language form.

While mobile telephones (e.g., smartphones), tablet computers, and the like have benefitted from virtual assistant control, many other user devices lack such convenient control mechanisms. For example, user interactions with media control devices (e.g., televisions, television set-top boxes, cable boxes, gaming devices, streaming media devices, digital video recorders, etc.) can be complicated and difficult to learn. Moreover, with the growing sources of media available through such devices (e.g., over-the-air TV, subscription TV service, streaming video services, cable on-demand video services, web-based video services, etc.), it can be cumbersome or even overwhelming for some users to find desired media content to consume. As a result, many media control devices can provide an inferior user experience that can be frustrating for many users.

SUMMARY

Systems and processes are disclosed for controlling television interactions using a virtual assistant. In one example, speech input can be received from a user. Media content can be determined based on the speech input. A first user interface having a first size can be displayed, and the first user interface can include selectable links to the media content. A selection of one of the selectable links can be received. In response to the selection, a second user interface can be displayed having a second size larger than the first size, and the second user interface can include the media content associated with the selection.

In another example, speech input can be received from a user at a first device having a first display. A user intent of the speech input can be determined based on content displayed on the first display. Media content can be determined based on the user intent. The media content can be played on a second device associated with a second display.

In another example, speech input can be received from a user, and the speech input can include a query associated with content shown on a television display. A user intent of the query can be determined based on the content shown on the television display and/or a viewing history of media content. A result of the query can be displayed based on the determined user intent.

In another example, media content can be displayed on a display. An input can be received from a user. Virtual assistant queries can be determined based on the media content and/or a viewing history of media content. The virtual assistant queries can be displayed on the display.

DETAILED DESCRIPTION

Figure 1:
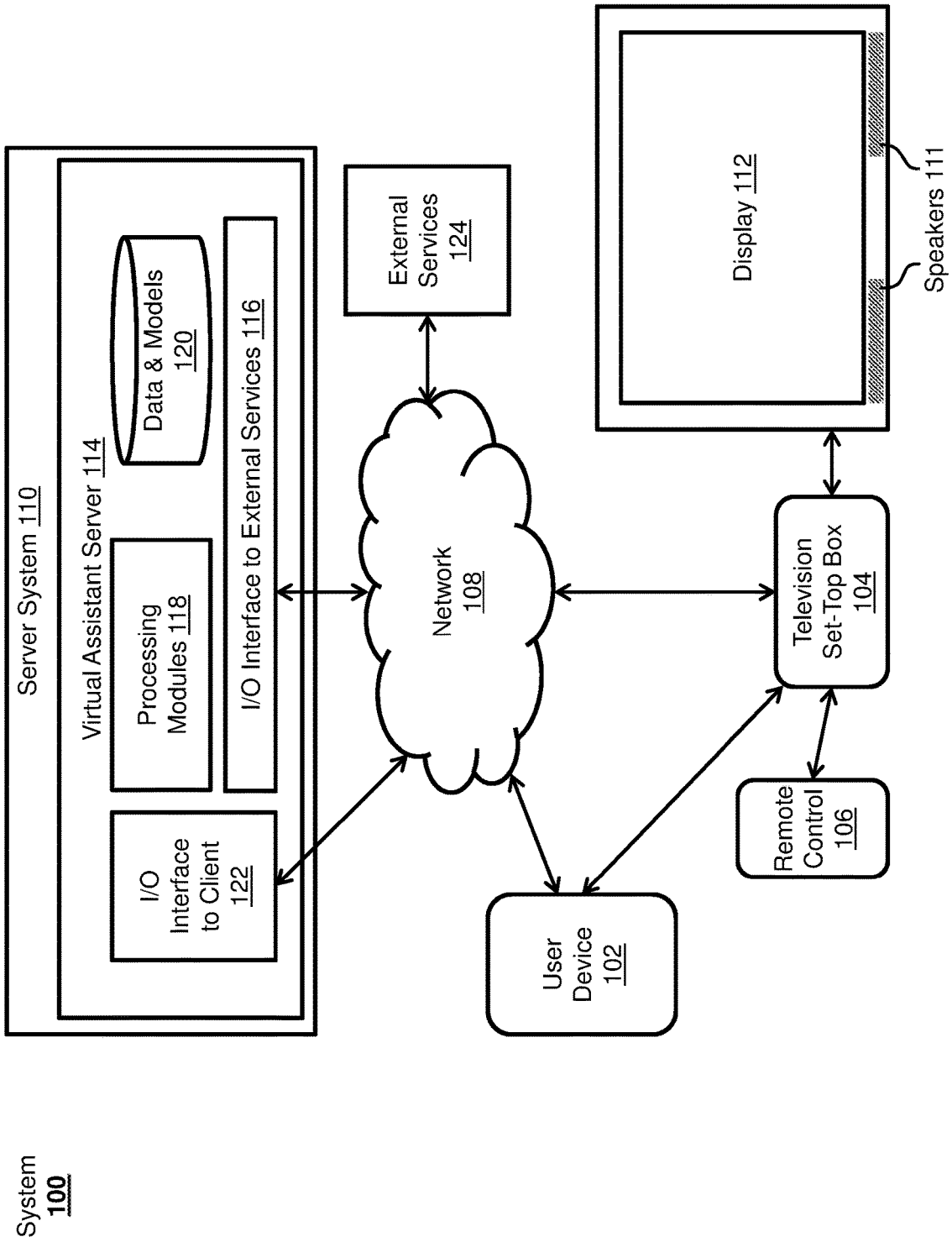
FIG. 1 illustrates an exemplary system for controlling television user interaction using a virtual assistant.

In the following description of examples, reference is made to the accompanying drawings in which it is shown by way of illustration specific examples that can be practiced. It is to be understood that other examples can be used and structural changes can be made without departing from the scope of the various examples.

This relates to systems and processes for controlling television user interactions using a virtual assistant. In one example, a virtual assistant can be used to interact with a media control device, such as a television set-top box controlling content shown on a television display. A mobile user device or a remote control with a microphone can be used to receive speech input for the virtual assistant. The user's intent can be determined from the speech input, and the virtual assistant can execute tasks according to the user's intent, including causing playback of media on a connected television and controlling any other functions of a television set-top box or like device (e.g., managing video recordings, searching for media content, navigating menus, etc.).

Virtual assistant interactions can be shown on a connected television or other display. In one example, media content can be determined based on speech input received from a user. A first user interface with a first small size can be displayed, including selectable links to the determined media content. After receiving a selection of a media link, a second user interface with a second larger size can be displayed, including the media content associated with the selection. In other examples, the interface used to convey virtual assistant interactions can expand or contract to occupy a minimal amount of space while conveying desired information.

In some examples, multiple devices associated with multiple displays can be used to determine user intent from speech input as well as to convey information to users in different ways. For example, speech input can be received from a user at a first device having a first display. The user's intent can be determined from the speech input based on content displayed on the first display. Media content can be determined based on the user intent, and the media content can be played on a second device associated with a second display.

Television display content can also be used as contextual input for determining user intent from speech input. For example, speech input can be received from a user, including a query associated with content shown on a television display. The user intent of the query can be determined based on the content shown on the television display as well as a viewing history of media content on the television display (e.g., disambiguating the query based on characters in a playing TV show). The results of the query can then be displayed based on the determined user intent.

In some examples, virtual assistant query suggestions can be provided to the user (e.g., to acquaint the user with available commands, suggest interesting content, etc.). For example, media content can be shown on a display, and an input can be received from the user requesting virtual assistant query suggestions. Virtual assistant queries suggestions can be determined based on the media content shown on the display and a viewing history of media content shown on the display (e.g., suggesting queries related to a playing TV show). The suggested virtual assistant queries can then be shown on the display.

Controlling television user interactions using a virtual assistant according to the various examples discussed herein can provide an efficient and enjoyable user experience. User interactions with media control devices can be intuitive and simple using a virtual assistant capable of receiving natural language queries or commands. Available functions can be suggested to users as desired, including meaningful query suggestions based on playing content, which can aid users to learn control capabilities. In addition, available media can be made easily accessible using intuitive spoken commands. It should be understood, however, that still many other advantages can be achieved according to the various examples discussed herein.

FIG. 1 illustrates exemplary system 100 for controlling television user interaction using a virtual assistant. It should be understood that controlling television user interaction as discussed herein is merely one example of controlling media on one type of display technology and is used for reference, and the concepts discussed herein can be used for controlling any media content interactions generally, including on any of a variety of devices and associated displays (e.g., monitors, laptop displays, desktop computer displays, mobile user device displays, projector displays, etc.). The term "television" can thus refer to any type of display associated with any of a variety of devices. Moreover, the terms "virtual assistant," "digital assistant," "intelligent automated assistant," or "automatic digital assistant" can refer to any information processing system that can interpret natural language input in spoken and/or textual form to infer user intent, and perform actions based on the inferred user intent. For example, to act on an inferred user intent, the system can perform one or more of the following: identifying a task flow with steps and parameters designed to accomplish the inferred user intent; inputting specific requirements from the inferred user intent into the task flow; executing the task flow by invoking programs, methods, services, APIs, or the like; and generating output responses to the user in an audible (e.g., spoken) and/or visual form.

A virtual assistant can be capable of accepting a user request at least partially in the form of a natural language command, request, statement, narrative, and/or inquiry. Typically, the user request seeks either an informational answer or performance of a task by the virtual assistant (e.g., causing display of particular media). A satisfactory response to the user request can include provision of the requested informational answer, performance of the requested task, or a combination of the two. For example, a user can ask the virtual assistant a question, such as "Where am I right now?" Based on the user's current location, the virtual assistant can answer, "You are in Central Park." The user can also request the performance of a task, for example, "Please remind me to call Mom at 4 p.m. today." In response, the virtual assistant can acknowledge the request and then create an appropriate reminder item in the user's electronic schedule. During the performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms (e.g., as text, alerts, music, videos, animations, etc.). Moreover, as discussed herein, an exemplary virtual assistant can control playback of media content (e.g., playing video on a television) and cause information to be displayed on a display.

An example of a virtual assistant is described in Applicants' U.S. Utility application Ser. No. 12/987,982 for "Intelligent Automated Assistant," filed Jan. 10, 2011, the entire disclosure of which is incorporated herein by reference.

As shown in FIG. 1, in some examples, a virtual assistant can be implemented according to a client-server model. The virtual assistant can include a client-side portion executed on a user device 102 and a server-side portion executed on a server system 110. The client-side portion can also be executed on television set-top box 104 in conjunction with remote control 106. User device 102 can include any electronic device, such as a mobile phone (e.g., smartphone), tablet computer, portable media player, desktop computer, laptop computer, PDA, wearable electronic device (e.g., digital glasses, wristband, wristwatch, brooch, armband, etc.), or the like. Television set-top box 104 can include any media control device, such as a cable box, satellite box, video player, video streaming device, digital video recorder, gaming system, DVD player, Blu-ray Disc™ Player, a combination of such devices, or the like. Television set-top box 104 can be connected to display 112 and speakers 111 via a wired or wireless connection. Display 112 (with or without speakers 111) can be any type of display, such as a television display, monitor, projector, or the like. In some examples, television set-top box 104 can connect to an audio system (e.g., audio receiver), and speakers 111 can be separate from display 112. In other examples, display 112, speakers 111, and television set-top box 104 can be incorporated together in a single device, such as a smart television with advanced processing and network connectivity capabilities. In such examples, the functions of television set-top box 104 can be executed as an application on the combined device.

In some examples, television set-top box 104 can function as a media control center for multiple types and sources of media content. For example, television set-top box 104 can facilitate user access to live television (e.g., over-the-air, satellite, or cable television). As such, television set-top box 104 can include cable tuners, satellite tuners, or the like. In some examples, television set-top box 104 can also record television programs for later time-shifted viewing. In other examples, television set-top box 104 can provide access to one or more streaming media services, such as cable-delivered on-demand television shows, videos, and music as well as Internet-delivered television shows, videos, and music (e.g., from various free, paid, and subscription-based streaming services). In still other examples, television set-top box 104 can facilitate playback or display of media content from any other source, such as displaying photos from a mobile user device, playing videos from a coupled storage device, playing music from a coupled music player, or the like. Television set-top box 104 can also include various other combinations of the media control features discussed herein, as desired.

User device 102 and television set-top box 104 can communicate with server system 110 through one or more networks 108, which can include the Internet, an intranet, or any other wired or wireless public or private network. In addition, user device 102 can communicate with television set-top box 104 through network 108 or directly through any other wired or wireless communication mechanisms (e.g., Bluetooth, Wi-Fi, radio frequency, infrared transmission, etc.). As illustrated, remote control 106 can communicate with television set-top box 104 using any type of communication, such as a wired connection or any type of wireless communication (e.g., Bluetooth, Wi-Fi, radio frequency, infrared transmission, etc.), including via network 108. In some examples, users can interact with television set-top box 104 through user device 102, remote control 106, or interface elements integrated within television set-top box 104 (e.g., buttons, a microphone, a camera, a joystick, etc.). For example, speech input including media-related queries or commands for the virtual assistant can be received at user device 102 and/or remote control 106, and the speech input can be used to cause media-related tasks to be executed on television set-top box 104. Likewise, tactile commands for controlling media on television set-top box 104 can be received at user device 102 and/or remote control 106 (as well as from other devices not shown). The various functions of television set-top box 104 can thus be controlled in a variety of ways, giving users multiple options for controlling media content from multiple devices.

The client-side portion of the exemplary virtual assistant executed on user device 102 and/or television set-top box 104 with remote control 106 can provide client-side functionalities, such as user-facing input and output processing and communications with server system 110. Server system 110 can provide server-side functionalities for any number of clients residing on a respective user device 102 or respective television set-top box 104.

Server system 110 can include one or more virtual assistant servers 114 that can include a client-facing I/O interface 122, one or more processing modules 118, data and model storage 120, and an I/O interface to external services 116. The client-facing I/O interface 122 can facilitate the client-facing input and output processing for virtual assistant server 114. The one or more processing modules 118 can utilize data and model storage 120 to determine the user's intent based on natural language input, and can perform task execution based on inferred user intent. In some examples, virtual assistant server 114 can communicate with external services 124, such as telephony services, calendar services, information services, messaging services, navigation services, television programming services, streaming media services, and the like, through network(s) 108 for task completion or information acquisition. The I/O interface to external services 116 can facilitate such communications.

Server system 110 can be implemented on one or more standalone data processing devices or a distributed network of computers. In some examples, server system 110 can employ various virtual devices and/or services of third-party service providers (e.g., third-party cloud service providers) to provide the underlying computing resources and/or infrastructure resources of server system 110.

Although the functionality of the virtual assistant is shown in FIG. 1 as including both a client-side portion and a server-side portion, in some examples, the functions of an assistant (or speech recognition and media control in general) can be implemented as a standalone application installed on a user device, television set-top box, smart television, or the like. In addition, the division of functionalities between the client and server portions of the virtual assistant can vary in different examples. For instance, in some examples, the client executed on user device 102 or television set-top box 104 can be a thin client that provides only user-facing input and output processing functions, and delegates all other functionalities of the virtual assistant to a backend server.

Figure 2:
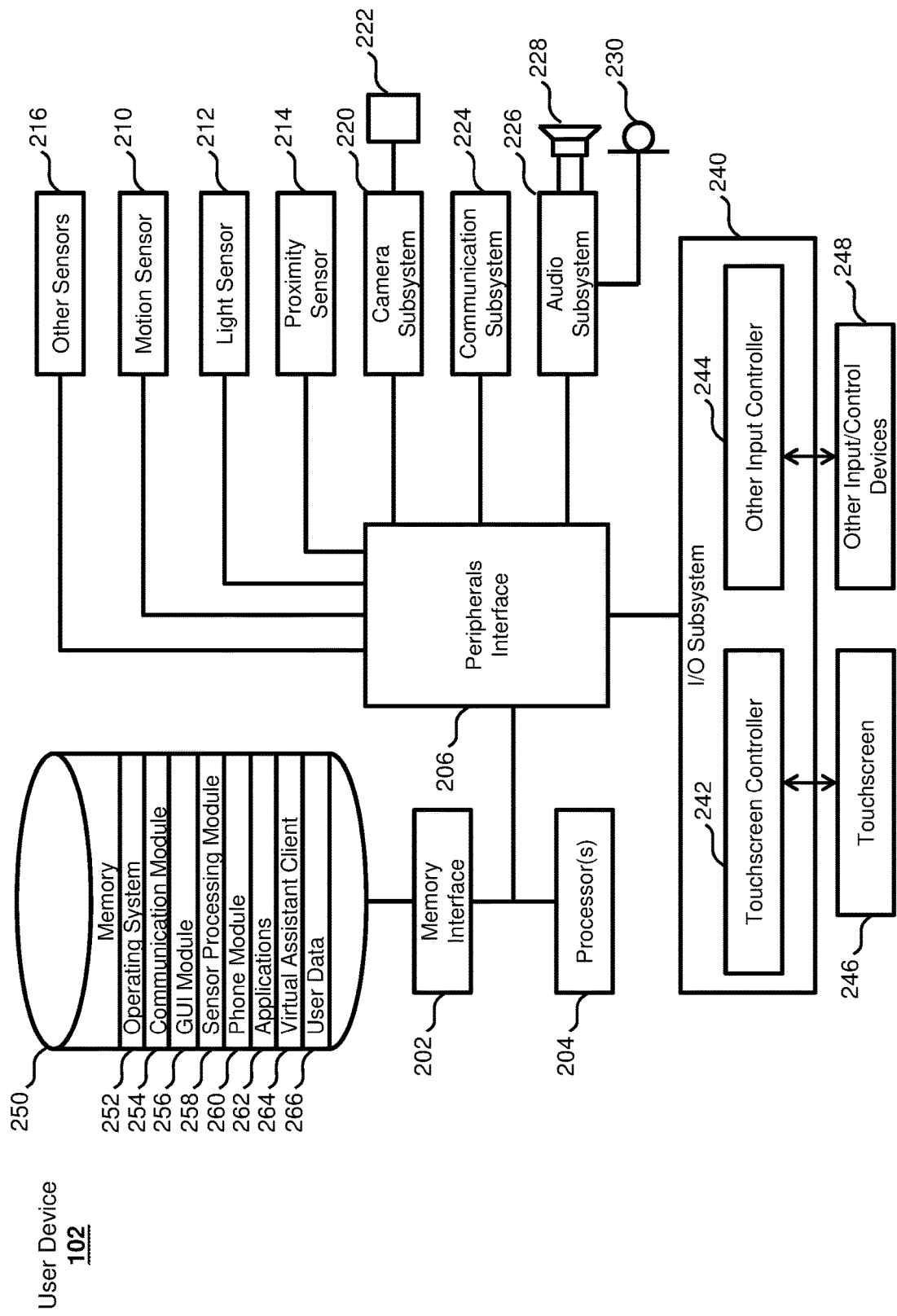
FIG. 2 illustrates a block diagram of an exemplary user device according to various examples.

FIG. 2 illustrates a block diagram of exemplary user device 102 according to various examples. As shown, user device 102 can include a memory interface 202, one or more processors 204, and a peripherals interface 206. The various components in user device 102 can be coupled together by one or more communication buses or signal lines. User device 102 can further include various sensors, subsystems, and peripheral devices that are coupled to the peripherals interface 206. The sensors, subsystems, and peripheral devices can gather information and/or facilitate various functionalities of user device 102.

For example, user device 102 can include a motion sensor 210, a light sensor 212, and a proximity sensor 214 coupled to peripherals interface 206 to facilitate orientation, light, and proximity sensing functions. One or more other sensors 216, such as a positioning system (e.g., a GPS receiver), a temperature sensor, a biometric sensor, a gyroscope, a compass, an accelerometer, and the like, can also be connected to peripherals interface 206, to facilitate related functionalities.

In some examples, a camera subsystem 220 and an optical sensor 222 can be utilized to facilitate camera functions, such as taking photographs and recording video clips. Communication functions can be facilitated through one or more wired and/or wireless communication subsystems 224, which can include various communication ports, radio frequency receivers and transmitters, and/or optical (e.g., infrared) receivers and transmitters. An audio subsystem 226 can be coupled to speakers 228 and microphone 230 to facilitate voice-enabled functions, such as voice recognition, voice replication, digital recording, and telephony functions.

In some examples, user device 102 can further include an I/O subsystem 240 coupled to peripherals interface 206. I/O subsystem 240 can include a touchscreen controller 242 and/or other input controller(s) 244. Touchscreen controller 242 can be coupled to a touchscreen 246. Touchscreen 246 and the touchscreen controller 242 can, for example, detect contact and movement or break thereof using any of a plurality of touch sensitivity technologies, such as capacitive, resistive, infrared, and surface acoustic wave technologies; proximity sensor arrays; and the like. Other input controller(s) 244 can be coupled to other input/control devices 248, such as one or more buttons, rocker switches, a thumb-wheel, an infrared port, a USB port, and/or a pointer device, such as a stylus.

In some examples, user device 102 can further include a memory interface 202 coupled to memory 250. Memory 250 can include any electronic, magnetic, optical, electromagnetic, infrared, or semiconductor system, apparatus, or device; a portable computer diskette (magnetic); a random access memory (RAM) (magnetic); a read-only memory (ROM) (magnetic); an erasable programmable read-only memory (EPROM) (magnetic); a portable optical disc such as CD, CD-R, CD-RW, DVD, DVD-R, or DVD-RW; or flash memory such as compact flash cards, secured digital cards, USB memory devices, memory sticks, and the like. In some examples, a non-transitory computer-readable storage medium of memory 250 can be used to store instructions (e.g., for performing portions or all of the various processes described herein) for use by or in connection with an instruction execution system, apparatus, or device, such as a computer-based system, processor-containing system, or other system that can fetch the instructions from the instruction execution system, apparatus, or device, and can execute the instructions. In other examples, the instructions (e.g., for performing portions or all of the various processes described herein) can be stored on a non-transitory computer-readable storage medium of server system 110, or can be divided between the non-transitory computer-readable storage medium of memory 250 and the non-transitory computer-readable storage medium of server system 110. In the context of this document, a "non-transitory computer-readable storage medium" can be any medium that can contain or store the program for use by or in connection with the instruction execution system, apparatus, or device.

In some examples, memory 250 can store an operating system 252, a communication module 254, a graphical user interface module 256, a sensor processing module 258, a phone module 260, and applications 262. Operating system 252 can include instructions for handling basic system services and for performing hardware-dependent tasks.

Communication module 254 can facilitate communicating with one or more additional devices, one or more computers, and/or one or more servers. Graphical user interface module 256 can facilitate graphical user interface processing. Sensor processing module 258 can facilitate sensor-related processing and functions. Phone module 260 can facilitate phone-related processes and functions. Application module 262 can facilitate various functionalities of user applications, such as electronic messaging, web browsing, media processing, navigation, imaging, and/or other processes and functions.

As described herein, memory 250 can also store client-side virtual assistant instructions (e.g., in a virtual assistant client module 264) and various user data 266 (e.g., user-specific vocabulary data, preference data, and/or other data such as the user's electronic address book, to-do lists, shopping lists, television program favorites, etc.) to, for example, provide the client-side functionalities of the virtual assistant. User data 266 can also be used in performing speech recognition in support of the virtual assistant or for any other application.

In various examples, virtual assistant client module 264 can be capable of accepting voice input (e.g., speech input), text input, touch input, and/or gestural input through various user interfaces (e.g., I/O subsystem 240, audio subsystem 226, or the like) of user device 102. Virtual assistant client module 264 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 264 can communicate with the virtual assistant server using communication subsystem 224.

In some examples, virtual assistant client module 264 can utilize the various sensors, subsystems, and peripheral devices to gather additional information from the surrounding environment of user device 102 to establish a context associated with a user, the current user interaction, and/or the current user input. Such context can also include information from other devices, such as from television set-top box 104. In some examples, virtual assistant client module 264 can provide the contextual information or a subset thereof with the user input to the virtual assistant server to help infer the user's intent. The virtual assistant can also use the contextual information to determine how to prepare and deliver outputs to the user. The contextual information can further be used by user device 102 or server system 110 to support accurate speech recognition.

In some examples, the contextual information that accompanies the user input can include sensor information, such as lighting, ambient noise, ambient temperature, images or videos of the surrounding environment, distance to another object, and the like. The contextual information can further include information associated with the physical state of user device 102 (e.g., device orientation, device location, device temperature, power level, speed, acceleration, motion patterns, cellular signal strength, etc.) or the software state of user device 102 (e.g., running processes, installed programs, past and present network activities, background services, error logs, resources usage, etc.). The contextual information can further include information associated with the state of connected devices or other devices associated with the user (e.g., media content displayed by television set-top box 104, media content available to television set-top box 104, etc.). Any of these types of contextual information can be provided to virtual assistant server 114 (or used on user device 102 itself) as contextual information associated with a user input.

In some examples, virtual assistant client module 264 can selectively provide information (e.g., user data 266) stored on user device 102 in response to requests from virtual assistant server 114 (or it can be used on user device 102 itself in executing speech recognition and/or virtual assistant functions). Virtual assistant client module 264 can also elicit additional input from the user via a natural language dialogue or other user interfaces upon request by virtual assistant server 114. Virtual assistant client module 264 can pass the additional input to virtual assistant server 114 to help virtual assistant server 114 in intent inference and/or fulfillment of the user's intent expressed in the user request.

In various examples, memory 250 can include additional instructions or fewer instructions. Furthermore, various functions of user device 102 can be implemented in hardware and/or in firmware, including in one or more signal processing and/or application specific integrated circuits.

Figure 3:
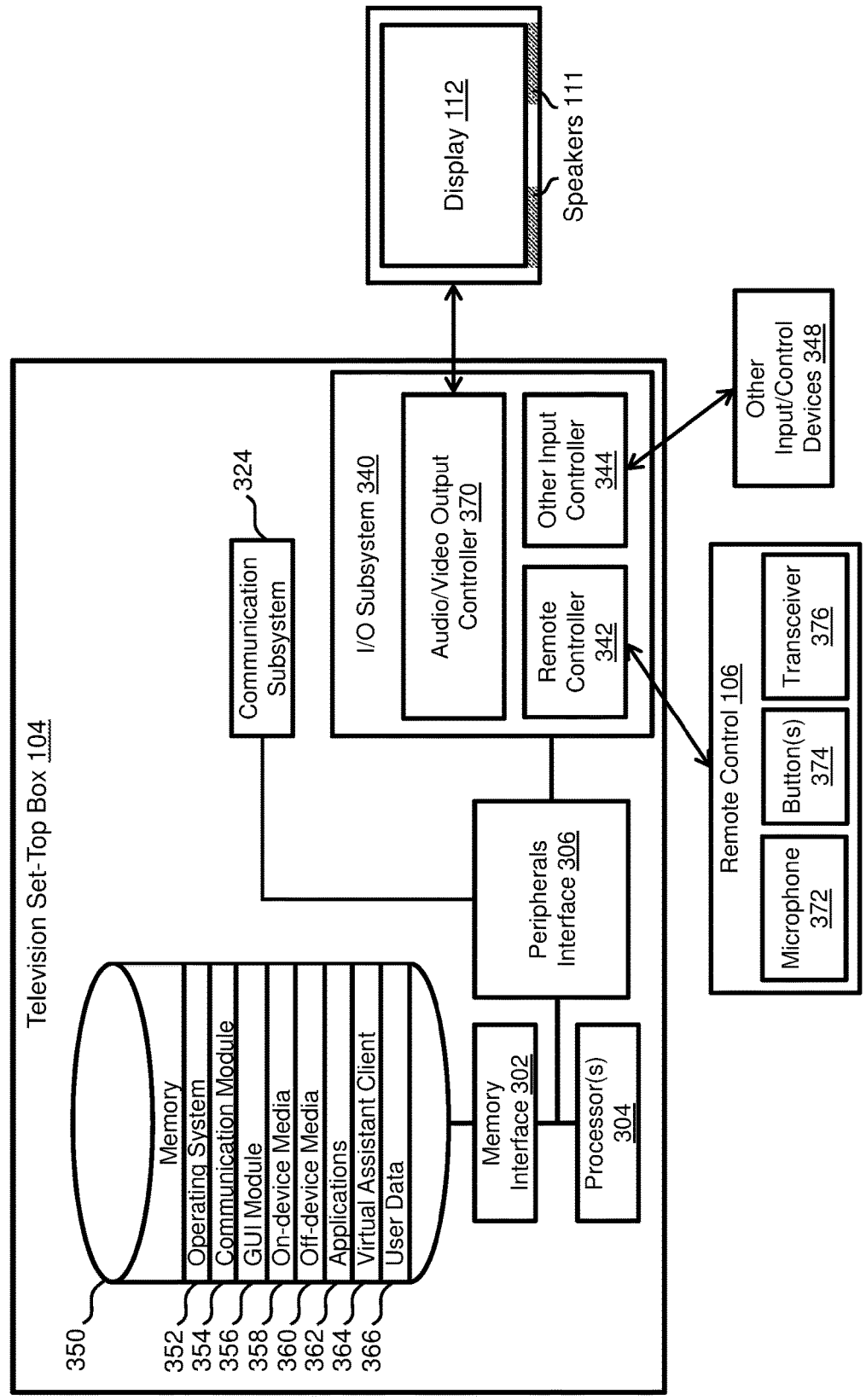
FIG. 3 illustrates a block diagram of an exemplary media control device in a system for controlling television user interaction.

FIG. 3 illustrates a block diagram of exemplary television set-top box 104 in system 300 for controlling television user interaction. System 300 can include a subset of the elements of system 100. In some examples, system 300 can execute certain functions alone and can function together with other elements of system 100 to execute other functions. For example, the elements of system 300 can process certain media control functions without interacting with server system 110 (e.g., playback of locally stored media, recording functions, channel tuning, etc.), and system 300 can process other media control functions in conjunction with server system 110 and other elements of system 100 (e.g., playback of remotely stored media, downloading media content, processing certain virtual assistant queries, etc.). In other examples, the elements of system 300 can perform the functions of the larger system 100, including accessing external services 124 through a network. It should be understood that functions can be divided between local devices and remote server devices in a variety of other ways.

As shown in FIG. 3, in one example, television set-top box 104 can include memory interface 302, one or more processors 304, and a peripherals interface 306. The various components in television set-top box 104 can be coupled together by one or more communication buses or signal lines. Television set-top box 104 can further include various subsystems and peripheral devices that are coupled to the peripherals interface 306. The subsystems and peripheral devices can gather information and/or facilitate various functionalities of television set-top box 104.

For example, television set-top box 104 can include a communications subsystem 324. Communication functions can be facilitated through one or more wired and/or wireless communication subsystems 324, which can include various communication ports, radio frequency receivers and transmitters, and/or optical (e.g., infrared) receivers and transmitters.

In some examples, television set-top box 104 can further include an I/O subsystem 340 coupled to peripherals interface 306. I/O subsystem 340 can include an audio/video output controller 370. Audio/video output controller 370 can be coupled to a display 112 and speakers 111 or can otherwise provide audio and video output (e.g., via audio/video ports, wireless transmission, etc.). I/O subsystem 340 can further include remote controller 342. Remote controller 342 can be communicatively coupled to remote control 106 (e.g., via a wired connection, Bluetooth, Wi-Fi, etc.). Remote control 106 can include microphone 372 for capturing audio input (e.g., speech input from a user), button(s) 374 for capturing tactile input, and transceiver 376 for facilitating communication with television set-top box 104 via remote controller 342. Remote control 106 can also include other input mechanisms, such as a keyboard, joystick, touchpad, or the like. Remote control 106 can further include output mechanisms, such as lights, a display, a speaker, or the like. Input received at remote control 106 (e.g., user speech, button presses, etc.) can be communicated to television set-top box 104 via remote controller 342. I/O subsystem 340 can also include other input controller(s) 344. Other input controller(s) 344 can be coupled to other input/control devices 348, such as one or more buttons, rocker switches, a thumb-wheel, an infrared port, a USB port, and/or a pointer device, such as a stylus.

In some examples, television set-top box 104 can further include a memory interface 302 coupled to memory 350. Memory 350 can include any electronic, magnetic, optical, electromagnetic, infrared, or semiconductor system, apparatus, or device; a portable computer diskette (magnetic); a random access memory (RAM) (magnetic); a read-only memory (ROM) (magnetic); an erasable programmable read-only memory (EPROM) (magnetic); a portable optical disc such as CD, CD-R, CD-RW, DVD, DVD-R, or DVD-RW; or flash memory such as compact flash cards, secured digital cards, USB memory devices, memory sticks, and the like. In some examples, a non-transitory computer-readable storage medium of memory 350 can be used to store instructions (e.g., for performing portions or all of the various processes described herein) for use by or in connection with an instruction execution system, apparatus, or device, such as a computer-based system, processor-containing system, or other system that can fetch the instructions from the instruction execution system, apparatus, or device, and can execute the instructions. In other examples, the instructions (e.g., for performing portions or all of the various processes described herein) can be stored on a non-transitory computer-readable storage medium of server system 110, or can be divided between the non-transitory computer-readable storage medium of memory 350 and the non-transitory computer-readable storage medium of server system 110. In the context of this document, a "non-transitory computer-readable storage medium" can be any medium that can contain or store the program for use by or in connection with the instruction execution system, apparatus, or device.

In some examples, memory 350 can store an operating system 352, a communication module 354, a graphical user interface module 356, an on-device media module 358, an off-device media module 360, and applications 362. Operating system 352 can include instructions for handling basic system services and for performing hardware-dependent tasks. Communication module 354 can facilitate communicating with one or more additional devices, one or more computers, and/or one or more servers. Graphical user interface module 356 can facilitate graphical user interface processing. On-device media module 358 can facilitate storage and playback of media content stored locally on television set-top box 104 and other media content available locally (e.g., cable channel tuning). Off-device media module 360 can facilitate streaming playback or download of media content stored remotely (e.g., on a remote server, on user device 102, etc.). Application module 362 can facilitate various functionalities of user applications, such as electronic messaging, web browsing, media processing, gaming, and/or other processes and functions.

As described herein, memory 350 can also store client-side virtual assistant instructions (e.g., in a virtual assistant client module 364) and various user data 366 (e.g., user-specific vocabulary data, preference data, and/or other data such as the user's electronic address book, to-do lists, shopping lists, television program favorites, etc.) to, for example, provide the client-side functionalities of the virtual assistant. User data 366 can also be used in performing speech recognition in support of the virtual assistant or for any other application.

In various examples, virtual assistant client module 364 can be capable of accepting voice input (e.g., speech input), text input, touch input, and/or gestural input through various user interfaces (e.g., I/O subsystem 340 or the like) of television set-top box 104. Virtual assistant client module 364 can also be capable of providing output in audio (e.g., speech output), visual, and/or tactile forms. For example, output can be provided as voice, sound, alerts, text messages, menus, graphics, videos, animations, vibrations, and/or combinations of two or more of the above. During operation, virtual assistant client module 364 can communicate with the virtual assistant server using communication subsystem 324.

In some examples, virtual assistant client module 364 can utilize the various subsystems and peripheral devices to gather additional information from the surrounding environment of television set-top box 104 to establish a context associated with a user, the current user interaction, and/or the current user input. Such context can also include information from other devices, such as from user device 102. In some examples, virtual assistant client module 364 can provide the contextual information or a subset thereof with the user input to the virtual assistant server to help infer the user's intent. The virtual assistant can also use the contextual information to determine how to prepare and deliver outputs to the user. The contextual information can further be used by television set-top box 104 or server system 110 to support accurate speech recognition.

In some examples, the contextual information that accompanies the user input can include sensor information, such as lighting, ambient noise, ambient temperature, distance to another object, and the like. The contextual information can further include information associated with the physical state of television set-top box 104 (e.g., device location, device temperature, power level, etc.) or the software state of television set-top box 104 (e.g., running processes, installed applications, past and present network activities, background services, error logs, resources usage, etc.). The contextual information can further include information associated with the state of connected devices or other devices associated with the user (e.g., content displayed on user device 102, playable content on user device 102, etc.). Any of these types of contextual information can be provided to virtual assistant server 114 (or used on television set-top box 104 itself) as contextual information associated with a user input.

In some examples, virtual assistant client module 364 can selectively provide information (e.g., user data 366) stored on television set-top box 104 in response to requests from virtual assistant server 114 (or it can be used on television set-top box 104 itself in executing speech recognition and/or virtual assistant functions). Virtual assistant client module 364 can also elicit additional input from the user via a natural language dialogue or other user interfaces upon request by virtual assistant server 114. Virtual assistant client module 364 can pass the additional input to virtual assistant server 114 to help virtual assistant server 114 in intent inference and/or fulfillment of the user's intent expressed in the user request.

In various examples, memory 350 can include additional instructions or fewer instructions. Furthermore, various functions of television set-top box 104 can be implemented in hardware and/or in firmware, including in one or more signal processing and/or application specific integrated circuits.

It should be understood that system 100 and system 300 are not limited to the components and configuration shown in FIG. 1 and FIG. 3, and user device 102, television set-top box 104, and remote control 106 are likewise not limited to the components and configuration shown in FIG. 2 and FIG. 3. System 100, system 300, user device 102, television set-top box 104, and remote control 106 can all include fewer or other components in multiple configurations according to various examples.

Throughout this disclosure, references to "the system" can include system 100, system 300, or one or more elements of either system 100 or system 300. For example, a typical system referred to herein can include at least television set-top box 104 receiving user input from remote control 106 and/or user device 102.

FIGS. 4A through 4E illustrate exemplary speech input interface 484 that can be shown on a display (such as display 112) to convey speech input information to a user. In one example, speech input interface 484 can be shown over video 480, which can include any moving images or paused video. For example, video 480 can include live television, a playing video, a streaming movie, playback of a recorded program, or the like. Speech input interface 484 can be configured to occupy a minimal amount of space so as not to significantly interfere with user viewing of video 480.

In one example, a virtual assistant can be triggered to listen for speech input containing a command or query (or to commence recording of speech input for subsequent processing or commence processing in real-time of speech input). Listening can be triggered in a variety of ways, including indications such as a user pressing a physical button on remote control 106, a user pressing a physical button on user device 102, a user pressing a virtual button on user device 102, a user uttering a trigger phrase that is recognizable by an always-listening device (e.g., uttering "Hey Assistant" to commence listening for a command), a user performing a gesture detectable by a sensor (e.g., motioning in front of a camera), or the like. In another example, a user can press and hold a physical button on remote control 106 or user device 102 to initiate listening. In still other examples, a user can press and hold a physical button on remote control 106 or user device 102 while speaking a query or command, and can release the button when finished. Various other indications can likewise be received to initiate receipt of speech input from the user.

Figure 4A:
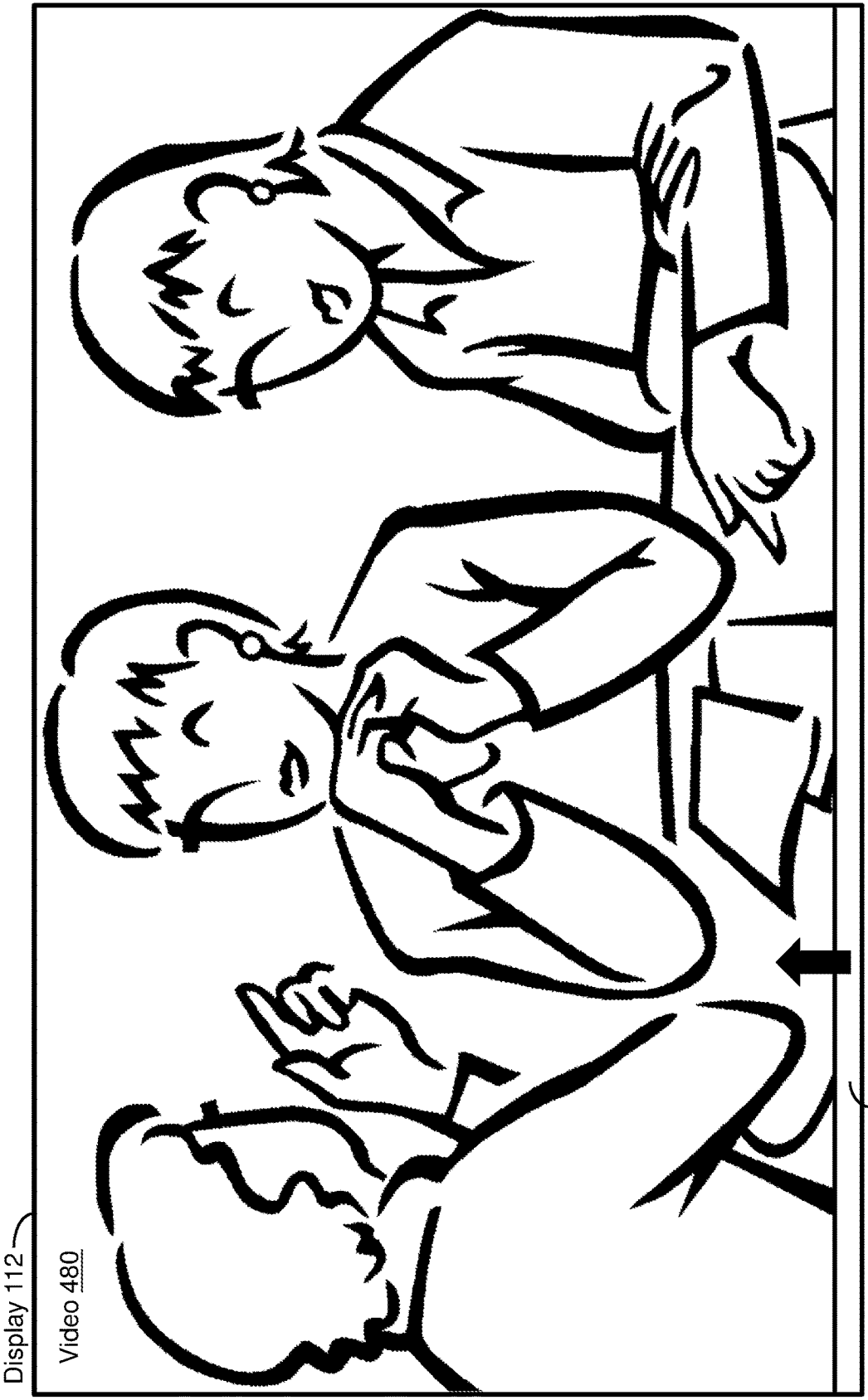
FIGS. 4A-4E illustrate an exemplary speech input interface over video content.
Figure 4B:
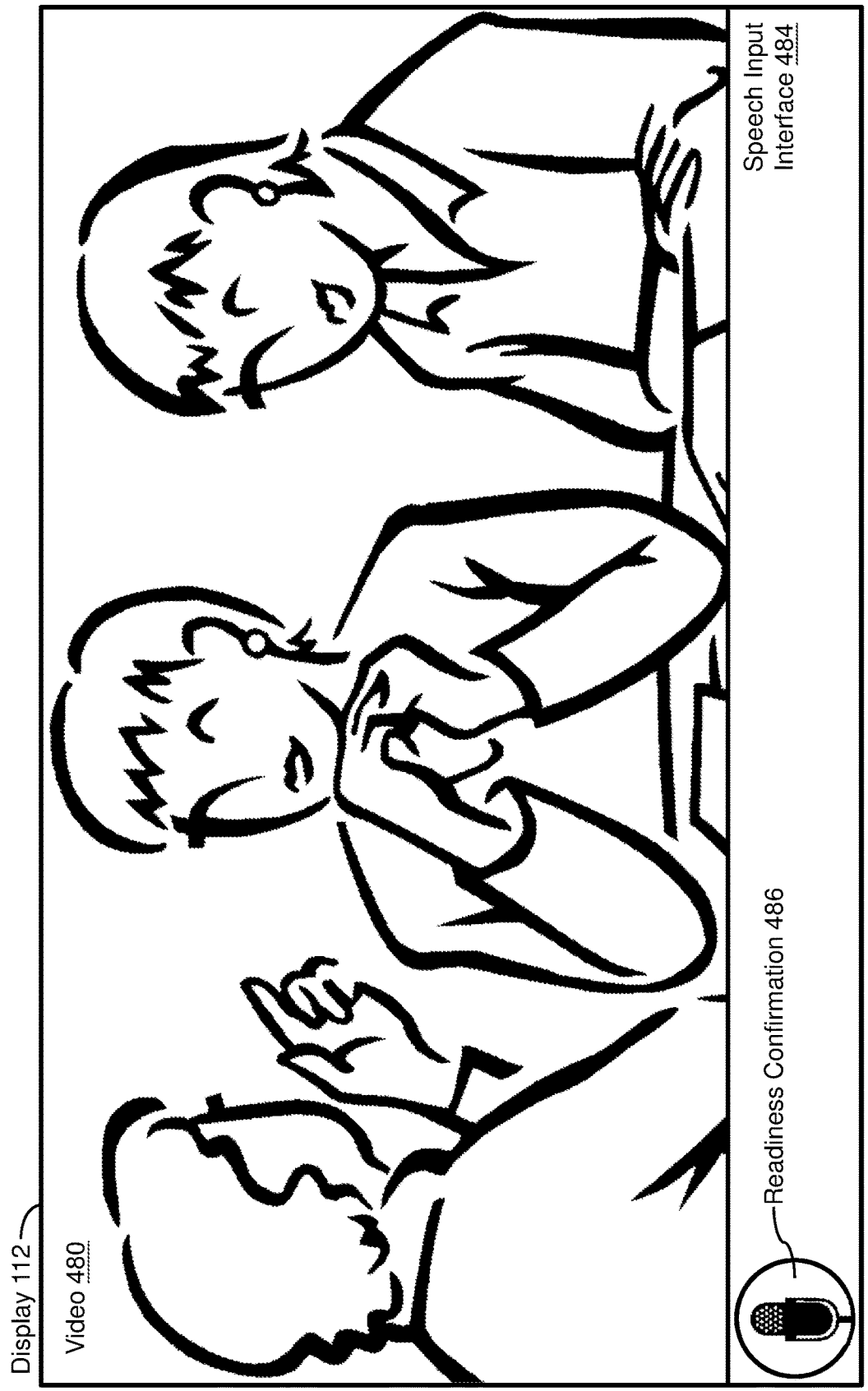

In response to receiving an indication to listen for speech input, speech input interface 484 can be displayed. FIG. 4A illustrates notification area 482 expanding upward from the bottom portion of display 112. Speech input interface 484 can be displayed in notification area 482 upon receipt of an indication to listen for speech input, and the interface can be animated to slide upward from the bottom edge of the viewing area of display 112 as shown. FIG. 4B illustrates speech input interface 484 after sliding upward into view. Speech input interface 484 can be configured to occupy a minimal amount of space at the bottom of display 112 to avoid significantly interfering with video 480. In response to receiving the indication to listen for speech input, readiness confirmation 486 can be displayed. Readiness confirmation 486 can include a microphone symbol as shown, or can include any other image, icon, animation, or symbol to convey that the system (e.g., one or more elements of system 100) is ready to capture speech input from the user.

Figure 4C:
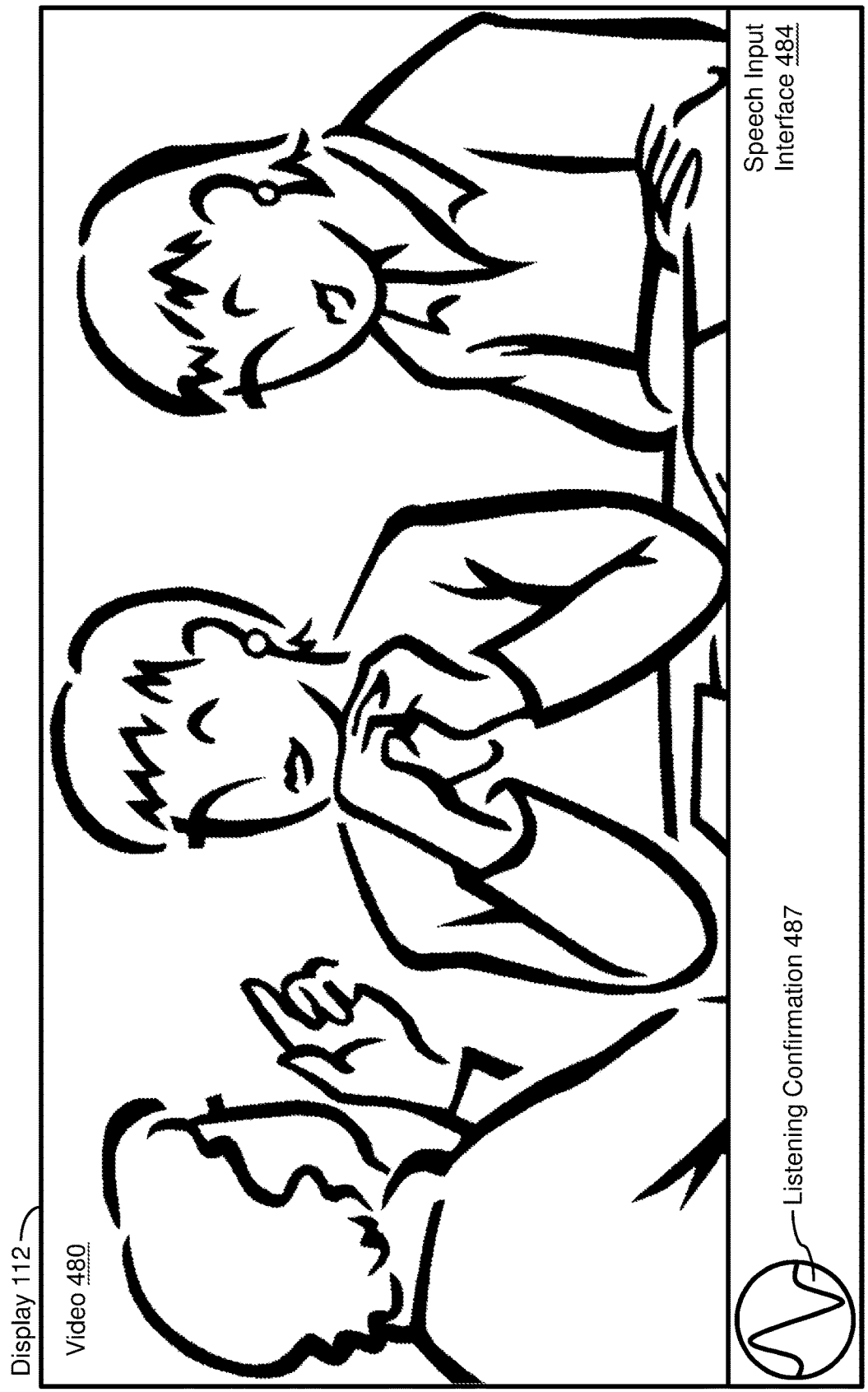

As the user begins to speak, listening confirmation 487 shown in FIG. 4C can be displayed to confirm that the system is capturing the speech input. In some examples, listening confirmation 487 can be displayed in response to receiving speech input (e.g., capturing speech). In other examples, readiness confirmation 486 can be displayed for a predetermined amount of time (e.g., 500 milliseconds, 1 second, 3 seconds, etc.) after which listening confirmation 487 can be displayed. Listening confirmation 487 can include a waveform symbol as shown, or can include an active waveform animation that moves (e.g., changes frequency) in response to user speech. In other examples, listening confirmation 487 can include any other image, icon, animation, or symbol to convey that the system is capturing speech input from the user.

Figure 4D:
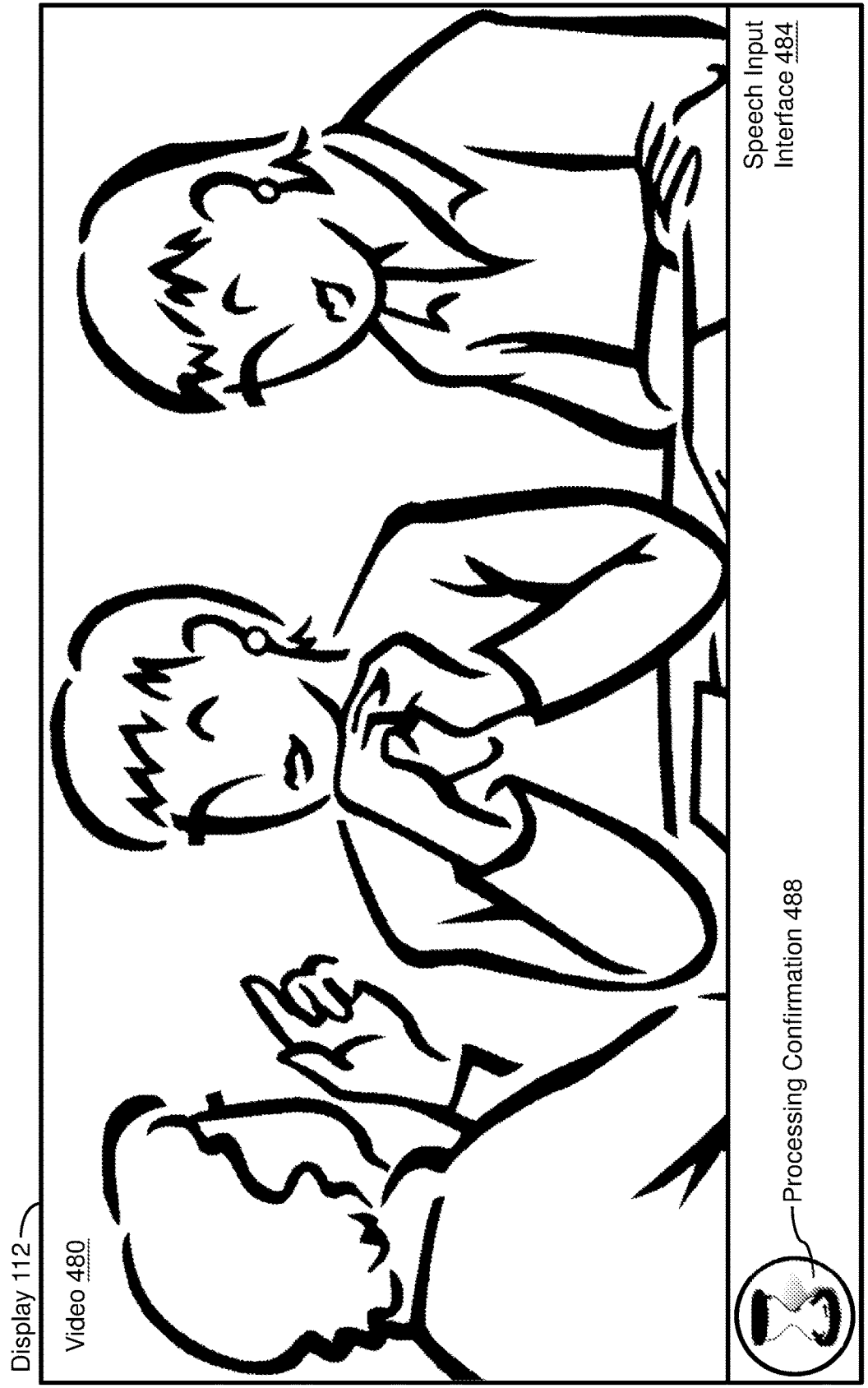

Upon detecting that the user has finished speaking (e.g., based on a pause, speech interpretation indicating the end of a query, or any other endpoint detection method), processing confirmation 488 shown in FIG. 4D can be displayed to confirm that the system finished capturing the speech input and is processing the speech input (e.g., interpreting the speech input, determining user intent, and/or executing the associated tasks). Processing confirmation 488 can include an hourglass symbol as shown, or can include any other image, icon, animation, or symbol to convey that the system is processing the captured speech input. In another example, processing confirmation 488 can include an animation of a spinning circle or a colored/glowing point moving around a circle.

Figure 4E:
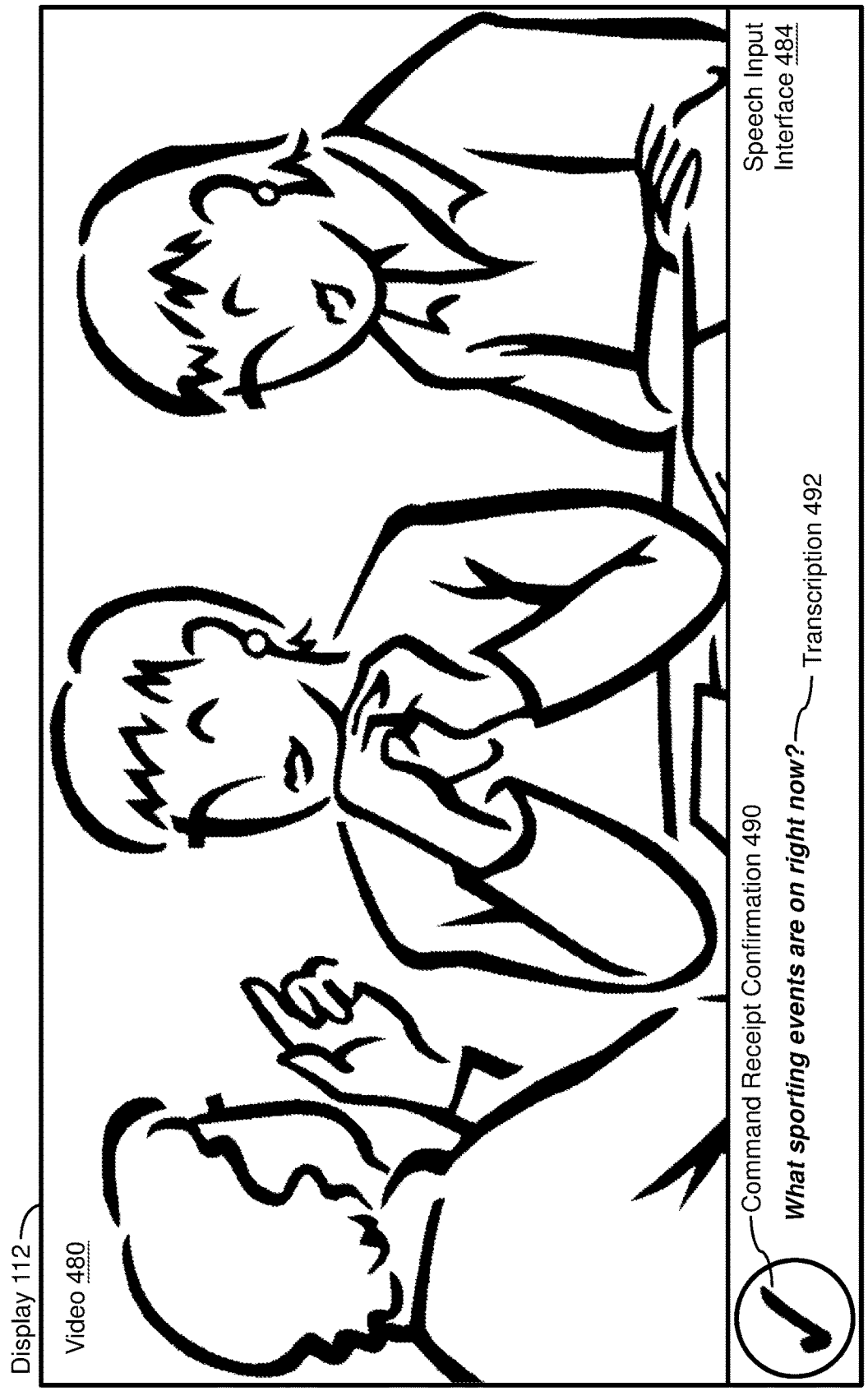

After the captured speech input is interpreted as text (or in response to successfully converting the speech input to text), command receipt confirmation 490 and/or transcription 492 shown in FIG. 4E can be displayed to confirm that the system received and interpreted the speech input. Transcription 492 can include a transcription of the received speech input (e.g., "What sporting events are on right now?"). In some examples, transcription 492 can be animated to slide up from the bottom of display 112, can be displayed momentarily in the position shown in FIG. 4E (e.g., a few seconds), and can then be slid up to the top of speech input interface 484 before disappearing from view (e.g., as though the text is scrolled up and eventually out of view). In other examples, a transcription may not be displayed, and the user's command or query can be processed and associated tasks can be executed without displaying a transcription (e.g., a simple channel change can be executed immediately without displaying a transcription of the user's speech).

In other examples, speech transcription can be performed in real-time as a user speaks. As words are transcribed, they can be displayed in speech input interface 484. For example, the words can be displayed alongside listening confirmation 487. After the user finishes speaking, command receipt confirmation 490 can be displayed briefly before executing the tasks associated with the user's command.

Moreover, in other examples, command receipt confirmation 490 can convey information about received and understood commands. For example, for a simple request to change to another channel, a logo or number associated with the channel can briefly be displayed as command receipt confirmation 490 (e.g., for a few seconds) as the channel is changed. In another example, for a request to pause a video (e.g., video 480), a pause symbol (e.g., two vertical, parallel bars) can be displayed as command receipt confirmation 490. The pause symbol can remain on the display until, for example, the user performs another action (e.g., issuing a play command to resume playback). Symbols, logos, animations, or the like can likewise be displayed for any other command (e.g., symbols for rewind, fast forward, stop, play, etc.). Command receipt confirmation 490 can thus be used to convey command-specific information.

In some examples, speech input interface 484 can be hidden after receipt of a user query or command. For example, speech input interface 484 can be animated as sliding downward until it is out of view of the bottom of display 112. Speech input interface 484 can be hidden in instances where further information need not be displayed to the user. For example, for common or straightforward commands (e.g., change to channel ten, change to the sports channel, play, pause, fast forward, rewind, etc.), speech input interface 484 can be hidden immediately after confirming command receipt, and the associated task or tasks can be performed immediately. Although various examples herein illustrate and describe an interface at a bottom or top edge of a display, it should be appreciated that any of the various interfaces can be positioned in other locations around a display. For example, speech input interface 484 can emerge from a side edge of display 112, in the center of display 112, in a corner of display 112, or the like. Similarly, the various other interface examples described herein can be arranged in a variety of different orientations in a variety of different locations on a display. Moreover, although various interfaces described herein are illustrated as opaque, any of the various interfaces can be transparent or otherwise allow an image (blurred or whole) to be viewed through the interface (e.g., overlaying interface content on media content without completely obscuring the underlying media content).

Figure 5:
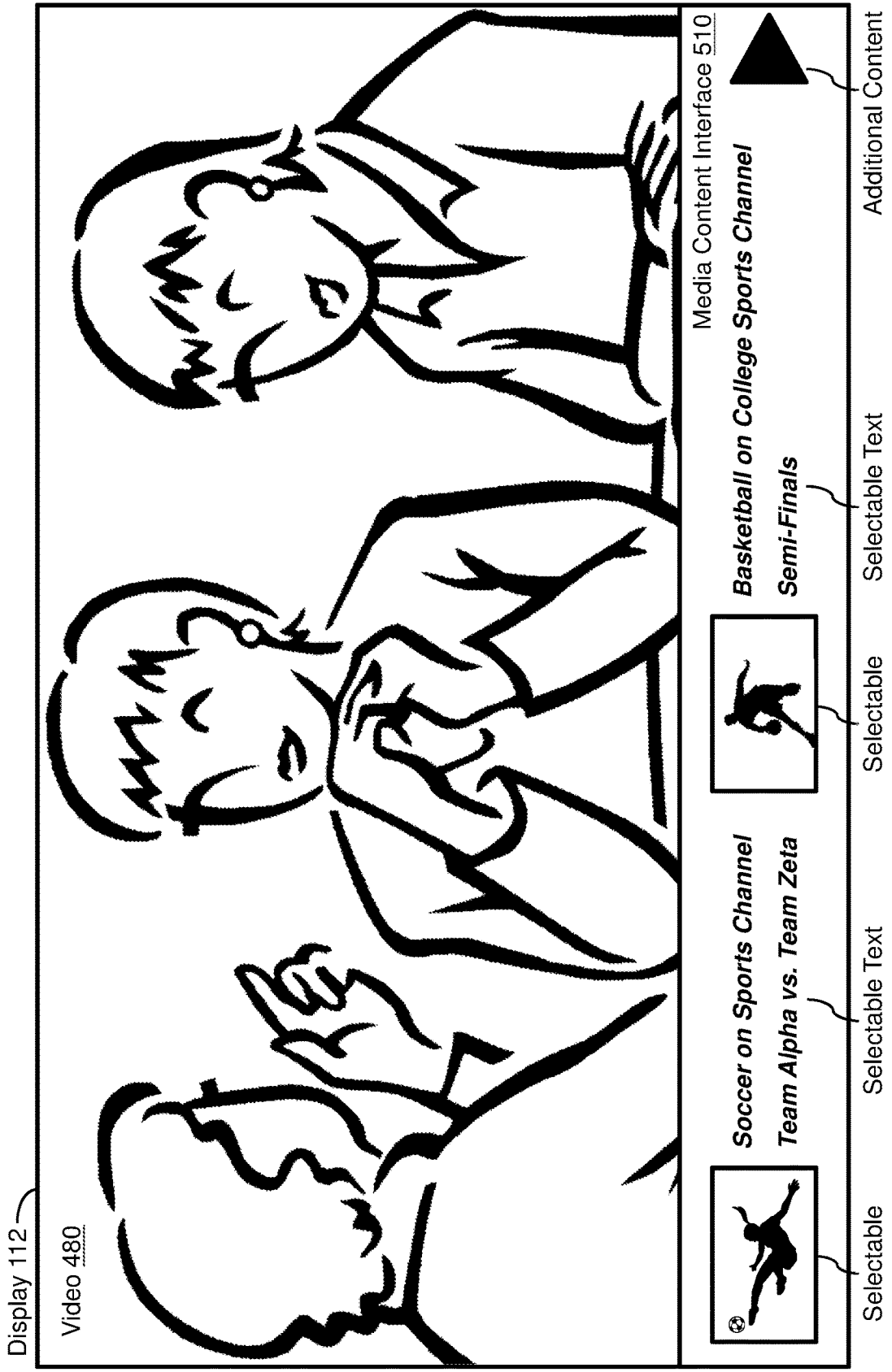
FIG. 5 illustrates an exemplary media content interface over video content.

In other examples, the result of a query can be displayed within speech input interface 484 or in a different interface. FIG. 5 illustrates exemplary media content interface 510 over video 480 with an exemplary result of the transcribed query of FIG. 4E. In some examples, the result of a virtual assistant query can include media content instead of or in addition to textual content. For example, the result of a virtual assistant query can include television programs, videos, music, or the like. Some results can include media immediately available for playback, while other results can include media that may be available for purchase or the like.

As shown, media content interface 510 can be a larger size than speech input interface 484. In one example, speech input interface 484 can be of a smaller first size to accommodate speech input information, while media content interface 510 can be of a larger second size to accommodate query results, which can include text, still images, and moving images. In this manner, interfaces for conveying virtual assistant information can scale in size according to the content that is to be conveyed, thereby limiting screen real estate intrusion (e.g., minimally blocking other content, such as video 480).

As illustrated, media content interface 510 can include (as a result of a virtual assistant query) selectable video links 512, selectable text links 514, and additional content link 513. In some examples, links can be selected by navigating focus, a cursor, or the like to a particular element and selecting it using a remote control (e.g., remote control 106). In other examples, links can be selected using voice commands to the virtual assistant (e.g., watch that soccer game, show details about the basketball game, etc.). Selectable video links 512 can include still or moving images and can be selectable to cause playback of the associated video. In one example, selectable video link 512 can include a playing video of the associated video content. In another example, selectable video link 512 can include a live feed of a television channel. For example, selectable video link 512 can include a live feed of a soccer game on a sports channel as a result of a virtual assistant query about sporting events currently on television. Selectable video link 512 can also include any other video, animation, image, or the like (e.g., a triangular play symbol). Moreover, link 512 can link to any type of media content, such as a movie, television show, sporting event, music, or the like.

Selectable text links 514 can include textual content associated with selectable video links 512 or can include textual representations of results of a virtual assistant query. In one example, selectable text links 514 can include a description of media resulting from a virtual assistant query. For instance, selectable text link 514 can include the name of a television program, title of a movie, description of a sporting event, television channel name or number, or the like. In one example, selection of text link 514 can cause playback of the associated media content. In another example, selection of text link 514 can provide additional detailed information about the media content or other virtual assistant query result. Additional content link 513 can link to and cause display of additional results of a virtual assistant query.

Although certain media content examples are shown in FIG. 5, it should be appreciated that any type of media content can be included as a result of a virtual assistant query for media content. For example, media content that can be returned as a result of a virtual assistant can include videos, television programs, music, television channels, or the like. In addition, in some examples, categorical filters can be provided in any of the interfaces herein to allow users to filter search or query results or displayed media options. For example, selectable filters can be provided to filter results by type (e.g., movies, music albums, books, television shows, etc.). In other examples, selectable filters can include genre or content descriptors (e.g., comedy, interview, specific program, etc.). In still other examples, selectable filters can include times (e.g., this week, last week, last year, etc.). It should be appreciated that filters can be provided in any of the various interfaces described herein to allow users to filter results based on categories relevant to the displayed content (e.g., filter by type where media results have various types, filter by genre where media results have various genres, filter by times where media results have various times, etc.).

In other examples, media content interface 510 can include a paraphrase of a query in addition to media content results. For example, a paraphrase of the user's query can be displayed above the media content results (above selectable video links 512 and selectable text links 514). In the example of FIG. 5, such a paraphrase of the user's query can include the following: "Here are some sporting events that are on right now." Other text introducing the media content results can likewise be displayed.

In some examples, after displaying any interface, including interface 510, a user can initiate capture of additional speech input with a new query (that may or may not be related to previous queries). User queries can include commands to act on interface elements, such as a command to select a video link 512. In another example, user speech can include a query associated with displayed content, such as displayed menu information, a playing video (e.g., video 480), or the like. A response can be determined for such a query based on the information shown (e.g., displayed text) and/or metadata associated with displayed content (e.g., metadata associated with a playing video). For example, a user can ask about a media result shown in an interface (e.g., interface 510), and metadata associated with that media can be searched to provide an answer or result. Such an answer or result can then be provided in another interface or within the same interface (e.g., in any of the interfaces discussed herein).

Figure 6A:
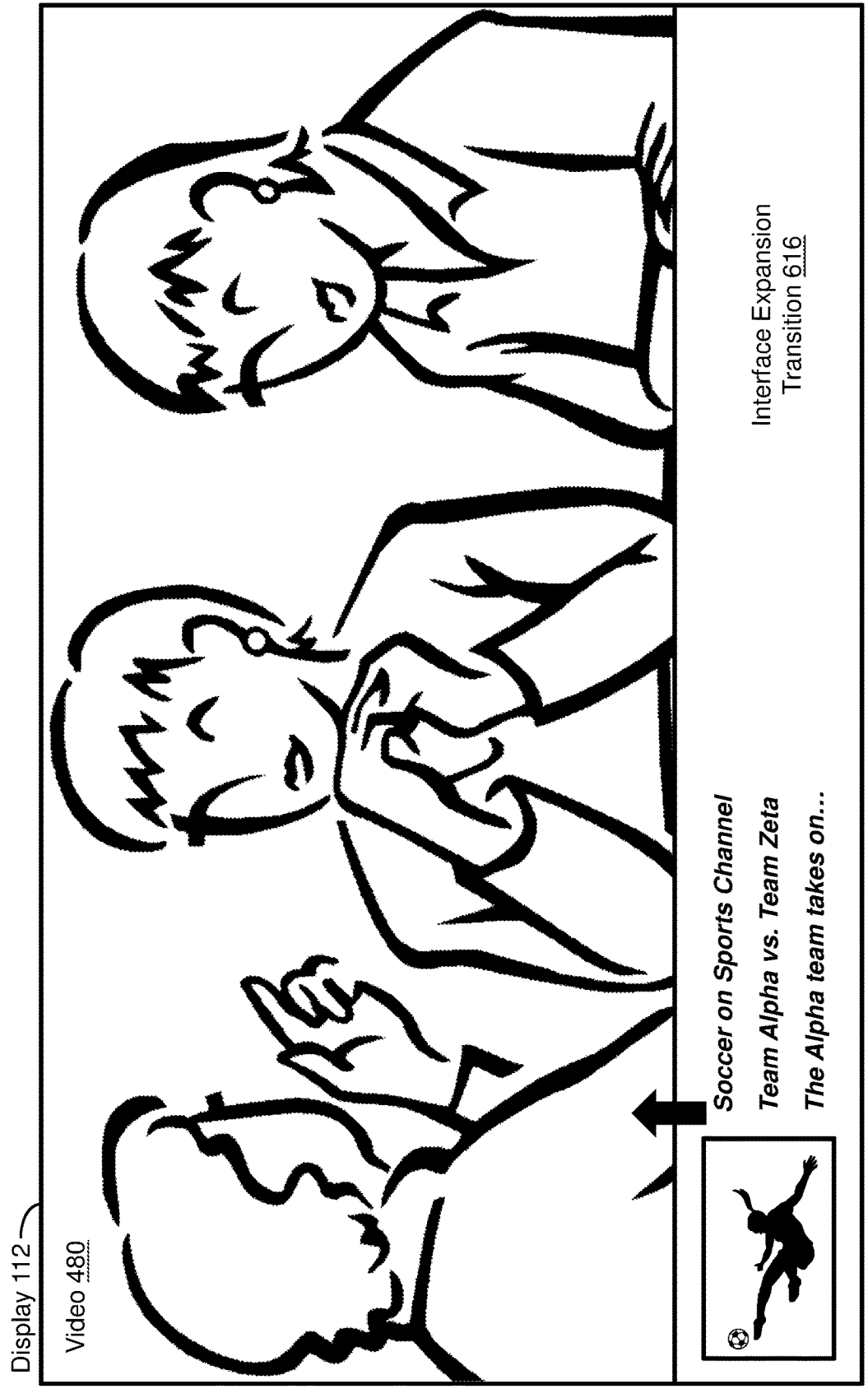
FIGS. 6A-6B illustrate an exemplary media detail interface over video content.
Figure 6B:

As noted above, in one example, additional detailed information about media content can be displayed in response to selection of a text link 514. FIGS. 6A and 6B illustrate exemplary media detail interface 618 over video 480 after selection of a text link 514. In one example, in providing addition detailed information, media content interface 510 can be expanded into media detail interface 618 as illustrated by interface expansion transition 616 of FIG. 6A. In particular, as shown in FIG. 6A, selected content can be expanded in size and additional textual information can be provided by expanding the interface upward on display 112 to occupy more of the screen real estate. The interface can be expanded to accommodate the additional detailed information desired by the user. In this manner, the size of the interface can scale with the amount of content desired by the user, thereby minimizing screen real estate intrusion while still conveying the desired content.

FIG. 6B illustrates detail interface 618 after full expansion. As shown, detail interface 618 can be of a larger size than either media content interface 510 or speech input interface 484 to accommodate the desired detailed information. Detail interface 618 can include detailed media information 622, which can include a variety of detailed information associated with media content or another result of a virtual assistant query. Detailed media information 622 can include a program title, program description, program air time, channel, episode synopsis, movie description, actor names, character names, sporting event participants, producer names, director names, or any other detailed information associated with a result of a virtual assistant query.

In one example, detail interface 618 can include selectable video link 620 (or another link to play media content), which can include a larger version of a corresponding selectable video link 512. As such, selectable video link 620 can include still or moving images and can be selectable to cause playback of the associated video. Selectable video link 620 can include a playing video of the associated video content, a live feed of a television channel (e.g., a live feed of a soccer game on a sports channel), or the like. Selectable video link 620 can also include any other video, animation, image, or the like (e.g., a triangular play symbol).

Figure 7A:
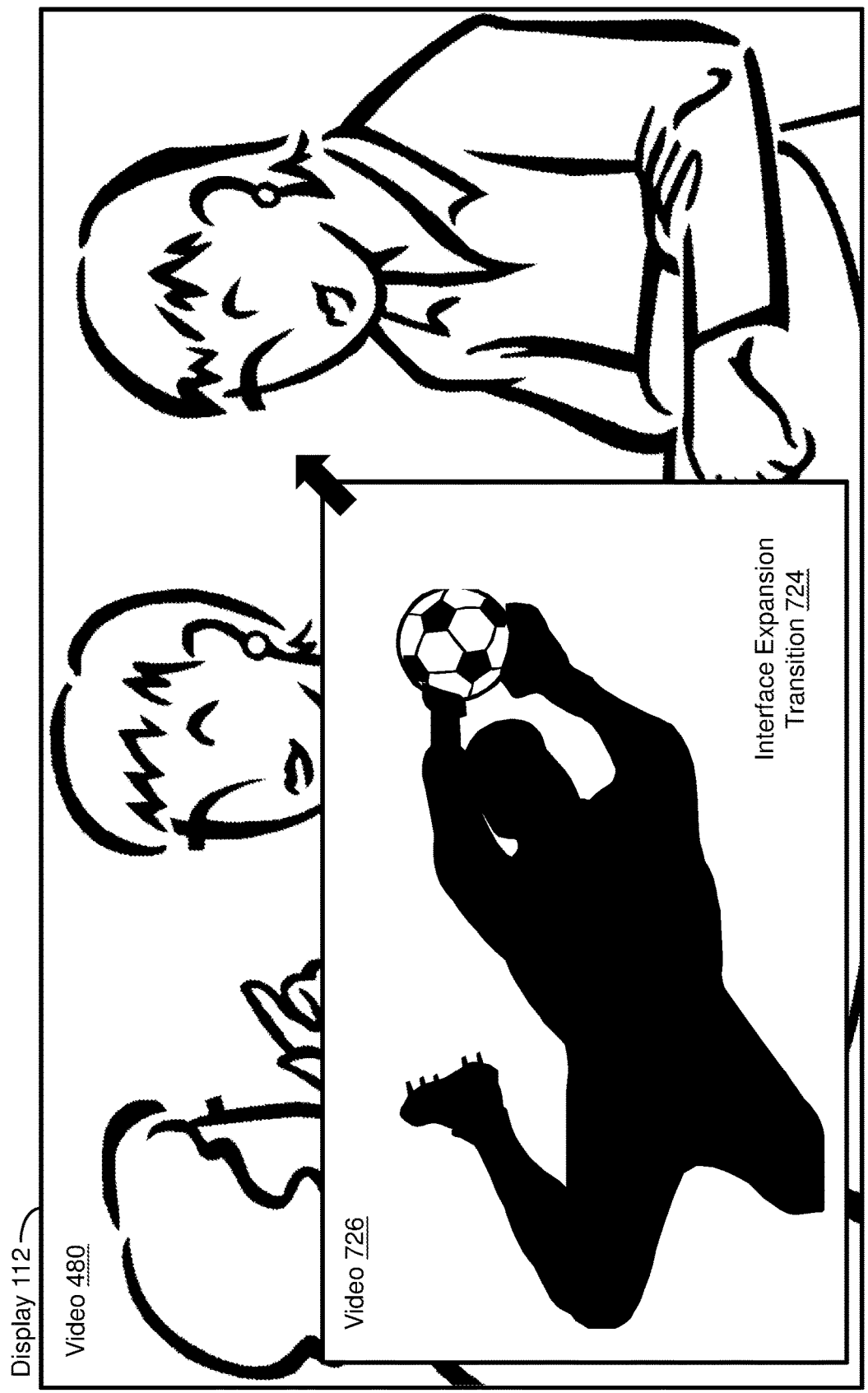
FIGS. 7A-7B illustrate an exemplary media transition interface.
Figure 7B:

As noted above, a video can be played in response to selection of a video link, such as video link 620 or video links 512. FIGS. 7A and 7B illustrate an exemplary media transition interface that can be displayed in response to selection of a video link (or other command to play video content). As illustrated, video 480 can be replaced with video 726. In one example, video 726 can be expanded to overtake or cover video 480 as shown by interface expansion transition 724 in FIG. 7A. The result of the transition can include expanded media interface 728 of FIG. 7B. As with other interfaces, the size of expanded media interface 728 can be sufficient to provide the user with the desired information; here, that can include expanding to fill display 112. Expanded media interface 728 can thus be larger than any other interface as the desired information can include playing media content across the entire display. Although not shown, in some examples, descriptive information can briefly be overlaid on video 726 (e.g., along the bottom of the screen). Such descriptive information can include the name of the associated program, video, channel, or the like. The descriptive information can then be hidden from view (e.g., after a few seconds).

Figure 8A:
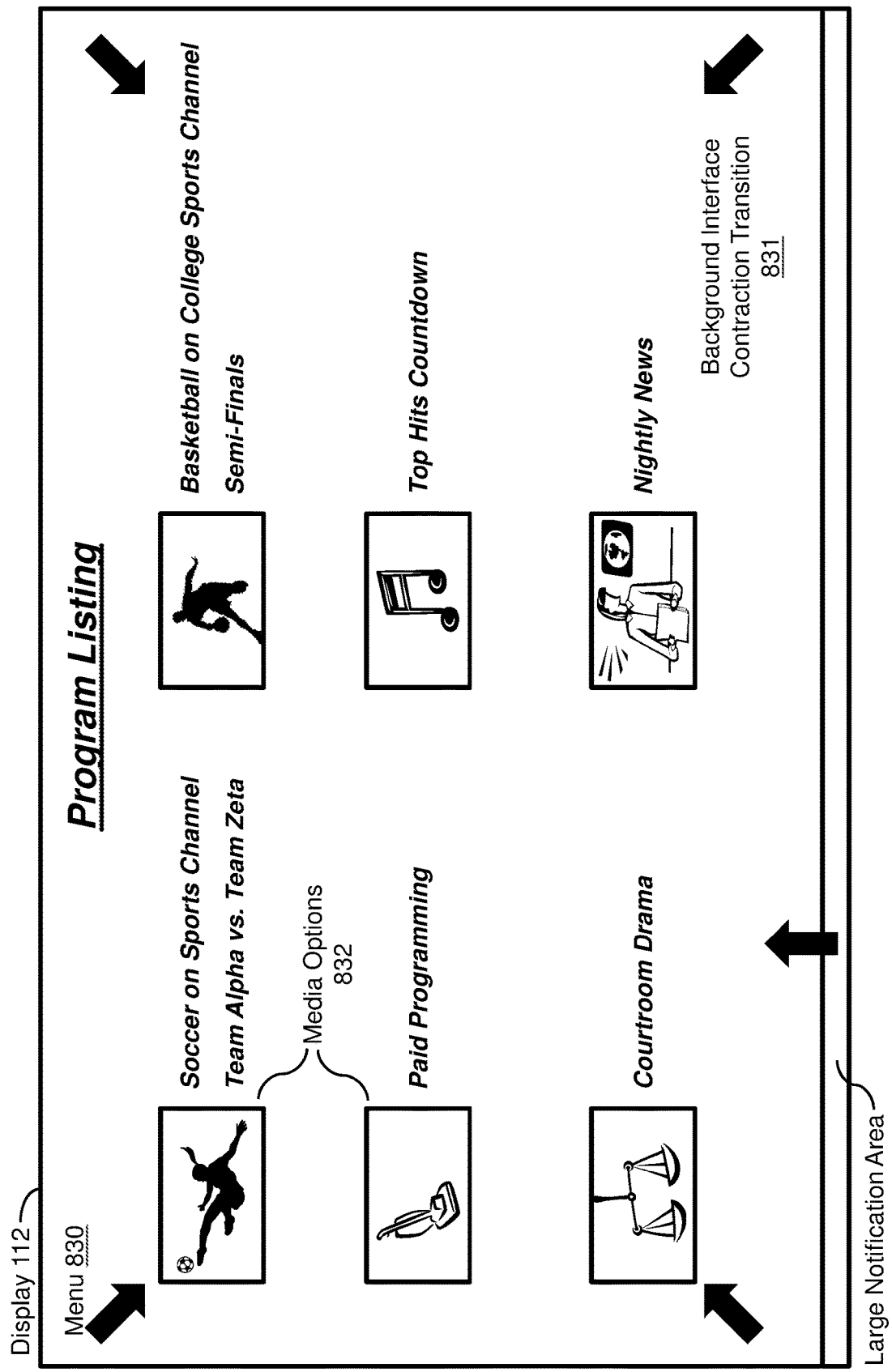
FIGS. 8A-8B illustrate an exemplary speech input interface over menu content.
Figure 8B:
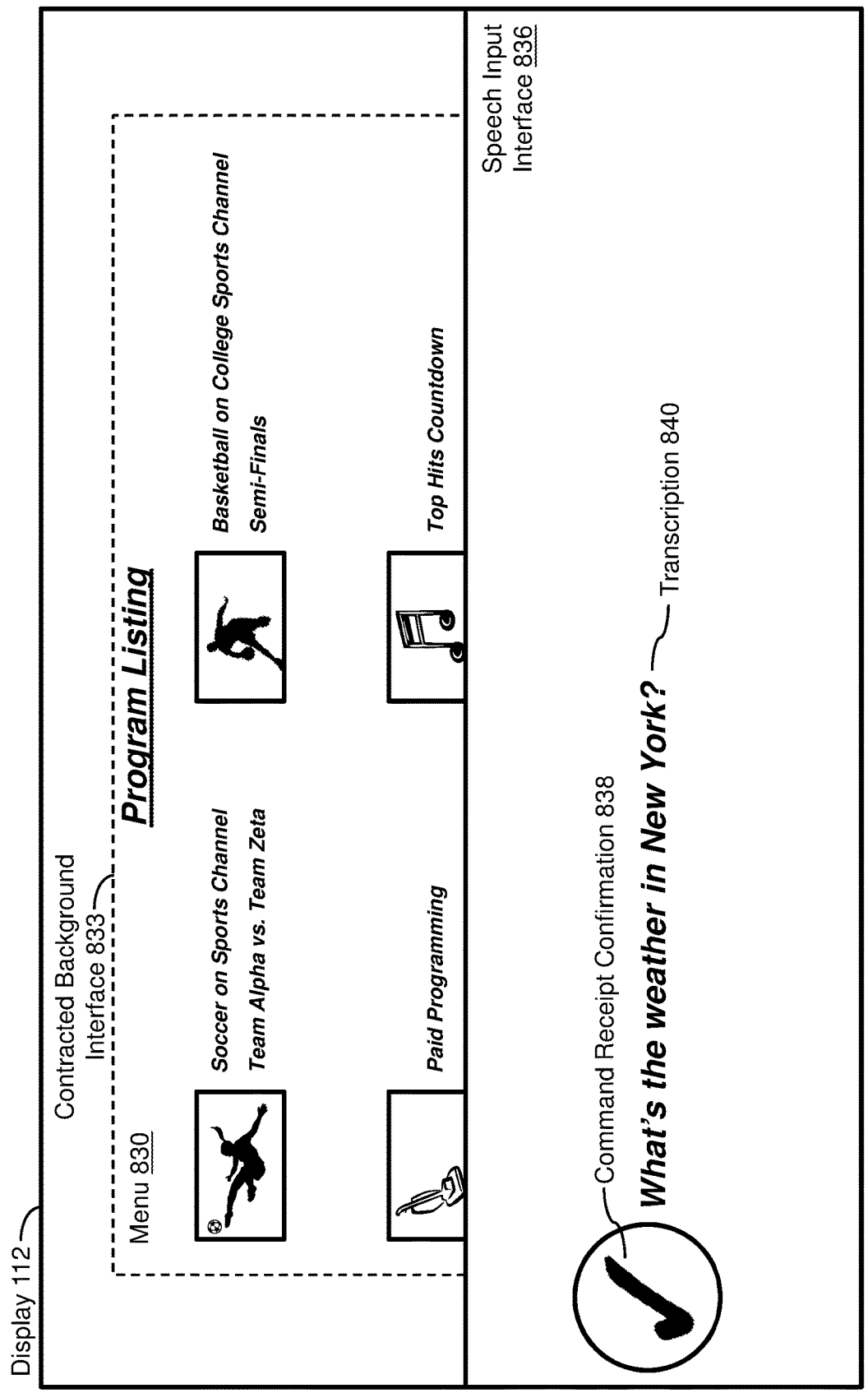

FIGS. 8A and 8B illustrate exemplary speech input interface 836 that can be shown on display 112 to convey speech input information to a user. In one example, speech input interface 836 can be shown over menu 830. Menu 830 can include various media options 832, and speech input interface 836 can similarly be displayed over any other type of menu (e.g., content menus, category menus, control menus, setup menus, program menus, etc.). In one example, speech input interface 836 can be configured to occupy a relatively large amount of screen real estate of display 112. For example, speech input interface 836 can be larger than speech input interface 484 discussed above. In one example, the size of speech input interface to use (e.g., either the smaller interface 484 or the larger interface 836) can be determined based on the background content. When the background content includes a moving image, for example, a small size speech input interface can be displayed (e.g., interface 484). On the other hand, when the background content includes a still image (e.g., a paused video) or a menu, for example, a large size speech input interface can be displayed (e.g., interface 836). In this manner, if a user is watching video content, a smaller speech input interface can be displayed that only minimally intrudes on the screen real estate; whereas if a user is navigating a menu or viewing a paused video or other still image, a larger speech input interface can be displayed that can convey more information or have a more profound effect by occupying additional real estate. Other interfaces discussed herein can likewise be sized differently based on background content.

As discussed above, a virtual assistant can be triggered to listen for speech input containing a command or query (or to commence recording of speech input for subsequent processing or commence processing in real-time of speech input). Listening can be triggered in a variety of ways, including indications such as a user pressing a physical button on remote control 106, a user pressing a physical button on user device 102, a user pressing a virtual button on user device 102, a user uttering a trigger phrase that is recognizable by an always-listening device (e.g., uttering "Hey Assistant" to commence listening for a command), a user performing a gesture detectable by a sensor (e.g., motioning in front of a camera), or the like. In another example, a user can press and hold a physical button on remote control 106 or user device 102 to initiate listening. In still other examples, a user can press and hold a physical button on remote control 106 or user device 102 while speaking a query or command, and can release the button when finished. Various other indications can likewise be received to initiate receipt of speech input from the user.

In response to receiving an indication to listen for speech input, speech input interface 836 can be displayed over menu 830. FIG. 8A illustrates large notification area 834 expanding upward from the bottom portion of display 112. Speech input interface 836 can be displayed in large notification area 834 upon receipt of an indication to listen for speech input, and the interface can be animated to slide upward from the bottom edge of the viewing area of display 112 as shown. In some examples, a background menu, paused video, still image, or other background content can be contracted and/or moved backward in the z direction (as if further into display 112) as an overlapping interface is displayed (e.g., in response to receiving an indication to listen for speech input). Background interface contraction transition 831 and the associated inward-pointing arrows illustrate how background content (e.g., menu 830) can be contracted—shrinking the displayed menu, images, text, etc. This can provide a visual effect of the background content appearing to move away from the user, out of the way of a new foreground interface (e.g., interface 836). FIG. 8B illustrates contracted background interface 833, including a contracted (shrunken) version of menu 830. As shown, contracted background interface 833 (which can include a border) can appear further from the user while ceding focus to the foreground interface 836. Background content in any of the other examples discussed herein (including background video content) can similarly be contracted and/or moved backward in the z direction as overlapping interfaces are displayed.

FIG. 8B illustrates speech input interface 836 after sliding upward into view. As discussed above, various confirmations can be displayed while receiving speech input. Although not shown here, speech input interface 836 can similarly display larger versions of readiness confirmation 486, listening confirmation 487, and/or processing confirmation 488 in a similar manner as speech input interface 484 discussed above with reference to FIGS. 4B, 4C, and 4D, respectively.

As shown in FIG. 8B, command receipt confirmation 838 can be shown (as with the smaller sized command receipt confirmation 490 discussed above) to confirm that the system received and interpreted the speech input. Transcription 840 can also be shown and can include a transcription of the received speech input (e.g., "What's the weather in New York?"). In some examples, transcription 840 can be animated to slide up from the bottom of display 112, can be displayed momentarily in the position shown in FIG. 8B (e.g., a few seconds), and can then be slid up to the top of speech input interface 836 before disappearing from view (e.g., as though the text is scrolled up and eventually out of view). In other examples, a transcription may not be displayed, and the user's command or query can be processed and associated tasks can be executed without displaying a transcription.

In other examples, speech transcription can be performed in real-time as a user speaks. As words are transcribed, they can be displayed in speech input interface 836. For example, the words can be displayed alongside a larger version of listening confirmation 487 discussed above. After the user finishes speaking, command receipt confirmation 838 can be displayed briefly before executing the tasks associated with the user's command.

Moreover, in other examples, command receipt confirmation 838 can convey information about received and understood commands. For example, for a simple request to tune to a particular channel, a logo or number associated with the channel can briefly be displayed as command receipt confirmation 838 (e.g., for a few seconds) as the channel is tuned. In another example, for a request to select a displayed menu item (e.g., one of media options 832), an image associated with the selected menu item can be displayed as command receipt confirmation 838. Command receipt confirmation 838 can thus be used to convey command-specific information.

In some examples, speech input interface 836 can be hidden after receipt of a user query or command. For example, speech input interface 836 can be animated as sliding downward until it is out of view of the bottom of display 112. Speech input interface 836 can be hidden in instances where further information need not be displayed to the user. For example, for common or straightforward commands (e.g., change to channel ten, change to the sports channel, play that movie, etc.), speech input interface 836 can be hidden immediately after confirming command receipt, and the associated task or tasks can be performed immediately.

Figure 9:
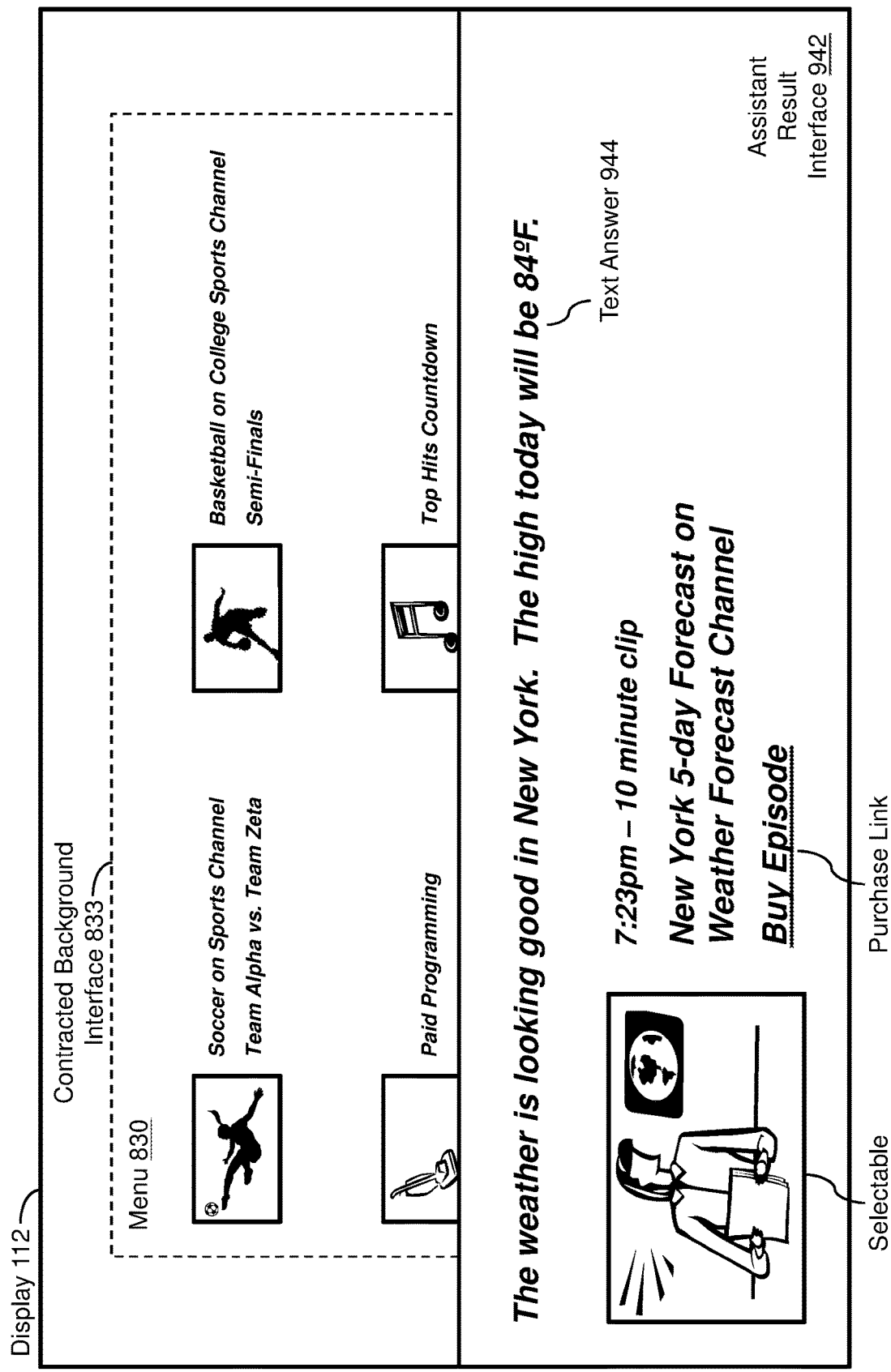
FIG. 9 illustrates an exemplary virtual assistant result interface over menu content.

In other examples, the result of a query can be displayed within speech input interface 836 or in a different interface. FIG. 9 illustrates exemplary virtual assistant result interface 942 over menu 830 (specifically over contracted background interface 833) with an exemplary result of the transcribed query of FIG. 8B. In some examples, the result of a virtual assistant query can include a textual answer, such as text answer 944. The result of a virtual assistant query can also include media content that addresses a user's query, such as the content associated with selectable video link 946 and purchase link 948. In particular, in this example, a user can ask for weather information for the specified location of New York. The virtual assistant can provide text answer 944 directly answering the user's query (e.g., indicating that the weather looks good and providing temperature information). Instead of or in addition to text answer 944, the virtual assistant can provide selectable video link 946 along with purchase link 948 and the associated text. The media associated with links 946 and 948 can also provide a response to the user's query. Here, the media associated with links 946 and 948 can include a ten-minute clip of weather information at the specified location—specifically, the five-day forecast for New York from a television channel called the Weather Forecast Channel.

In one example, the clip addressing the user's query can include a time-cued portion of previously-aired content (that may be available from a recording or from a streaming service). The virtual assistant can, in one example, identify such content based on the user intent associated with the speech input and by searching detailed information about available media content (e.g., including metadata for recorded programs along with detailed timing information or detailed information about streaming content). In some examples, a user may not have access to or may not have a subscription for certain content. In such instances, content can be offered for purchase, such as via purchase link 948. The cost of the content can be automatically withdrawn from a user account or charged to a user account upon selection of purchase link 948 or video link 946.

Figure 10:
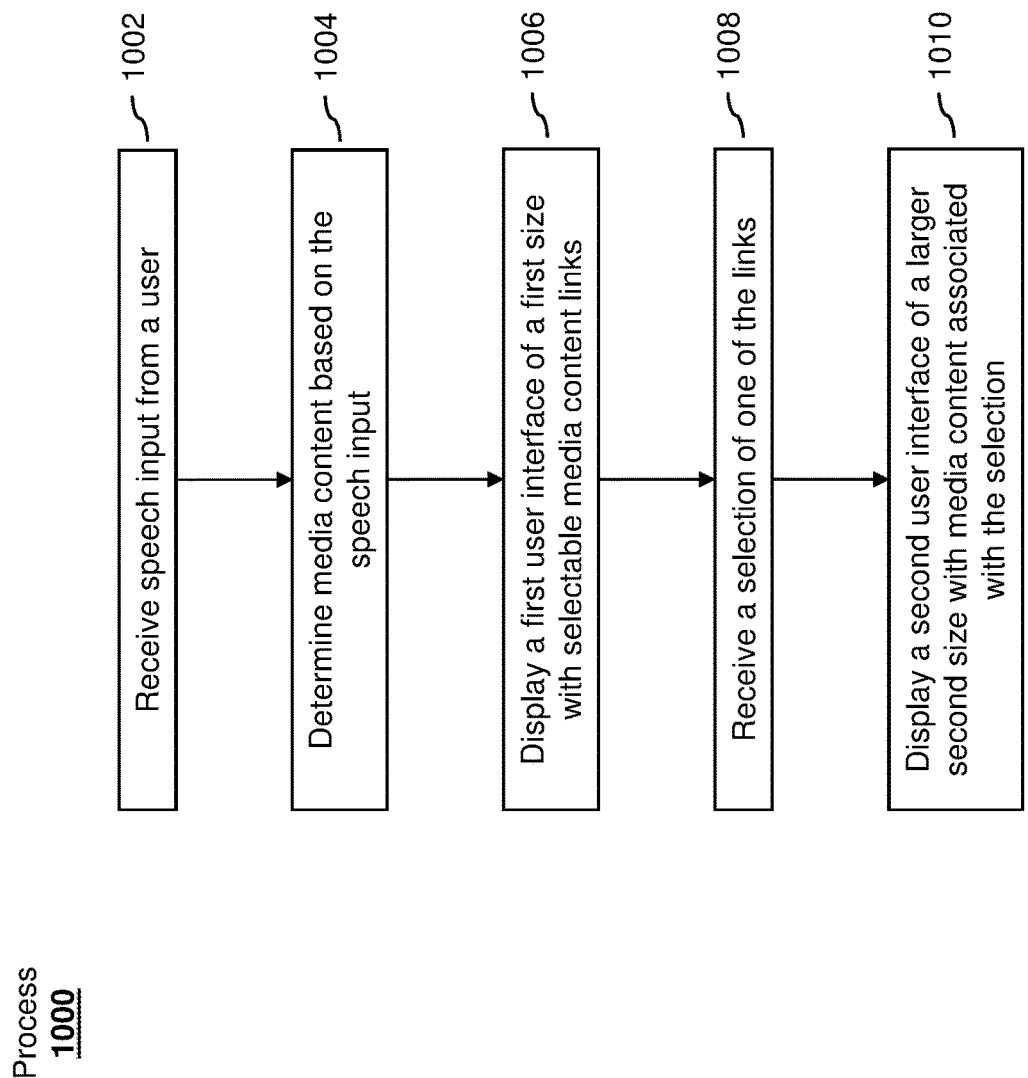
FIG. 10 illustrates an exemplary process for controlling television interactions using a virtual assistant and displaying associated information using different interfaces.

FIG. 10 illustrates exemplary process 1000 for controlling television interactions using a virtual assistant and displaying associated information using different interfaces. At block 1002, speech input can be received from a user. For example, speech input can be received at user device 102 or remote control 106 of system 100. In some examples, the speech input (or a data representation of some or all of the speech input) can be transmitted to and received by server system 110 and/or television set-top box 104. In response to a user initiating receipt of speech input, various notifications can be displayed on a display (such as display 112). For example, a readiness confirmation, listening confirmation, processing confirmation, and/or command receipt confirmation can be displayed as discussed above with reference to FIGS. 4A-4E. In addition, received user speech input can be transcribed, and a transcription can be displayed.

Referring again to process 1000 of FIG. 10, at block 1004, media content can be determined based on the speech input. For example, media content that addresses a user query directed at a virtual assistant can be determined (e.g., by searching available media content or the like). For instance, media content can be determined related to transcription 492 of FIG. 4E ("What sporting events are on right now?"). Such media content can include live sporting events being shown on one or more television channels available to the user for viewing.

At block 1006, a first user interface of a first size with selectable media links can be displayed. For example, media content interface 510 with selectable video links 512 and selectable text links 514 can be displayed on display 112 as shown in FIG. 5. As discussed above, media content interface 510 can be of a smaller size to avoid interfering with background video content.

At block 1008, a selection of one of the links can be received. For example, selection of one of links 512 and/or links 514 can be received. At block 1010, a second user interface of a larger second size with media content associated with the selection can be displayed. For example, detail interface 618 with selectable video link 620 and detailed media information 622 can be displayed as shown in FIG. 6B. As discussed above, detail interface 618 can be of a larger size to convey the desired additional detailed media information. Similarly, upon selection of video link 620, expanded media interface 728 can be displayed with video 726 as shown in FIG. 7B. As discussed above, expanded media interface 728 can be of a larger size still to provide the desired media content to the user. In this manner, the various interfaces discussed herein can be sized to accommodate desired content (including expanding into larger sized interfaces or contracting down to smaller sized interfaces) while otherwise occupying limited screen real estate. Process 1000 can thus be used to control television interactions using a virtual assistant and display associated information using different interfaces.

In another example, a larger size interface can be displayed over a control menu than over background video content. For example, speech input interface 836 can be displayed over menu 830 as shown in FIG. 8B, and assistant result interface 942 can be displayed over menu 830 as shown in FIG. 9, whereas smaller media content interface 510 can be displayed over video 480 as shown in FIG. 5. In this manner, the size of an interface (e.g., the amount of screen real estate occupied by an interface) can be determined, at least in part, by the type of background content.

Figure 11:
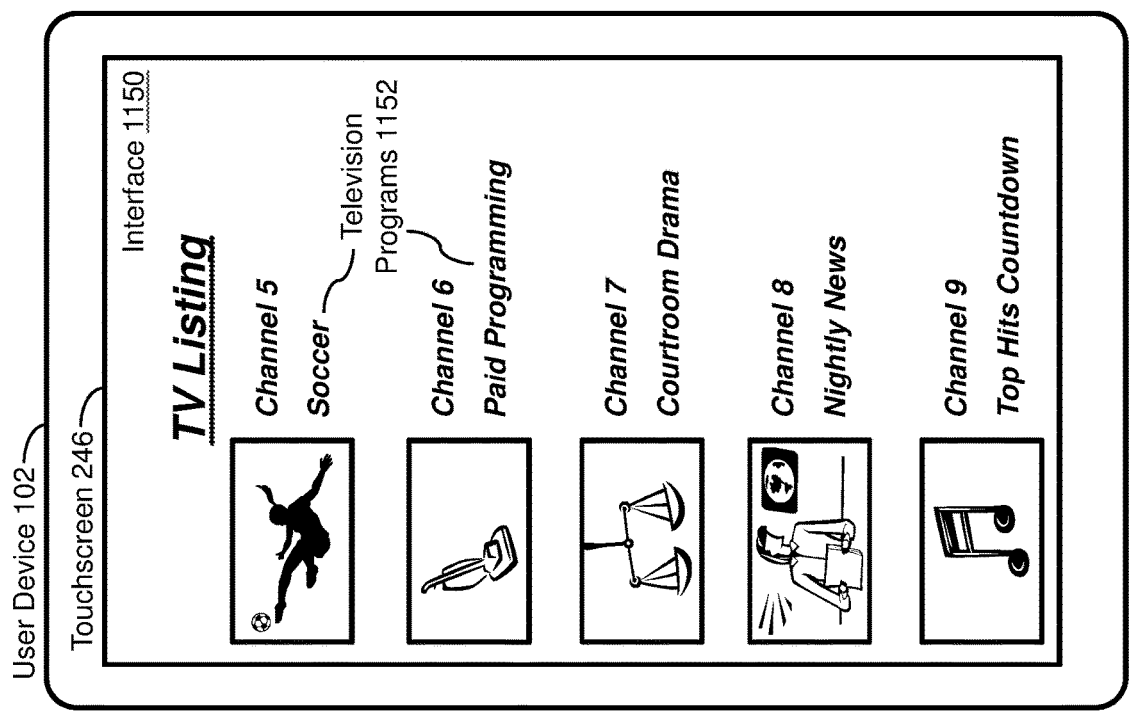
FIG. 11 illustrates exemplary television media content on a mobile user device.

FIG. 11 illustrates exemplary television media content on user device 102, which can include a mobile telephone, tablet computer, remote control, or the like with touchscreen 246 (or another display). FIG. 11 illustrates interface 1150 including a TV listing with multiple television programs 1152. Interface 1150 can, for example, correspond to a particular application on user device 102, such as a television control application, television content listing application, Internet application, or the like. In some examples, content shown on user device 102 (e.g., on touchscreen 246) can be used to determine user intent from speech input relating to that content, and the user intent can be used to cause playback or display of content on another device and display (e.g., on television set-top box 104 and display 112 and/or speakers 111). For example, content shown in interface 1150 on user device 102 can be used to disambiguate user requests and determine user intent from speech input, and the determined user intent can then be used to play or display media via television set-top box 104.

Figure 12:
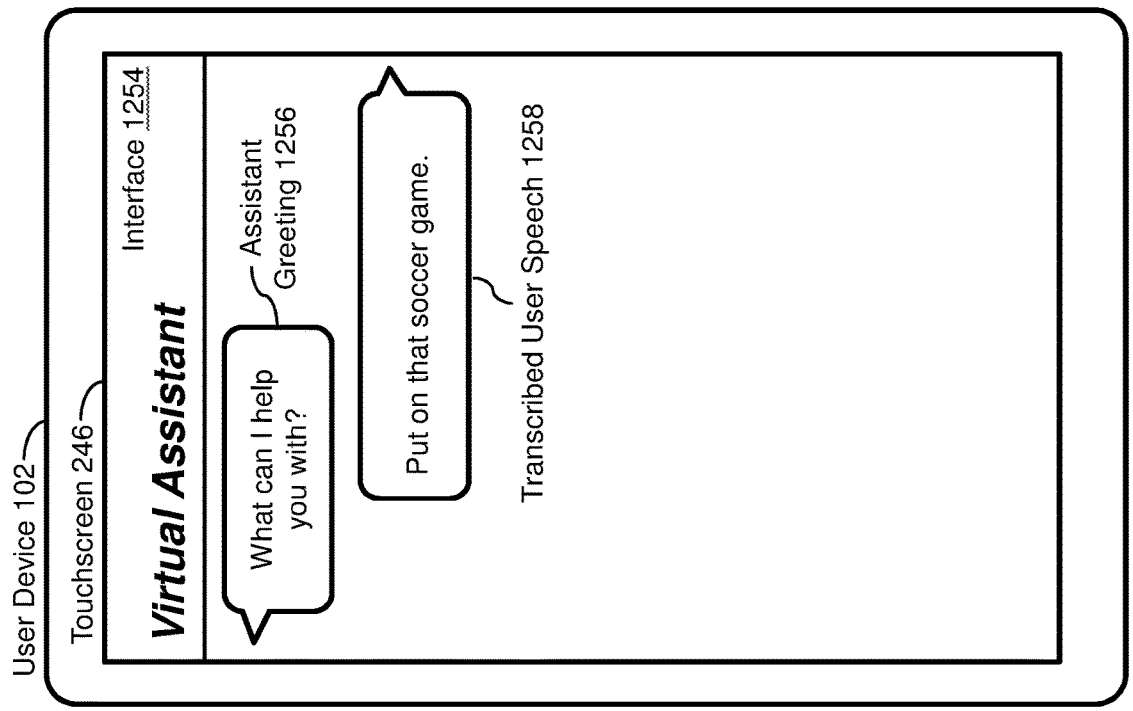
FIG. 12 illustrates exemplary television control using a virtual assistant.

FIG. 12 illustrates exemplary television control using a virtual assistant. FIG. 12 illustrates interface 1254, which can include a virtual assistant interface formatted as a conversational dialog between the assistant and the user. For example, interface 1254 can include assistant greeting 1256 prompting the user to make a request. Subsequently-received user speech can then be transcribed, such as transcribed user speech 1258, showing the back and forth conversation. In some examples, interface 1254 can appear on user device 102 in response to a trigger to initiate receipt of speech input (triggers such as button presses, key phrases, or the like).

In one example, a user request to play content via television set-top box 104 (e.g., on display 112 and speakers 111) can include an ambiguous reference to something shown on user device 102. Transcribed user speech 1258, for example, includes a reference to "that" soccer game ("Put on that soccer game."). The particular soccer game desired can be unclear from the speech input alone. In some examples, however, the content shown on user device 102 can be used to disambiguate user requests and determine user intent. In one example, content shown on user device 102 prior to the user making the request (e.g., prior to interface 1254 appearing on touchscreen 246) can be used to determine user intent (as can content appearing within interface 1254, such as previous queries and results). In the illustrated example, the content shown in interface 1150 of FIG. 11 can be used to determine the user intent from the command to put on "that" soccer game. The TV listing of television programs 1152 includes a variety of different programs, one of which is titled "Soccer" appearing on Channel 5. The appearance of the soccer listing can be used to determine the user's intent from uttering "that" soccer game. In particular, the user's reference to "that" soccer game can be resolved to the soccer program appearing in the TV listing of interface 1150. Accordingly, the virtual assistant can cause playback of that particular soccer game that the user desired (e.g., by causing television set-top box 104 to tune to the appropriate channel and show the game).

In other examples, a user can reference television programs shown in interface 1150 in a variety of other ways (e.g., the show on channel eight, the news, the drama show, the advertisement, the first show, etc.), and user intent can similarly be determined based on displayed content. It should be appreciated that metadata associated with displayed content (e.g., TV program descriptions), fuzzy matching techniques, synonym matching, and the like can further be used in conjunction with displayed content to determine user intent. For example, the term "advertisement" can be matched to the description "paid programming" (e.g., using synonyms and/or fuzzy matching techniques) to determine user intent from a request to show "the advertisement." Likewise, the description of a particular TV program can be analyzed in determining user intent. For example, the term "law" could be identified in the detailed description of a courtroom drama, and the user intent can be determined from a user request to watch the "law" show based on the detailed description associated with the content shown in interface 1150. Displayed content and data associated with it can thus be used to disambiguate user requests and determine user intent.

Figure 13:
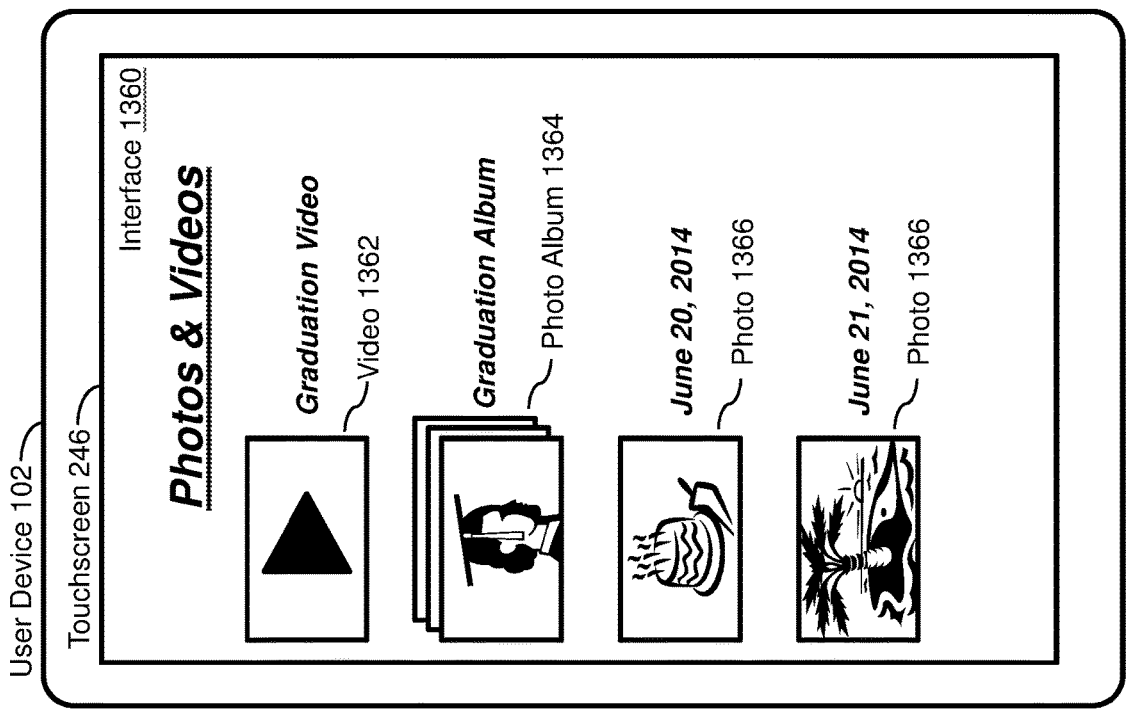
FIG. 13 illustrates exemplary picture and video content on a mobile user device.

FIG. 13 illustrates exemplary picture and video content on user device 102, which can include a mobile telephone, tablet computer, remote control, or the like with touchscreen 246 (or another display). FIG. 13 illustrates interface 1360 including a listing of photos and videos. Interface 1360 can, for example, correspond to a particular application on user device 102, such as a media content application, file navigation application, storage application, remote storage management application, camera application, or the like. As shown, interface 1360 can include video 1362, photo album 1364 (e.g., a group of multiple photos), and photos 1366. As discussed above with reference to FIG. 11 and FIG. 12, content shown on user device 102 can be used to determine user intent from speech input relating to that content. The user intent can then be used to cause playback or display of content on another device and display (e.g., on television set-top box 104 and display 112 and/or speakers 111). For example, content shown in interface 1360 on user device 102 can be used to disambiguate user requests and to determine user intent from speech input, and the determined user intent can then be used to play or display media via television set-top box 104.

Figure 14:
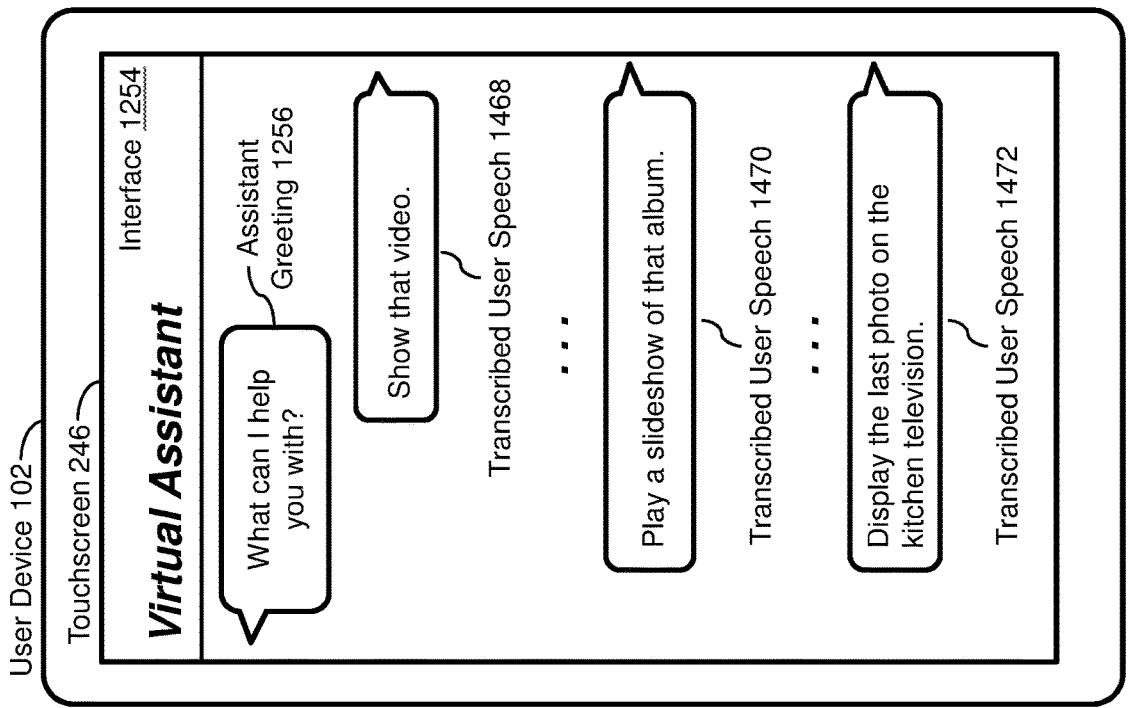
FIG. 14 illustrates exemplary media display control using a virtual assistant.

FIG. 14 illustrates exemplary media display control using a virtual assistant. FIG. 14 illustrates interface 1254, which can include a virtual assistant interface formatted as a conversational dialog between the assistant and the user. As shown, interface 1254 can include assistant greeting 1256 prompting the user to make a request. Within the dialog, user speech can then be transcribed as shown by the examples of FIG. 14. In some examples, interface 1254 can appear on user device 102 in response to a trigger to initiate receipt of speech input (triggers such as button presses, key phrases, or the like).

In one example, a user request to play media content or display media via television set-top box 104 (e.g., on display 112 and speakers 111) can include an ambiguous reference to something shown on user device 102. Transcribed user speech 1468, for example, includes a reference to "that" video ("Show that video."). The particular video referenced can be unclear from the speech input alone. In some examples, however, the content shown on user device 102 can be used to disambiguate user requests and determine user intent. In one example, content shown on user device 102 prior to the user making the request (e.g., prior to interface 1254 appearing on touchscreen 246) can be used to determine user intent (as can content appearing within interface 1254, such as previous queries and results). In the example of user speech 1468, the content shown in interface 1360 of FIG. 13 can be used to determine the user intent from the command to show "that" video. The listing of photos and videos in interface 1360 includes a variety of different photos and a video, including video 1362, photo album 1354, and photos 1366. As only one video appears in interface 1360 (e.g., video 1362), the appearance of video 1362 in interface 1360 can be used to determine the user's intent from uttering "that" video. In particular, the user's reference to "that" video can be resolved to video 1362 (titled "Graduation Video") appearing in interface 1360. Accordingly, the virtual assistant can cause playback of video 1362 (e.g., by causing video 1362 to be transmitted to television set-top box 104 from user device 102 or remote storage and causing playback to commence).

In another example, transcribed user speech 1470 includes a reference to "that" album ("Play a slideshow of that album."). The particular album referenced can be unclear from the speech input alone. The content shown on user device 102 can again be used to disambiguate the user request. In particular, the content shown in interface 1360 of FIG. 13 can be used to determine the user intent from the command to play a slideshow of "that" album. The listing of photos and videos in interface 1360 includes photo album 1354. The appearance of photo album 1364 in interface 1360 can be used to determine the user's intent from uttering "that" album. In particular, the user's reference to "that" album can be resolved to photo album 1364 (titled "Graduation Album") appearing in interface 1360. In response to user speech 1470, therefore, the virtual assistant can cause a slideshow to be displayed including the photos from photo album 1364 (e.g., by causing the photos of photo album 1364 to be transmitted to television set-top box 104 from user device 102 or remote storage and causing a slideshow of the photos to commence).

In yet another example, transcribed user speech 1472 includes a reference to the "last" photo ("Display the last photo on the kitchen television."). The particular photo referenced can be unclear from the speech input alone. The content shown on user device 102 can again be used to disambiguate the user request. In particular, the content shown in interface 1360 of FIG. 13 can be used to determine the user intent from the command to display the "last" photo. The listing of photos and videos in interface 1360 includes two individual photos 1366. The appearance of photos 1366 in interface 1360—and particularly the order of appearance of photos 1366 within the interface—can be used to determine the user's intent from utter the "last" photo. In particular, the user's reference to the "last" photo can be resolved to photo 1366 appearing at the bottom of interface 1360 (dated Jun. 21, 2014). In response to user speech 1472, therefore, the virtual assistant can cause the last photo 1366 shown in interface 1360 to be displayed (e.g., by causing the last photo 1366 to be transmitted to television set-top box 104 from user device 102 or remote storage and causing the photo to be displayed).

In other examples, a user can reference media content shown in interface 1360 in a variety of other ways (e.g., the last couple of photos, all of the videos, all of the photos, the graduation album, the graduation video, the photo from June 21st, etc.), and user intent can similarly be determined based on displayed content. It should be appreciated that metadata associated with displayed content (e.g., timestamps, location information, titles, descriptions, etc.), fuzzy matching techniques, synonym matching, and the like can further be used in conjunction with displayed content to determine user intent. Displayed content and data associated with it can thus be used to disambiguate user requests and determine user intent.

It should be understood that any type of displayed content in any application interface of any application can be used in determining user intent. For example, images displayed on a webpage in an Internet browser application can be referenced in speech input, and the displayed webpage content can be analyzed to identify the desired images. Similarly, a music track in a list of music in a music application can be referenced in speech input by title, genre, artist, band name, or the like, and the displayed content in the music application (and associated metadata in some examples) can be used to determine user intent from the speech input. As discussed above, the determined user intent can then be used to cause media display or playback via another device, such as via television set-top box 104.

In some examples, user identification, user authentication, and/or device authentication can be employed to determine whether media control can be permitted, determine media content available for display, determine access permissions, and the like. For example, it can be determined whether a particular user device (e.g., user device 102) is authorized to control media on, for example, television set-top box 104. A user device can be authorized based on a registration, pairing, trust determination, passcode, security question, system setup, or the like. In response to determining that a particular user device is authorized, attempts to control television set-top box 104 can be permitted (e.g., media content can be played in response to determining that a requesting device is authorized to control media). In contrast, media control commands or requests from unauthorized devices can be ignored, and/or users of such devices can be prompted to register their devices for use in controlling a particular television set-top box 104.

In another example, a particular user can be identified, and personal data associated with the user can be used to determine user intent of requests. For example, a user can be identified based on speech input, such as by voice recognition using a voiceprint of the user. In some examples, users can utter a particular phrase that is analyzed for voice recognition. In other examples, speech input requests directed to the virtual assistant can be analyzed using voice recognition to identify the speaker. A user can also be identified based on the source of the speech input sample (e.g., on a user's personal device 102). A user can also be identified based on passwords, passcodes, menu selection, or the like. Speech input received from the user can then be interpreted based on personal data of the identified user. For example, user intent of speech input can be determined based on previous requests from the user, media content owned by the user, media content stored on the user's device, user preferences, user settings, user demographics (e.g., languages spoken, etc.), user profile information, user payment methods, or a variety of other personal information associated with a particular identified user. For instance, speech input referencing a favorites list or the like can be disambiguated based on personal data, and the user's personal favorites list can be identified. Speech input referencing "my" photos, "my" videos, "my" shows, or the like can likewise be disambiguated based on user identification to correctly identify photos, videos, and shows associated with the identified user (e.g., photos stored on a personal user device or the like). Similarly, speech input requesting purchase of content can be disambiguated to determine that the identified user's payment method should be charged for the purchase (as opposed to another user's payment method).

In some examples, user authentication can be used to determine whether a user is allowed to access media content, purchase media content, or the like. For example, voice recognition can be used to verify the identity of a particular user (e.g., using their voiceprint) to permit the user to make purchases using the user's payment method. Similarly, passwords or the like can be used to authenticate the user to permit purchases. In another example, voice recognition can be used to verify the identity of a particular user to determine whether the user is allowed to watch a particular program (e.g., a program having a particular parental guideline rating, a movie having a particular age suitability rating, or the like). For instance, a child's request for a particular program can be denied based on voice recognition indicating that the requester is not an authorized user able to view such content (e.g., a parent). In other examples, voice recognition can be used to determine whether users have access to particular subscription content (e.g., restricting access to premium channel content based on voice recognition). In some examples, users can utter a particular phrase that is analyzed for voice recognition. In other examples, speech input requests directed to the virtual assistant can be analyzed using voice recognition to identify the speaker. Certain media content can thus be played in response to first determining that a user is authorized in any of a variety of ways.

Figure 15:
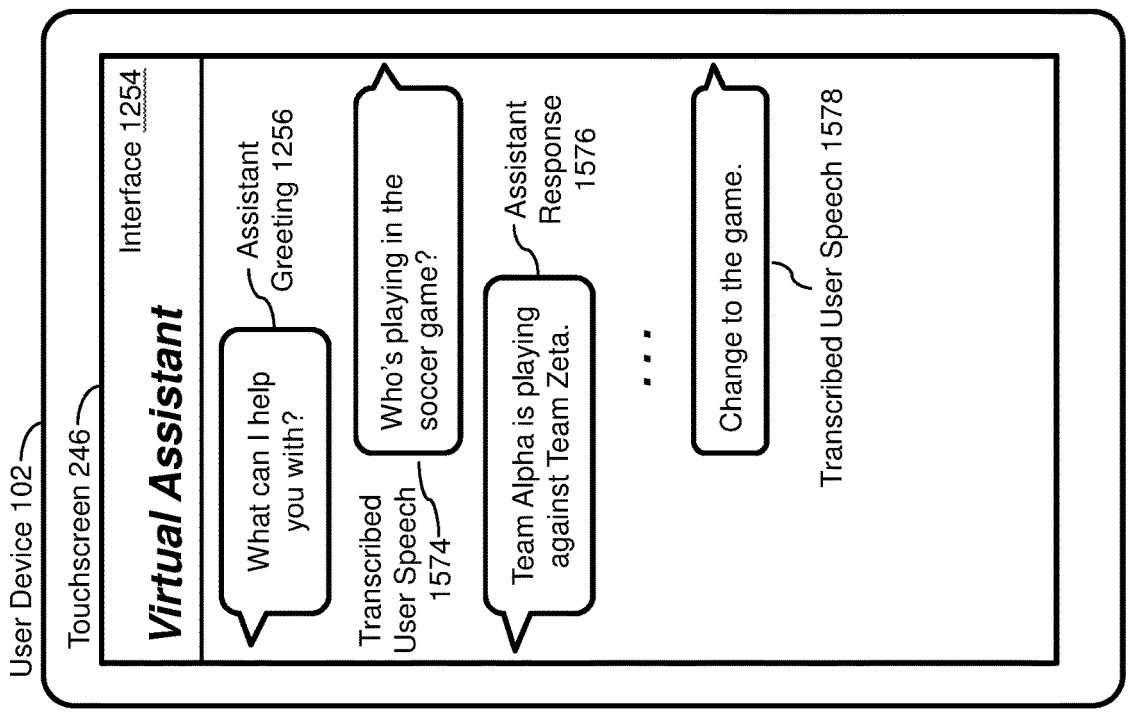
FIG. 15 illustrates exemplary virtual assistant interactions with results on a mobile user device and a media display device.

FIG. 15 illustrates exemplary virtual assistant interactions with results on a mobile user device and a media display device. In some examples, a virtual assistant can provide information and control on more than one device, such as on user device 102 as well as on television set-top box 104. Moreover, in some examples, the same virtual assistant interface used for control and information on user device 102 can be used to issue requests for controlling media on television set-top box 104. As such, the virtual assistant system can determine whether to display results or execute tasks on user device 102 or on television set-top box 104. In some examples, when employing user device 102 to control television set-top box 104, virtual assistant interface intrusion on a display associated with television set-top box 104 (e.g., display 112) can be minimized by displaying information on user device 102 (e.g., on touchscreen 246). In other examples, virtual assistant information can be displayed on display 112 alone, or virtual assistant information can be displayed on both user device 102 and display 112.

In some examples, a determination can be made as to whether results of a virtual assistant query should be displayed on user device 102 directly or on display 112 associated with television set-top box 104. In one example, in response to determining that the user intent of a query includes a request for information, an informational response can be displayed on user device 102. In another example, in response to determining that the user intent of a query includes a request to play media content, media content responsive to the query can be played via television set-top box 104.

FIG. 15 illustrates virtual assistant interface 1254 with a conversational dialog example between a virtual assistant and a user. Assistant greeting 1256 can prompt the user to make a request. In the first query, transcribed user speech 1574 (which can also be typed or entered in other ways) includes a request for an informational answer associated with displayed media content. In particular, transcribed user speech 1574 inquires who is playing in a soccer game that may be, for example, shown on an interface on user device 102 (e.g., listed in interface 1150 of FIG. 11) or on display 112 (e.g., listed in interface 510 of FIG. 5 or playing as video 726 on display 112 of FIG. 7B). The user intent of transcribed user speech 1574 can be determined based on displayed media content. For example, the particular soccer game in question can be identified based on content shown on user device 102 or on display 112. The user intent of transcribed user speech 1574 can include obtaining an informational answer detailing the teams playing in the soccer game identified based on the displayed content. In response to determining that the user intent includes a request for an informational answer, the system can determine to display the response within interface 1254 in FIG. 15 (as opposed to on display 112). The response to the query can, in some examples, be determined based on metadata associated with the displayed content (e.g., based on a description of the soccer game in a television listing). As shown, assistant response 1576 can thus be displayed on touchscreen 246 of user device 102 in interface 1254, identifying teams Alpha and Zeta as playing in the game. Accordingly, in some examples, an informational response can be displayed within interface 1254 on user device 102 based on determining that a query includes an informational request.

The second query in interface 1254, however, includes a media request. In particular, transcribed user speech 1578 requests changing displayed media content to "the game." The user intent of transcribed user speech 1578 can be determined based on displayed content (e.g., to identify which game the user desires), such as a game listed in interface 510 of FIG. 5, a game listed in interface 1150 of FIG. 11, a game referenced in previous queries (e.g., in transcribed user speech 1574), or the like. The user intent of transcribed user speech 1578 can thus include changing displayed content to a particular game—here, the soccer game with teams Alpha and Zeta. In one example, the game can be displayed on user device 102. In other examples, however, based on the query including a request to play media content, the game can be shown via television set-top box 104. In particular, in response to determining that the user intent includes a request to play media content, the system can determine to display the media content result via television set-top box 104 on display 112 (as opposed to within interface 1254 in FIG. 15). In some examples, a response or paraphrase confirming the virtual assistant's intended action can be shown in interface 1254 or on display 112 (e.g., "Changing to the soccer game.").

Figure 16:
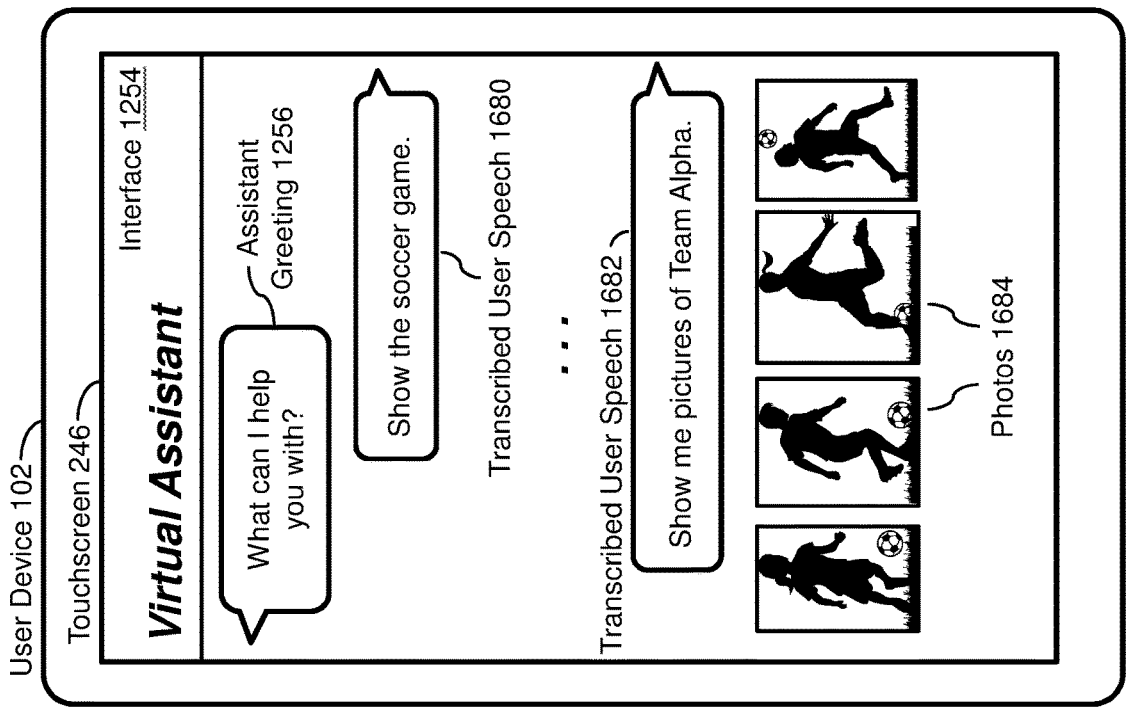
FIG. 16 illustrates exemplary virtual assistant interactions with media results on a media display device and a mobile user device.

FIG. 16 illustrates exemplary virtual assistant interactions with media results on a media display device and a mobile user device. In some examples, a virtual assistant can provide access to media on both user device 102 and television set-top box 104. Moreover, in some examples, the same virtual assistant interface used for media on user device 102 can be used to issue requests for media on television set-top box 104. As such, the virtual assistant system can determine whether to display media results on user device 102 or on display 112 via television set-top box 104.

In some examples, a determination can be made as to whether to display media on device 102 or on display 112 based on media result format, user preference, default settings, an express command in the request itself, or the like. For example, the format of a media result to a query can be used to determine on which device to display the media result by default (e.g., without specific instructions). A television program can be better suited for display on a television, a large format video can be better suited for display on a television, thumbnail photos can be better suited for display on a user device, small format web videos can be better suited for display on a user device, and various other media formats can be better suited for display on either a relatively large television screen or a relatively small user device display. Thus, in response to a determination that media content should be displayed on a particular display (e.g., based on media format), the media content can be displayed on that particular display by default.

FIG. 16 illustrates virtual assistant interface 1254 with examples of queries related to playing or displaying media content. Assistant greeting 1256 can prompt the user to make a request. In the first query, transcribed user speech 1680 includes a request to show a soccer game. As in the examples discussed above, the user intent of transcribed user speech 1680 can be determined based on displayed content (e.g., to identify which game the user desires), such as a game listed in interface 510 of FIG. 5, a game listed in interface 1150 of FIG. 11, a game referenced in previous queries, or the like. The user intent of transcribed user speech 1680 can thus include displaying a particular soccer game that may, for example, be aired on television. In response to determining that the user intent includes a request to display media that is formatted for television (e.g., a televised soccer game), the system can automatically determine to display the desired media on display 112 via television set-top box 104 (as opposed to on user device 102 itself). The virtual assistant system can then cause television set-top box 104 to tune to the soccer game and show it on display 112 (e.g., by executing the necessary tasks and/or sending the appropriate commands).

In the second query, however, transcribed user speech 1682 includes a request to show pictures of players of a team (e.g., pictures of "Team Alpha"). As in the examples discussed above, the user intent of transcribed user speech 1682 can be determined. The user intent of transcribed user speech 1682 can include performing a search (e.g., a web search) for pictures associated with "Team Alpha," and displaying the resulting pictures. In response to determining that the user intent includes a request to display media that may be presented in thumbnail format, or media associated with a web search, or other non-specific media without a particular format, the system can automatically determine to display the desired media result on touchscreen 246 in interface 1254 of user device 102 (as opposed to displaying the resulting pictures on display 112 via television set-top box 104). For example, as shown, thumbnail photos 1684 can be displayed within interface 1254 on user device 102 in response to the user's query. The virtual assistant system can thus cause media of a certain format, or media that might be presented in a certain format (e.g., in a group of thumbnails), to be displayed on user device 102 by default.

It should be appreciated that, in some examples, the soccer game referenced in user speech 1680 can be shown on user device 102, and photos 1684 can be shown on display 112 via television set-top box 104. The default device for display, however, can be determined automatically based on media format, thereby simplifying media commands for the user. In other examples, the default device for displaying requested media content can be determined based on user preferences, default settings, the device used most recently to display content, voice recognition to identify a user and a device associated with that user, or the like. For example, a user can set a preference or a default configuration can be set to display certain types of content (e.g., videos, slideshows, television programs, etc.) on display 112 via television set-top box 104 and other types of content (e.g., thumbnails, photos, web videos, etc.) on touchscreen 246 of user device 102. Similarly, preferences or default configurations can be set to respond to certain queries by displaying content on one device or the other. In another example, all content can be displayed on user device 102 unless the user instructs otherwise.

In still other examples, a user query can include a command to display content on a particular display. For example, user speech 1472 of FIG. 14 includes a command to display a photo on the kitchen television. As a result, the system can cause display of the photo on a television display associated with the user's kitchen as opposed to displaying the photo on user device 102. In other examples, a user can dictate which display device to use in a variety of other ways (e.g., on TV, on the big screen, in the living room, in the bedroom, on my tablet, on my phone, etc.). The display device to use for displaying media content results of virtual assistant queries can thus be determined in a variety of different ways.

Figure 17:
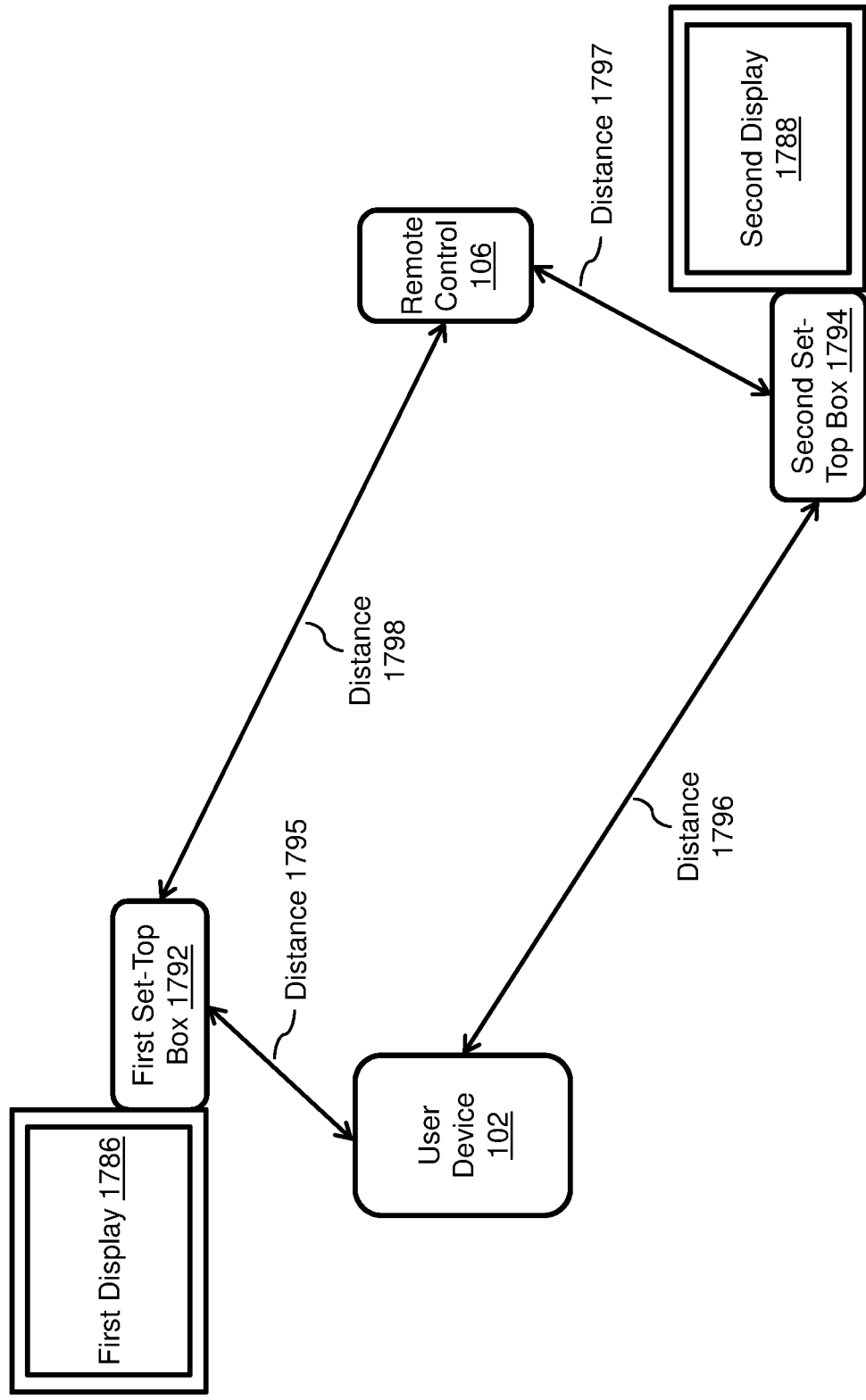
FIG. 17 illustrates exemplary media device control based on proximity.

FIG. 17 illustrates exemplary media device control based on proximity. In some examples, users may have multiple televisions and television set-top boxes within the same household or on the same network. For example, a household may have a television and set-top box set in the living room, another set in the bedroom, and another set in the kitchen. In other examples, multiple set-top boxes can be connected to the same network, such as a common network in an apartment or office building. Although users can pair, connect, or otherwise authorize remote control 106 and user device 102 for a particular set-top box to avoid unauthorized access, in other examples, remote controls and/or user devices can be used to control more than one set-top box. A user can, for example, use a single user device 102 to control a set-top box in the bedroom, in the living room, and in the kitchen. A user can also, for example, use a single user device 102 to control their own set-top box in their own apartment, as well as control a neighbor's set-top box in a neighbor's apartment (e.g., sharing content from user device 102 with the neighbor, such as showing a slideshow on the neighbor's TV of photos stored on user device 102). Because the user can use a single user device 102 to control multiple different set-top boxes, the system can determine to which set-top box of multiple set-top boxes to send commands. Likewise, because a household can have multiple remote controls 106 that can operate multiple set-top boxes, the system can similarly determine to which set-top box of multiple set-top boxes to send commands.

In one example, proximity of devices can be used to determine to which of multiple set-top boxes to send commands (or on which display to show requested media content). A proximity can be determined between a user device 102 or remote control 106 and each of multiple set-top boxes. Issued commands can then be sent to the nearest set-top box (or requested media content can be displayed on the nearest display). Proximity can be determined (or at least approximated) in any of a variety of ways, such as time-of-flight measurements (e.g., using radio frequency), Bluetooth LE, electronic ping signals, proximity sensors, sound travel measurements, or the like. Measured or approximated distances can then be compared, and the device with the shortest distance can be issued the command (e.g., the nearest set-top box).

FIG. 17 illustrates multi-device system 1790 including first set-top box 1792 with first display 1786 and second set-top box 1794 with second display 1788. In one example, a user can issue a command from user device 102 to display media content (e.g., without necessarily specifying where or on which device). Distance 1795 to first set-top box 1792 and distance 1796 to second set-top box 1794 can then be determined (or approximated). As shown, distance 1796 can be greater than distance 1795. Based on proximity, the command from user device 102 can be issued to first set-top box 1792 as the nearest device and the likeliest to match the user's intent. In some examples, a single remote control 106 can also be used to control more than one set-top box. The desired device for control at a given time can be determined based on proximity. Distance 1797 to second set-top box 1794 and distance 1798 to first set-top box 1792 can be determined (or approximated). As shown, distance 1798 can be greater than distance 1797. Based on proximity, commands from remote control 106 can be issued to second set-top box 1794 as the nearest device and the likeliest to match the user's intent. Distance measurements can be refreshed regularly or with each command to accommodate, for example, a user moving to a different room and desiring to control a different device.

It should be understood that a user can specify a different device for a command, in some cases overriding proximity. For example, a list of available display devices can be displayed on user device 102 (e.g., listing first display 1786 and second display 1788 by setup name, designated room, or the like, or listing first set-top box 1792 and second set-top box 1794 by setup name, designated room, or the like). A user can select one of the devices from the list, and commands can then be sent to the selected device. Requests for media content issued at user device 102 can then be handled by displaying the desired media on the selected device. In other examples, users can speak the desired device as part of a spoken command (e.g., show the game on the kitchen television, change to the cartoon channel in the living room, etc.).

In still other examples, the default device for showing requested media content can be determined based on status information associated with a particular device. For example, it can be determined whether headphones (or a headset) are attached to user device 102. In response to determining that headphones are attached to user device 102 when a request to display media content is received, the requested content can be displayed on user device 102 by default (e.g., assuming the user is consuming content on user device 102 and not on a television). In response to determining that headphones are not attached to user device 102 when a request to display media content is received, the requested content can be displayed on either user device 102 or on a television according to any of the various determination methods discussed herein. Other device status information can similarly be used to determine whether requested media content should be displayed on user device 102 or a set-top box 104, such as ambient lighting around user device 102 or set-top box 104, proximity of other devices to user device 102 or set-top box 104, orientation of user device 102 (e.g., landscape orientation can be more likely to indicate desired viewing on user device 102), display status of set-top box 104 (e.g., in a sleep mode), time since the last interaction on a particular device, or any of a variety of other status indicators for user device 102 and/or set-top box 104.

Figure 18:
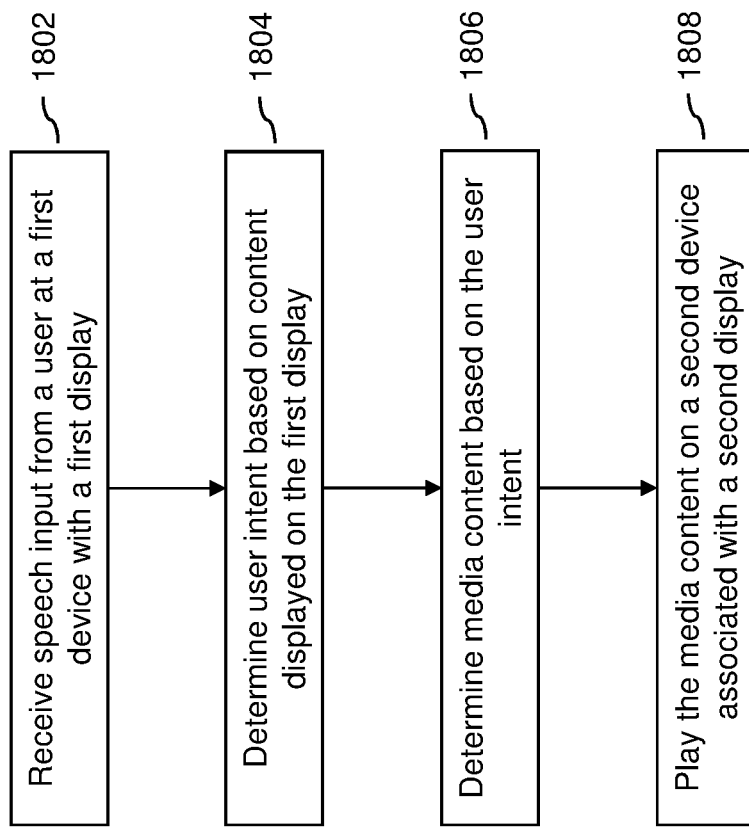
FIG. 18 illustrates an exemplary process for controlling television interactions using a virtual assistant and multiple user devices.

FIG. 18 illustrates exemplary process 1800 for controlling television interactions using a virtual assistant and multiple user devices. At block 1802, speech input can be received from a user at a first device with a first display. For example, speech input can be received from a user at user device 102 or remote control 106 of system 100. The first display can include touchscreen 246 of user device 102 or a display associated with remote control 106 in some examples.

At block 1804, user intent can be determined from the speech input based on content displayed on the first display. For example, content such as television programs 1152 in interface 1150 of FIG. 11 or photos and videos in interface 1360 of FIG. 13 can be analyzed and used to determine user intent for speech input. In some examples, a user can refer to content shown on the first display in ambiguous ways, and the references can be disambiguated by analyzing the content shown on the first display to resolve the references (e.g., determining the user intent for "that" video, "that" album, "that" game, or the like), as discussed above with reference to FIG. 12 and FIG. 14.

Referring again to process 1800 of FIG. 18, at block 1806, media content can be determined based on the user intent. For example, a particular video, photo, photo album, television program, sporting event, music track, or the like can be identified based on the user intent. In the example of FIG. 11 and FIG. 12 discussed above, for instance, the particular soccer game shown on channel five can be identified based on the user intent referring to "that" soccer game shown in interface 1150 of FIG. 11. In the examples of FIG. 13 and FIG. 14 discussed above, the particular video 1362 titled "Graduation Video," the particular photo album 1364 titled "Graduation Album," or a particular photo 1366 can be identified based on the user intent determined from the speech input examples of FIG. 14.

Referring again to process 1800 of FIG. 18, at block 1808, the media content can be played on a second device associated with a second display. For example, the determined media content can be played via television set-top box 104 on display 112 with speakers 111. Playing the media content can include tuning to a particular television channel, playing a particular video, showing a slideshow of photos, displaying a particular photo, playing a particular audio track, or the like on television set-top box 104 or another device.

In some examples, a determination can be made as to whether responses to speech input directed to a virtual assistant should be displayed on a first display associated with a first device (e.g., user device 102) or a second display associated with a second device (e.g., television set-top box 104). For example, as discussed above with reference to FIG. 15 and FIG. 16, informational answers or media content suited for display on a smaller screen can be displayed on user device 102, while media responses or media content suited for display on a larger screen can be displayed on a display associated with set-top box 104. As discussed above with reference to FIG. 17, in some examples, the distance between user device 102 and multiple set-top boxes can be used to determine on which set-top box to play media content or to which set-top box to issue commands. Various other determinations can similarly be made to provide a convenient and user-friendly experience where multiple devices may be interacting.

In some examples, as content shown on user device 102 can be used to inform interpretations of speech input as discussed above, content shown on display 112 can likewise be used to inform interpretations of speech input. In particular, content shown on a display associated with television set-top box 104 can be used along with metadata associated with that content to determine user intent from speech input, disambiguate user queries, respond to content-related queries, or the like.

Figure 19:
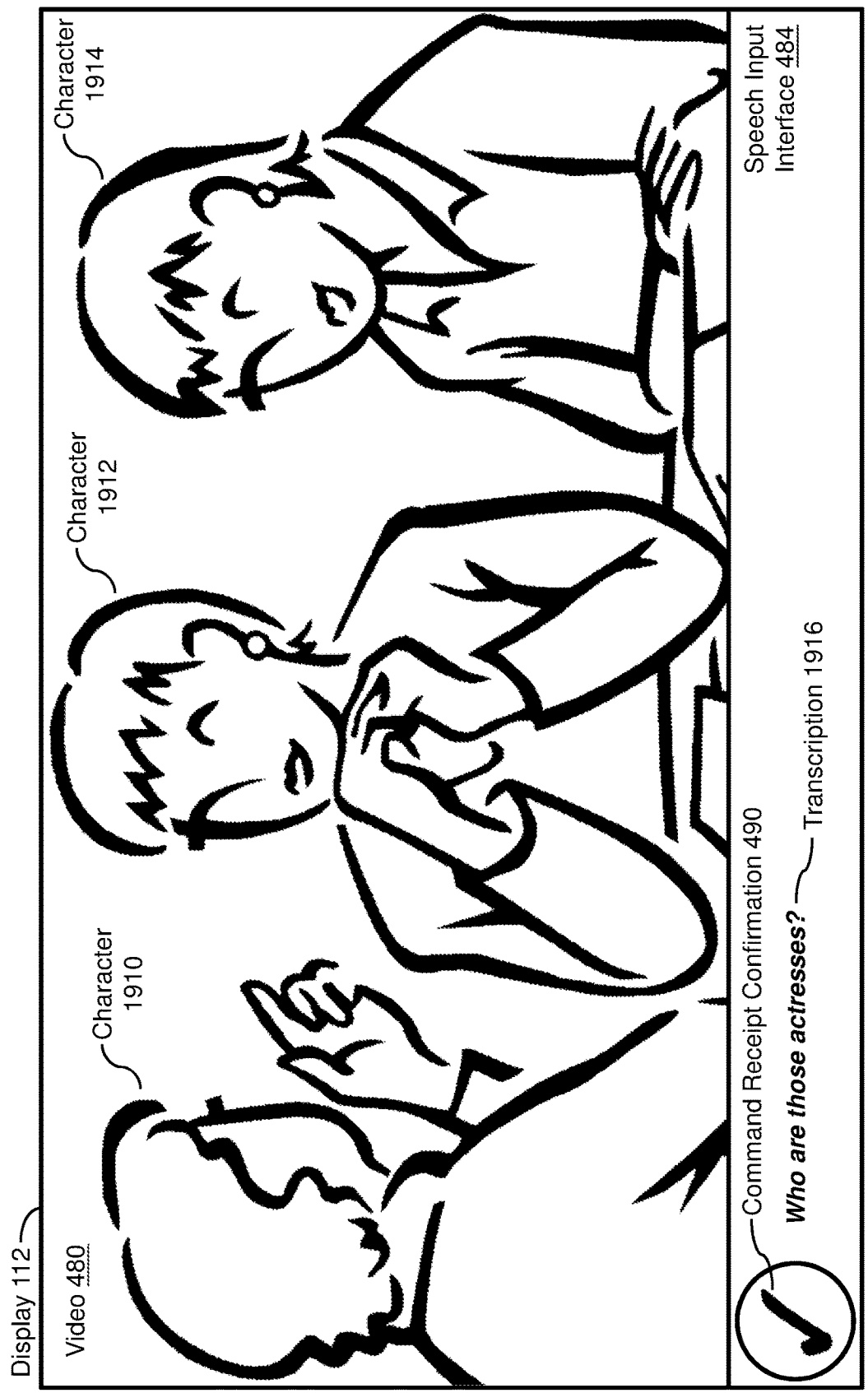
FIG. 19 illustrates an exemplary speech input interface with a virtual assistant query about background video content.

FIG. 19 illustrates exemplary speech input interface 484 (described above) with a virtual assistant query about video 480 shown in the background. In some examples, user queries can include questions about media content shown on display 112. For example, transcription 1916 includes a query requesting identification of actresses ("Who are those actresses?"). Content shown on display 112—along with metadata or other descriptive information about the content—can be used to determine user intent from speech input relating to that content as well as to determine responses to queries (responses including both informational responses as well as media responses providing media selections to the user). For example, video 480, a description of video 480, a character and actor list for video 480, rating information for video 480, genre information for video 480, and a variety of other descriptive information associated with video 480 can be used to disambiguate user requests and determine responses to user queries. Associated metadata can include, for example, identifying information for character 1910, character 1912, and character 1914 (e.g., character names along with the names of the actresses who play the characters). Metadata for any other content can similarly include a title, a description, a list of characters, a list of actors, a list of players, a genre, producer names, director names, or a display schedule associated with the content shown on the display or the viewing history of media content on the display (e.g., recently displayed media).

In one example, a user query directed to a virtual assistant can include an ambiguous reference to something shown on display 112. Transcription 1916, for example, includes a reference to "those" actresses ("Who are those actresses?"). The particular actresses the user is asking about can be unclear from the speech input alone. In some examples, however, the content shown on display 112 and associated metadata can be used to disambiguate user requests and determine user intent. In the illustrated example, the content shown on display 112 can be used to determine the user intent from the reference to "those" actresses. In one example, television set-top box 104 can identify playing content along with details associated with the content. In this instance, television set-top box 104 can identify the title of video 480 along with a variety of descriptive content. In other examples, a television show, sporting event, or other content can be shown that can be used in conjunction with associated metadata to determine user intent. In addition, in any of the various examples discussed herein, speech recognition results and intent determination can weight terms associated with displayed content higher than alternatives. For example, actor names for on-screen characters can be weighted higher while those actors appear on screen (or while a show is playing in which they appear), which can provide for accurate speech recognition and intent determination of likely user requests associated with displayed content.

In one example, a character and/or actor list associated with video 480 can be used to identify all or the most prominent actresses appearing in video 480, which might include actresses 1910, 1912, and 1914. The identified actresses can be returned as a possible result (including fewer or additional actresses if the metadata resolution is coarse). In another example, however, metadata associated with video 480 can include an identification of which actors and actresses appear on screen at a given time, and the actresses appearing at the time of the query can be determined from that metadata (e.g., specifically identifying actresses 1910, 1912, and 1914). In yet another example, a facial recognition application can be used to identify actresses 1910, 1912, and 1914 from the images shown on display 112. In still other examples, various other metadata associated with video 480 and various other recognition approaches can be used to identify the user's likely intent in referring to "those" actresses.

In some examples, the content shown on display 112 can change during submission of a query and determination of a response. As such, a viewing history of media content can be used to determine user intent and determine the response to a query. For example, should video 480 move to another view (e.g., with other characters) before a response to the query is generated, the result of the query can be determined based on the user's view at the time the query was spoken (e.g., the characters shown on screen at the time the user initiated the query). In some instances, a user might pause playing media to issue a query, and the content shown when paused can be used with associated metadata to determine user intent and a response to the query.

Figure 20:
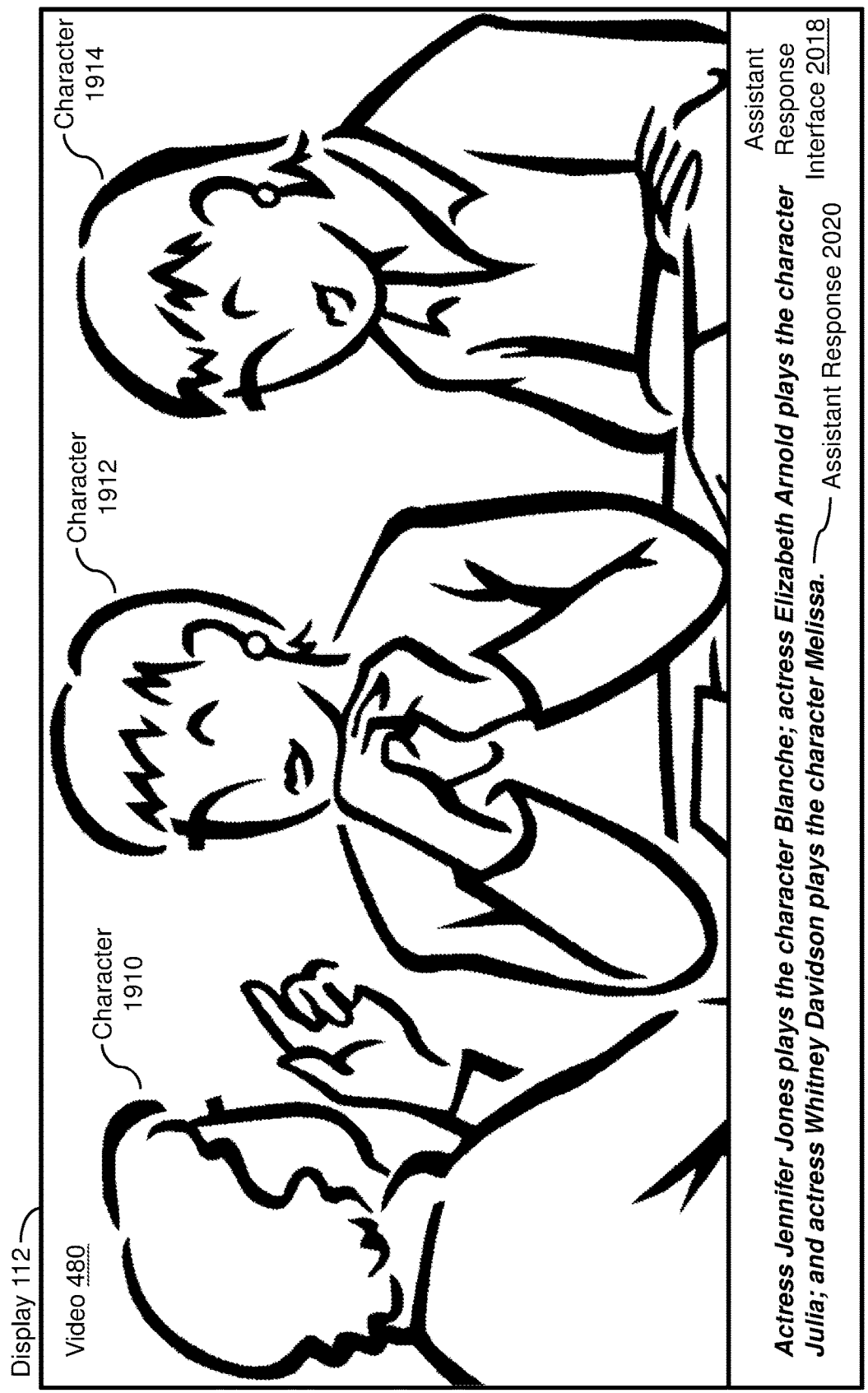
FIG. 20 illustrates an exemplary informational virtual assistant response over video content.

Given the determined user intent, a result of the query can be provided to the user. FIG. 20 illustrates exemplary assistant response interface 2018 including assistant response 2020, which can include the response determined from the query of transcription 1916 of FIG. 19. Assistant response 2020 can include, as shown, a listing of each actress's name and her associated character in video 480 ("Actress Jennifer Jones plays the character Blanche; actress Elizabeth Arnold plays the character Julia; and actress Whitney Davidson plays the character Melissa."). The listed actresses and characters in response 2020 can correspond to characters 1910, 1912, and 1914 appearing on display 112. As noted above, in some examples, the content shown on display 112 can change during submission of a query and determination of a response. As such, response 2020 can include information about content or characters that may no longer appear on display 112.

As with other interfaces displayed on display 112, assistant response interface 2018 can occupy a minimal amount of screen real estate while providing sufficient space to convey the desired information. In some examples, as with other text displayed in interfaces on display 112, assistant response 2020 can be scrolled up into the position shown in FIG. 20 from the bottom of display 112, displayed for a certain amount of time (e.g., a delay based on the length of the response), and scrolled up out of view. In other examples, interface 2018 can be slid downward out of view after a delay.

Figure 21:
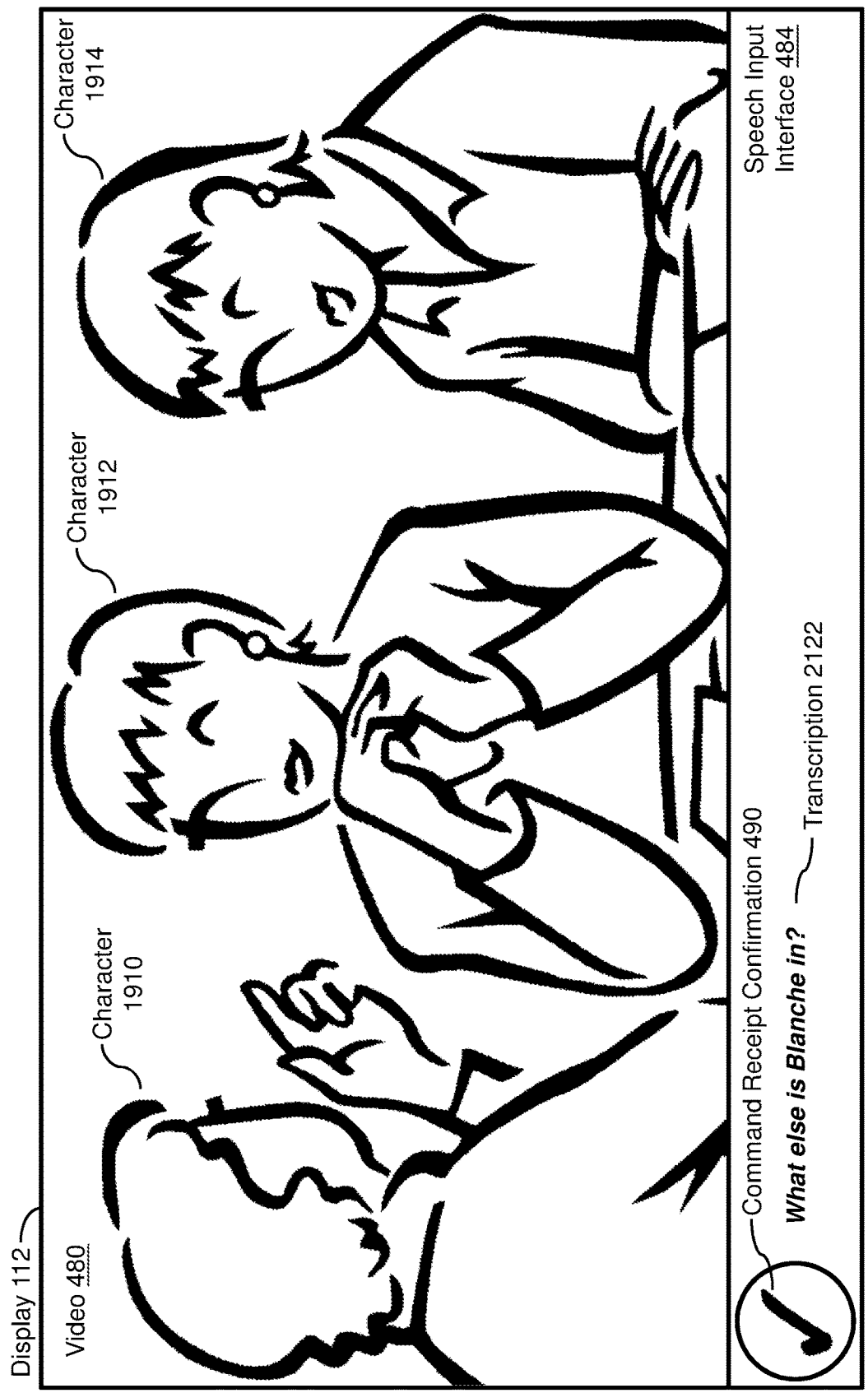
FIG. 21 illustrates an exemplary speech input interface with a virtual assistant query for media content associated with background video content.
Figure 22:
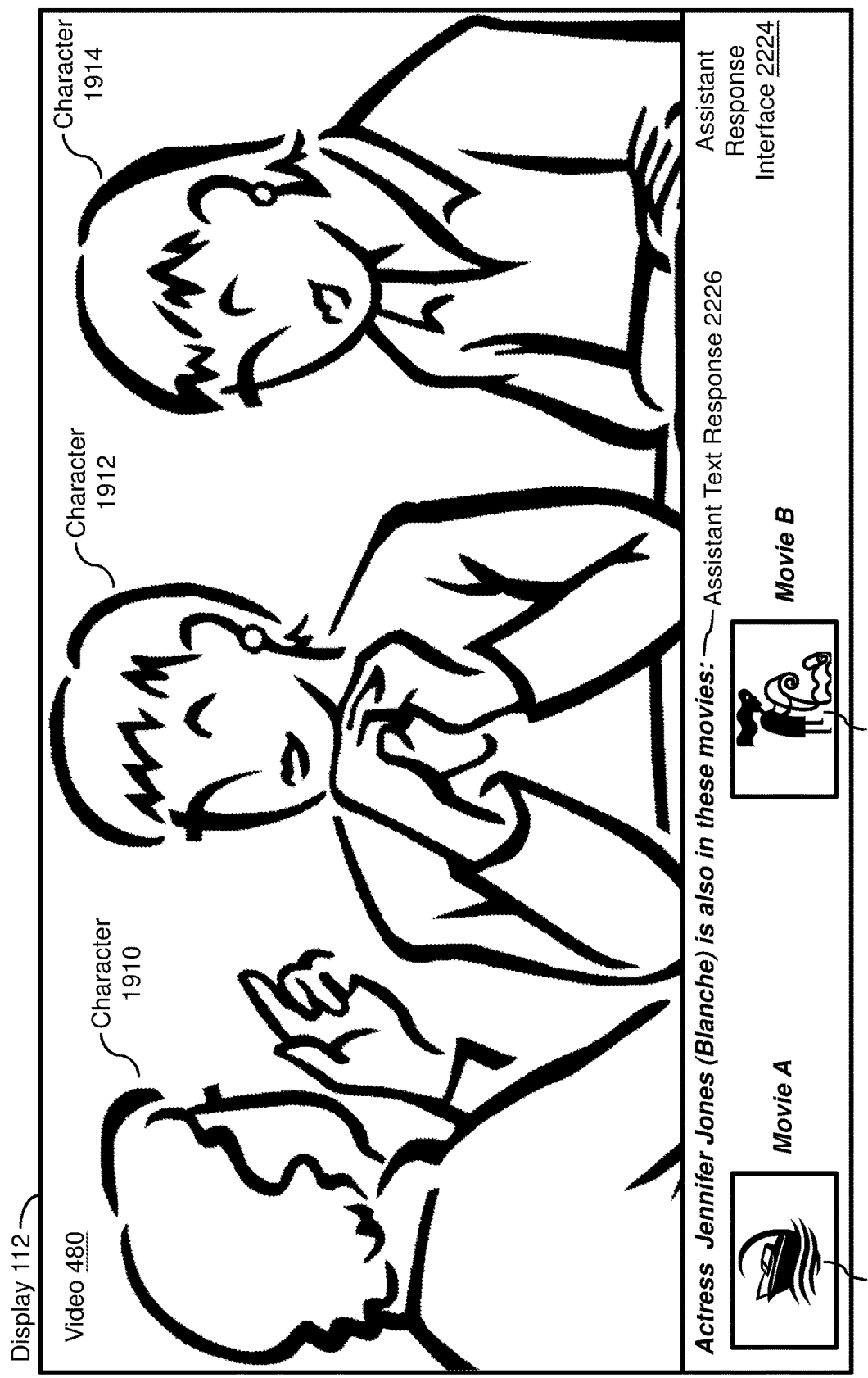
FIG. 22 illustrates an exemplary virtual assistant response interface with selectable media content.

FIG. 21 and FIG. 22 illustrate another example of determining user intent and responding to a query based on content shown on display 112. FIG. 21 illustrates exemplary speech input interface 484 with a virtual assistant query for media content associated with video 480. In some examples, user queries can include a request for media content associated with media shown on display 112. For example, a user can request other movies, television programs, sporting events, or the like associated with particular media based, for example, on a character, actor, genre, or the like. For example, transcription 2122 includes a query requesting other media associated with an actress in video 480, referenced by her character's name in video 480 ("What else is Blanche in?"). Content shown on display 112—along with metadata or other descriptive information about the content—can again be used to determine user intent from speech input relating to that content as well as to determine responses to queries (either informational or resulting in media selections).

In some examples, a user query directed to a virtual assistant can include an ambiguous reference using the name of a character, the name of an actor, the name of a program, the name of player, or the like. Without the context of the content shown on display 112 and its associated metadata, such references may be difficult to resolve accurately. Transcription 2122, for example, includes a reference to a character named "Blanche" from video 480. The particular actress or other individual the user is asking about can be unclear from the speech input alone. In some examples, however, the content shown on display 112 and associated metadata can be used to disambiguate user requests and determine user intent. In the illustrated example, the content shown on display 112 and associated metadata can be used to determine the user intent from the character name "Blanche." In this instance, a character list associated with video 480 can be used to determine that "Blanche" likely refers to the character "Blanche" in video 480. In another example, detailed metadata and/or facial recognition can be used to determine that a character with the name "Blanche" appears on the screen (or appeared on the screen at the initiation of the user's query), making the actress associated with that character the likeliest intention of the user's query. For example, it can be determined that characters 1910, 1912, and 1914 appear on display 112 (or appeared on display 112 at the initiation of the user's query), and their associated character names can then be referenced to determine the user intent of the query referencing the character Blanche. An actor list can then be used to identify the actress who plays Blanche, and a search can be conducted to identify other media in which the identified actress appears.

Given the determined user intent (e.g., resolution of the character reference "Blanche") and the determination of the result of the query (e.g., other media associated with the actress who plays "Blanche"), a response can be provided to the user. FIG. 22 illustrates exemplary assistant response interface 2224 including assistant text response 2226 and selectable video links 2228, which can be responsive to the query of transcription 2122 of FIG. 21. Assistant text response 2226 can include, as shown, a paraphrase of the user request introducing selectable video links 2228. Assistant text response 2226 can also include an indication of the disambiguation of the user's query—in particular, identifying actress Jennifer Jones as playing the character Blanche in video 480. Such a paraphrase can confirm to the user that the virtual assistant correctly interpreted the user's query and is providing the desired result.

Assistant response interface 2224 can also include selectable video links 2228. In some examples, various types of media content can be provided as results to a virtual assistant query, including movies (e.g., Movie A and Movie B of interface 2224). Media content displayed as a result of a query can include media that may be available to the user for consumption (for free, for purchase, or as part of a subscription). A user can select displayed media to view or consume the resulting content. For instance, a user can select one of selectable video links 2228 (e.g., using a remote control, voice command, or the like) to watch one of the other movies in which actress Jennifer Jones appears. In response to selection of one of selectable video links 2228, the video associated with the selection can be played, replacing video 480 on display 112. Thus, displayed media content and associated metadata can be used to determine user intent from speech input, and, in some examples, playable media can be provided as a result.

It should be understood that a user can reference actors, players, characters, locations, teams, sporting event details, movie subjects, or a variety of other information associated with displayed content in forming queries, and the virtual assistant system can similarly disambiguate such requests and determine user intent based on displayed content and associated metadata. Likewise, it should be understood that, in some examples, results can include media suggestions associated with the query, such as a movie, television show, or sporting event associated with a person who is the subject of a query (whether or not the user specifically requests such media content).

Moreover, in some examples, user queries can include requests for information associated with media content itself, such as queries about a character, an episode, a movie plot, a previous scene, or the like. As with the examples discussed above, displayed content and associated metadata can be used to determine user intent from such queries and determine a response. For instance, a user might request a description of a character (e.g., "What does Blanche do in this movie?"). The virtual assistant system can then identify from metadata associated with displayed content the requested information about the character, such as a character description or role (e.g., "Blanche is one of a group of lawyers and is known as a troublemaker in Hartford."). Similarly, a user might request an episode synopsis (e.g., "What happened in the last episode?"), and the virtual assistant system can search for and provide a description of the episode.

Figure 23A:
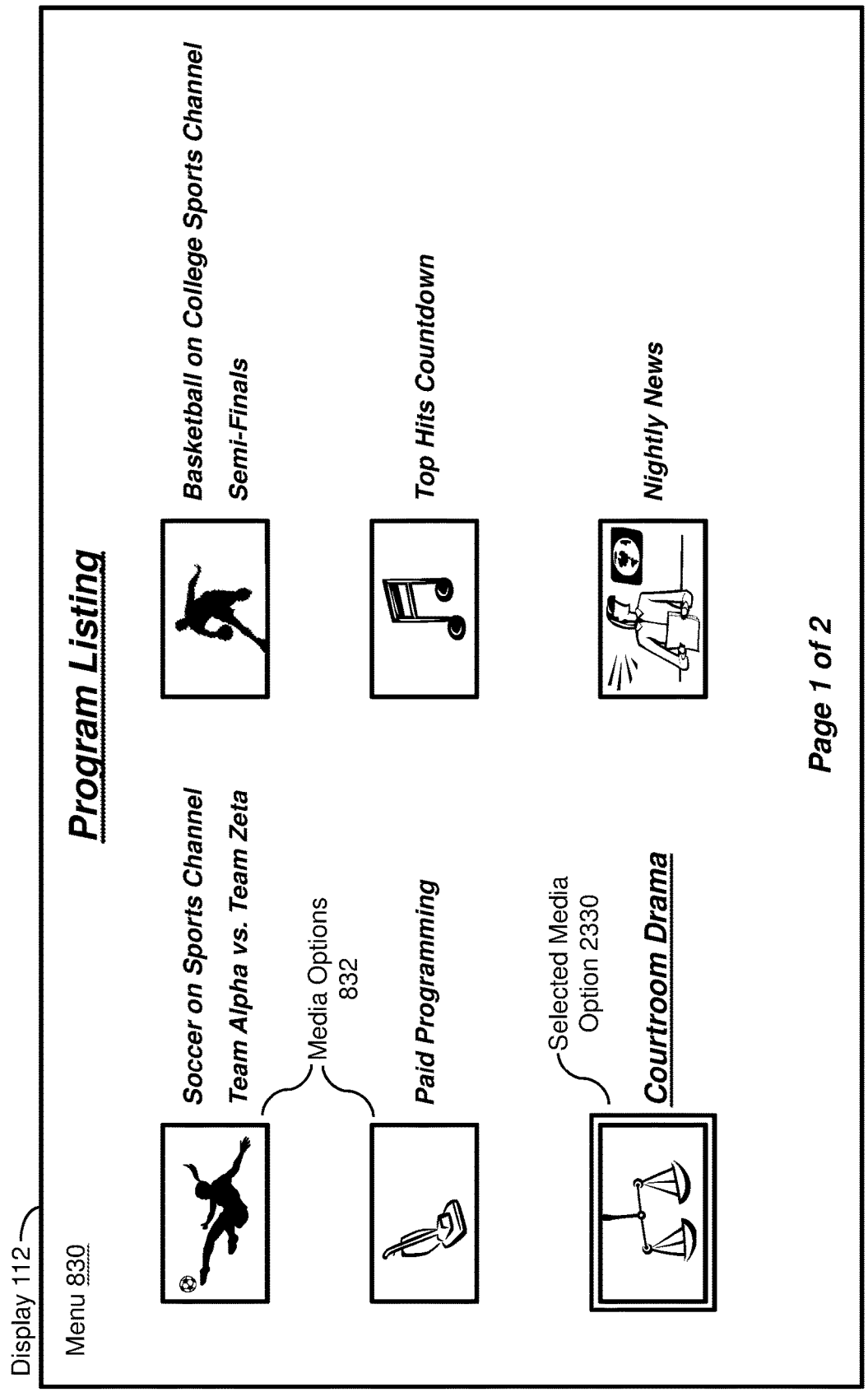
FIGS. 23A-23B illustrate exemplary pages of a program menu.
Figure 23B:
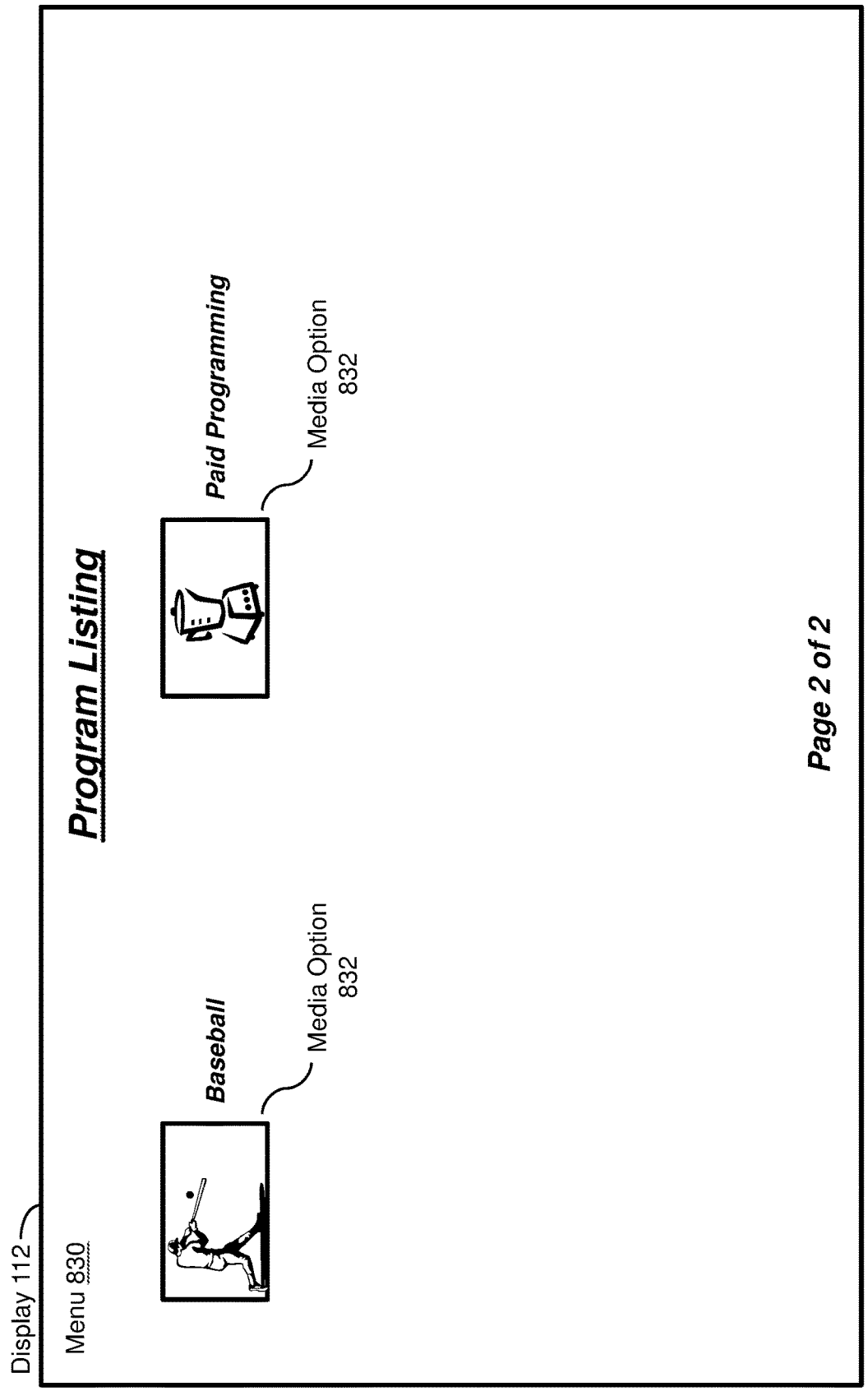

In some examples, content displayed on display 112 can include menu content, and such menu content can similarly be used to determine user intent of speech input and responses to user queries. FIGS. 23A-23B illustrate exemplary pages of a program menu 830. FIG. 23A illustrates a first page of media options 832, and FIG. 23B illustrates a second page of media options 832 (which can include a consecutive next page in a listing of content that extends beyond a single page).

In one example, a user request to play content can include an ambiguous reference to something shown on display 112 in menu 830. For example, a user viewing menu 830 can request to watch "that" soccer game, "that" basketball game, the vacuum advertisement, the law show, or the like. The particular program desired can be unclear from the speech input alone. In some examples, however, the content shown on display 112 can be used to disambiguate user requests and determine user intent. In the illustrated example, the media options in menu 830 (along with metadata associated with the media options in some examples) can be used to determine the user intent from commands including ambiguous references. For example, "that" soccer game can be resolved to the soccer game on the sports channel. "That" basketball game can be resolved to the basketball game on the college sports channel. The vacuum advertisement can be resolved to the paid programming show (e.g., based on metadata associated with the show describing a vacuum). The law show can be resolved to the courtroom drama based on metadata associated with the show and/or synonym matching, fuzzy matching, or other matching techniques. The appearance of the various media options 832 in menu 830 on display 112 can thus be used to disambiguate user requests.

In some examples, displayed menus can be navigated with a cursor, joystick, arrows, buttons, gestures, or the like. In such instances, a focus can be shown for a selected item. For example, a selected item can be shown in bold, underlined, outlined with a border, in larger size than other menu items, with a shadow, with a reflection, with a glow, and/or with any other features to emphasize which menu item is selected and has focus. For example, selected media option 2330 in FIG. 23A can have focus as the currently selected media option, and is shown with large, underlined type and a border.

In some examples, a request to play content or select a menu item can include an ambiguous reference to a menu item that has focus. For example, a user viewing menu 830 of FIG. 23A can request to play "that" show (e.g., "Play that show."). Similarly, a user could request various other commands associated with a menu item having focus, such as play, delete, hide, remind me to watch that, record that, or the like. The particular menu item or show that is desired can be unclear from the speech input alone. The content shown on display 112, however, can be used to disambiguate user requests and determine user intent. In particular, the fact that selected media option 2330 has focus in menu 830 can be used to identify the desired media subject of any of the commands referring to "that" show, commands without subjects (e.g., play, delete, hide, etc.), or any other ambiguous commands referring to the media content having focus. A menu item having focus can thus be used in determining user intent from speech input.

As with a viewing history of media content that can be used to disambiguate a user request (e.g., content displayed at the time a user initiated a request but since having passed), previously displayed menu or search result content can similarly be used to disambiguate later user requests after moving on, for example, to later menu or search result content. For example, FIG. 23B illustrates a second page of menu 830 with additional media options 832. A user can advance to the second page illustrated in FIG. 23B but refer back to content shown in the first page illustrated in FIG. 23A (e.g., media options 832 shown in FIG. 23A). For example, despite having moved on to the second page of menu 830, a user can request to watch "that" soccer game, "that" basketball game, or the law show—all of which are media options 832 recently displayed on a previous page of menu 830. Such references can be ambiguous, but the recently displayed menu content from the first page of menu 830 can be used to determine the user intent. In particular, the recently displayed media options 832 of FIG. 23A can be analyzed to identify the specific soccer game, basketball game, or courtroom drama referred to in the ambiguous example requests. In some examples, results can be biased based on how recently content was displayed (e.g., weighting the most recently viewed page of results over results viewed earlier). In this manner, the viewing history of what was recently shown on display 112 can be used to determine user intent. It should be understood that any recently displayed content can be used, such as previously displayed search results, previously displayed programs, previously displayed menus, or the like. This can allow users to refer back to something they saw earlier without having to find and navigate to the specific view in which they saw it.

Figure 24:
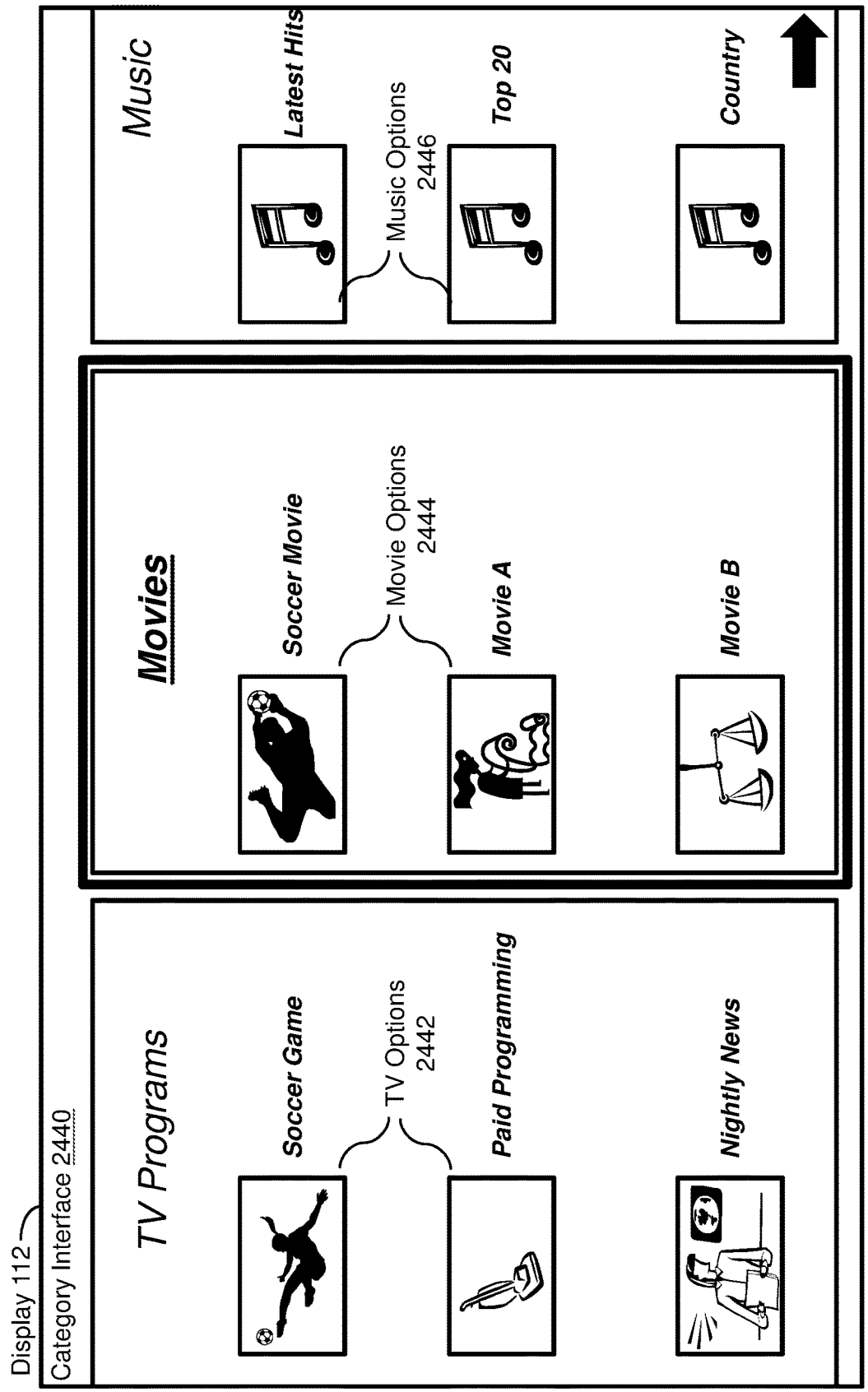
FIG. 24 illustrates an exemplary media menu divided into categories.

In still other examples, various display cues shown in a menu or results list on display 112 can be used to disambiguate user requests and determine user intent. FIG. 24 illustrates an exemplary media menu divided into categories, one of which has focus (movies). FIG. 24 illustrates category interface 2440, which can include a carousel-style interface of categorized media options including TV options 2442, movie options 2444, and music options 2446. As shown, the music category is only partially displayed, and the carousel interface can be shifted to display additional content to the right (e.g., as indicated by the arrow) as though rotating the media in a carousel. In the illustrated example, the movies category has focus as indicated by the underlined title and border, although focus can be indicated in any of a variety of other ways (e.g., making the category larger to appear closer to the user than other categories, adding a glow, etc.).

In some examples, a request to play content or select a menu item can include an ambiguous reference to a menu item in a group of items (such as a category). For example, a user viewing category interface 2440 can request to play the soccer show ("Play the soccer show."). The particular menu item or show that is desired can be unclear from the speech input alone. Moreover, the query can resolve to more than one show that is displayed on display 112. For example, the request for the soccer show might refer to either the soccer game listed in the TV programs category or the soccer movie listed in the movies category. The content shown on display 112—including display cues—can be used to disambiguate user requests and determine user intent. In particular, the fact that the movies category has focus in category interface 2440 can be used to identify the particular soccer show that is desired, which is likely the soccer movie given the focus on the movies category. A category of media (or any other grouping of media) having focus as shown on display 112 can thus be used in determining user intent from speech input. It should also be appreciated that users can make various other requests associated with categories, such as requesting display of certain categorical content (e.g., show me comedy movies, show me horror movies, etc.).

In other examples, a user can refer to menu or media items shown on display 112 in a variety of other ways, and user intent can similarly be determined based on displayed content. It should be appreciated that metadata associated with displayed content (e.g., TV program descriptions, movie descriptions, etc.), fuzzy matching techniques, synonym matching, and the like can further be used in conjunction with displayed content to determine user intent from speech input. User requests in a variety of forms—including natural language requests—can thus be accommodated and user intent can be determined according to the various examples discussed herein.

It should be understood that content displayed on display 112 can be used alone or in conjunction with content displayed on user device 102 or on a display associated with remote control 106 in determining user intent. Likewise, it should be understood that virtual assistant queries can be received at any of a variety of devices communicatively coupled to television set-top box 104, and content displayed on display 112 can be used to determine user intent regardless of which device receives the query. Results of queries can likewise be displayed on display 112 or on another display (e.g., on user device 102).

In addition, in any of the various examples discussed herein, the virtual assistant system can navigate menus and select menu options without requiring a user to specifically open menus and navigate to menu items. For example, a menu of options might appear after selecting media content or a menu button, such as selecting a movie option 2444 in FIG. 24. Menu options might include playing the media as well as alternatives to simply playing the media, such as setting a reminder to watch the media later, setting up a recording of the media, adding media to a favorites list, hiding media from further view, or the like. While a user is viewing content above a menu or content that has a sub-menu option, the user can issue virtual assistant commands that would otherwise require navigating to the menu or sub-menu to select. For example, a user viewing category interface 2440 of FIG. 24 can issue any menu command associated with a movie option 2444 without opening the associated menu manually. For instance, the user might request to add the soccer movie to a favorites list, record the nightly news, and set up a reminder to watch Movie B without ever navigating to the menus or sub-menus associated with those media options where such commands might be available. The virtual assistant system can thus navigate menus and sub-menus in order to execute commands on behalf of the user, whether or not those menu options appear on display 112. This can simplify user requests and reduce the number of clicks or selections a user must make to achieve desired menu functionality.

Figure 25:
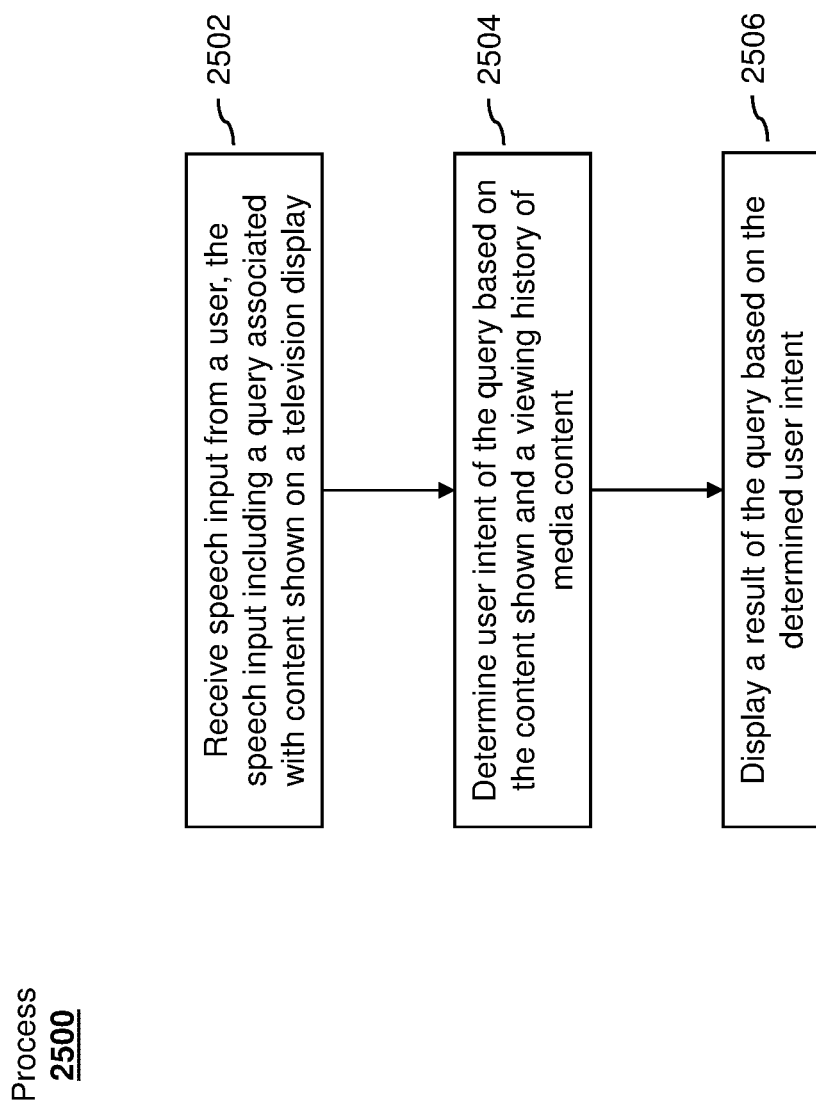
FIG. 25 illustrates an exemplary process for controlling television interactions using media content shown on a display and a viewing history of media content.

FIG. 25 illustrates exemplary process 2500 for controlling television interactions using media content shown on a display and a viewing history of media content. At block 2502, speech input can be received from a user, the speech input including a query associated with content shown on a television display. For example, the speech input can include a query about a character, actor, movie, television program, sporting event, player, or the like appearing on display 112 of system 100 (shown by television set-top box 104). Transcription 1916 of FIG. 19, for example, includes a query associated with actresses shown in video 480 on display 112. Similarly, transcription 2122 of FIG. 21 includes a query associated with a character in video 480 shown on display 112. The speech input can also include a query associated with menu or search content appearing on display 112, such as a query to select a particular menu item or get information about a particular search result. For example, displayed menu content can include media options 832 of menu 830 in FIG. 23A and FIG. 23B. Displayed menu content can likewise include TV options 2442, movie options 2444, and/or music options 2446 appearing in category interface 2440 of FIG. 24.

Referring again to process 2500 of FIG. 25, at block 2504, user intent of the query can be determined based on the content shown and a viewing history of media content. For example, user intent can be determined based on a displayed or recently displayed scene of a television program, sporting event, movie, or the like. User intent can also be determined based on displayed or recently displayed menu or search content. Displayed content can also be analyzed along with metadata associated with the content to determine user intent. For example, the content shown and described with reference to FIGS. 19, 21, 23A, 23B, and 24 can be used alone or in conjunction with metadata associated with the displayed content to determine user intent.

At block 2506, a result of the query can be displayed based on the determined user intent. For example, a result similar to assistant response 2020 in assistant response interface 2018 of FIG. 20 can be displayed on display 112. In another example, text and selectable media can be provided as a result, such as assistant text response 2226 and selectable video links 2228 in assistant response interface 2224 shown in FIG. 22. In yet another example, displaying the result of the query can include displaying or playing selected media content (e.g., playing a selected video on display 112 via television set-top box 104). User intent can thus be determined from speech input in a variety of ways using displayed content and associated metadata as context.

In some examples, virtual assistant query suggestions can be provided to a user to, for example, inform the user of available queries, suggest content that the user may enjoy, teach the user how to use the system, encourage the user to find additional media content for consumption, or the like. In some examples, query suggestions can include generic suggestions of possible commands (e.g., find comedies, show me the TV guide, search for action movies, turn on closed captioning, etc.). In other examples, query suggestions can include targeted suggestions related to displayed content (e.g., add this show to a watch list, share this show via social media, show me the soundtrack of this movie, show me the book that this guest is selling, show me the trailer for the movie that guest is plugging, etc.), user preferences (e.g., closed captioning use, etc.), user-owned content, content stored on a user's device, notifications, alerts, a viewing history of media content (e.g., recently displayed menu items, recently displayed scenes of a show, recent actor appearances, etc.), or the like. Suggestions can be displayed on any device, including on display 112 via television set-top box 104, on user device 102, or on a display associated with remote control 106. In addition, suggestions can be determined based on which devices are nearby and/or in communication with television set-top box 104 at a particular time (e.g., suggesting content from devices of the users in the room watching TV at a particular time). In other examples, suggestions can be determined based on a variety of other contextual information, including the time of day, crowd-sourced information (e.g., popular shows being watched at a given time), shows that are live (e.g., live sporting events), a viewing history of media content (e.g., the last several shows that were watched, a recently viewed set of search results, a recently viewed group of media options, etc.), or any of a variety of other contextual information.

Figure 26:
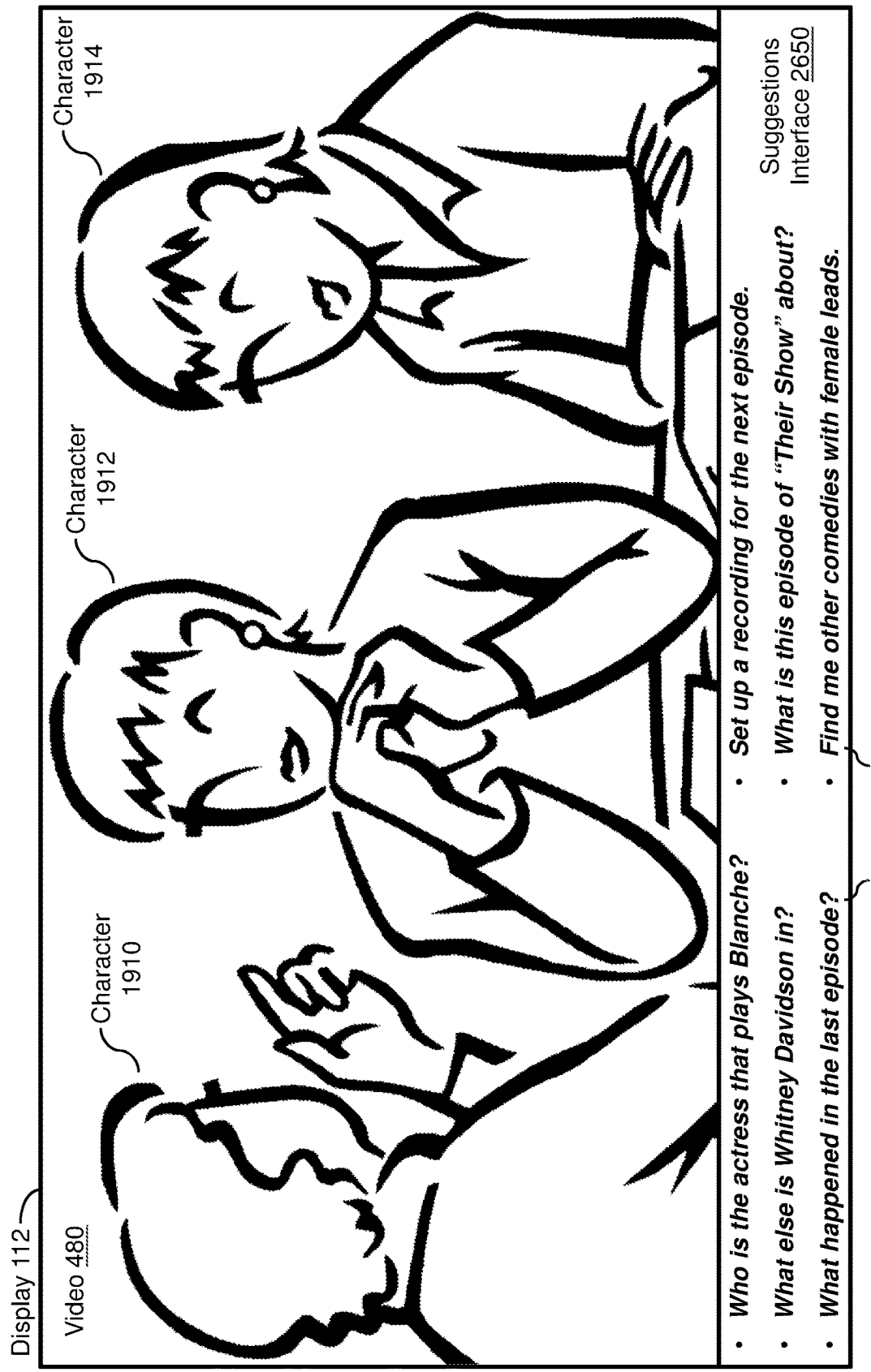
FIG. 26 illustrates an exemplary interface with virtual assistant query suggestions based on background video content.

FIG. 26 illustrates exemplary suggestions interface 2650 including content-based virtual assistant query suggestions 2652. In one example, query suggestions can be provided in an interface such as interface 2650 in response to input received from a user requesting suggestions. Input requesting query suggestions can be received, for example, from user device 102 or remote control 106. In some examples, the input can include a button press, a double click of a button, a menu selection, a voice command (e.g., show me some suggestions, what can you do for me, what are some options, etc.), or the like received at user device 102 or remote control 106. For instance, a user can double click a physical button on remote control 106 to request query suggestions, or can double click a physical or virtual button on user device 102 when viewing an interface associated with television set-top box 104 to request query suggestions.

Suggestions interface 2650 can be displayed over a moving image, such as video 480, or over any other background content (e.g., a menu, a still image, a paused video, etc.). As with other interfaces discussed herein, suggestions interface 2650 can be animated to slide up from the bottom of display 112, and can occupy a minimal amount of space while sufficiently conveying the desired information so as to limit interference with video 480 in the background. In other examples, a larger interface of suggestions can be provided when the background content is still (e.g., a paused video, a menu, an image, etc.).

In some examples, virtual assistant query suggestions can be determined based on displayed media content or a viewing history of media content (e.g., a movie, television show, sporting event, recently viewed show, recently viewed menu, recently viewed scene of a movie, recent scene of a playing television episode, etc.). For example, FIG. 26 illustrates content-based suggestions 2652, which can be determined based on displayed video 480 shown in the background with characters 1910, 1912, and 1914 appearing on display 112. Metadata associated with displayed content (e.g., descriptive details of the media content) can also be used to determine query suggestions. Metadata can include a variety of information associated with displayed content, including a show title, a character list, an actor list, an episode description, a team roster, a team ranking, a show synopsis, movie details, plot descriptions, director names, producer names, times of actor appearance, sports standings, sports scores, genre, season episode listing, related media content, or a variety of other associated information. For example, metadata associated with video 480 can include the character names of characters 1910, 1912, and 1914 along with the actresses who play those characters. Metadata can also include a description of the plot of video 480, a description of a previous or next episode (where video 480 is a television episode in a series), or the like.

FIG. 26 illustrates a variety of content-based suggestions 2652 that can be shown in suggestions interface 2650 based on video 480 and metadata associated with video 480. For example, character 1910 of video 480 can be named "Blanche," and the character name can be used to formulate a query suggestion for information about the character Blanche or the actress who plays that character (e.g., "Who is the actress that plays Blanche?"). Character 1910 can be identified from metadata associated with video 480 (e.g., a character list, an actor list, times associated with actor appearances, etc.). In other examples, facial recognition can be used to identify actresses and/or characters appearing on display 112 at a given time. Various other query suggestions can be provided associated with a character in the media itself, such as queries relating to a character's role, profile, relationship to other characters, or the like.

In another example, an actor or actress appearing on display 112 can be identified (e.g., based on metadata and/or facial recognition), and query suggestions associated with that actor or actress can be provided. Such query suggestions can include role(s) played, acting awards, age, other media in which they appear, history, family members, relationships, or any of a variety of other details about an actor or actress. For example, character 1914 can be played by an actress named Whitney Davidson, and the actress's name Whitney Davidson can be used to formulate a query suggestion to identify other movies, television programs, or other media in which the actress Whitney Davidson appears (e.g., "What else is Whitney Davidson in?").

In other examples, details about a show can be used to formulate query suggestions. An episode synopsis, plot summary, episode list, episode titles, series titles, or the like can be used to formulate query suggestions. For example, a suggestion can be provided to describe what happened in the last episode of a television program (e.g., "What happened in the last episode?"), to which the virtual assistant system can provide as a response an episode synopsis from the prior episode identified based on the episode currently shown on display 112 (and its associated metadata). In another example, a suggestion can be provided to set up a recording for the next episode, which can be accomplished by the system identifying the next episode based on the currently playing episode shown on display 112. In yet another example, a suggestion can be provided to get information about the current episode or show appearing on display 112, and the title of the show obtained from metadata can be used to formulate the query suggestion (e.g., "What is this episode of 'Their Show' about?" or "What is 'Their Show' about?").

In another example, category, genre, rating, awards, descriptions, or the like associated with displayed content can be used to formulate query suggestions. For example, video 480 can correspond to a television program described as a comedy having female lead characters. A query suggestion can be formulated from this information to identify other shows with similar characteristics (e.g., "Find me other comedies with female leads."). In other examples, suggestions can be determined based on user subscriptions, content available for playback (e.g., content on television set-top box 104, content on user device 102, content available for streaming, etc.), or the like. For example, potential query suggestions can be filtered based on whether informational or media results are available. Query suggestions that might not result in playable media content or informational answers can be excluded, and/or query suggestions with readily available informational answers or playable media content can be provided (or weighted more heavily in determining which suggestions to provide). Displayed content and associated metadata can thus be used in a variety of ways to determine query suggestions.

Figure 27:
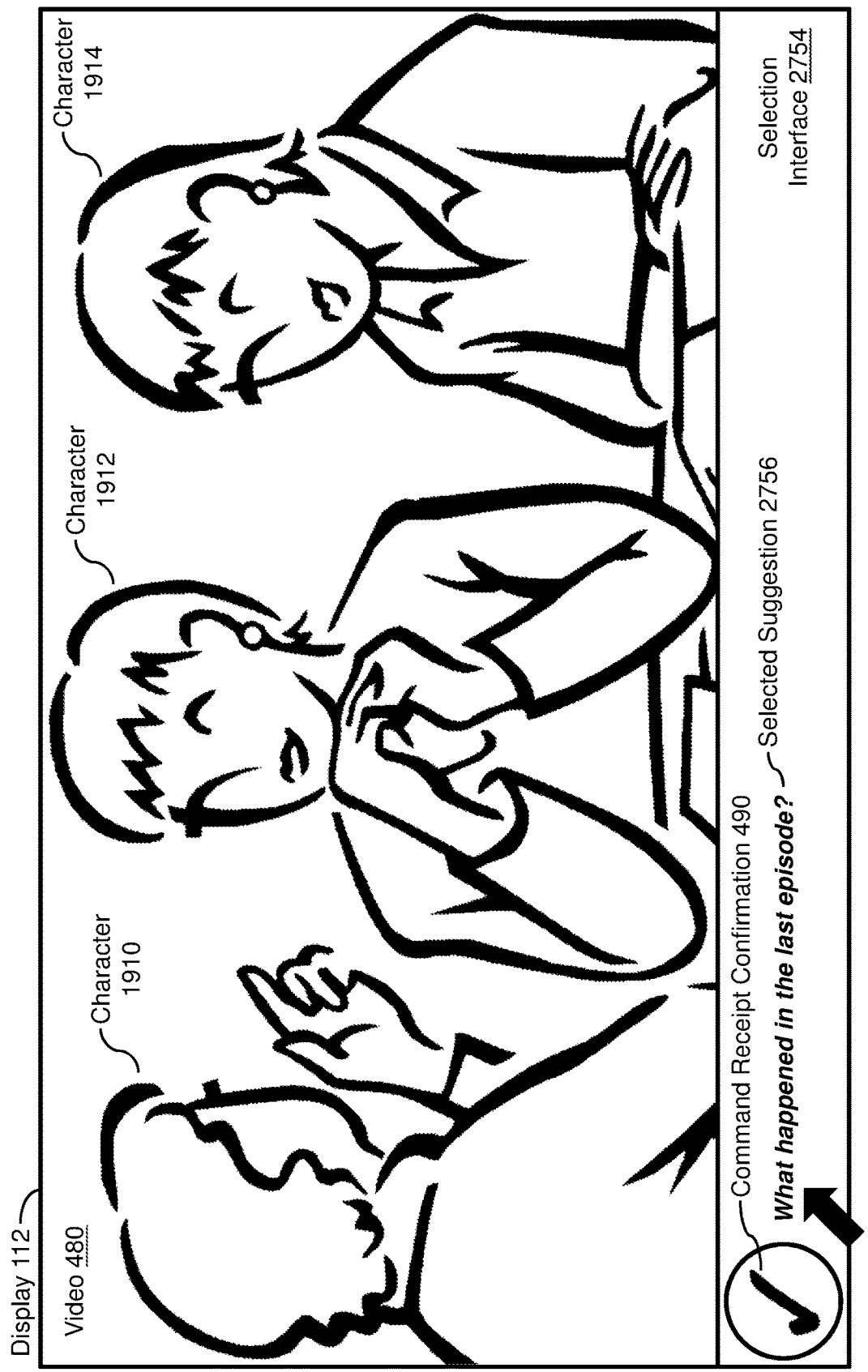
FIG. 27 illustrates an exemplary interface for confirming selection of a suggested query.

FIG. 27 illustrates exemplary selection interface 2754 for confirming selection of a suggested query. In some examples, users can select displayed query suggestions by speaking the queries, selecting them with a button, navigating to them with a cursor, or the like. In response to a selection, the selected suggestion can be briefly displayed in a confirming interface, such as selection interface 2754. In one example, selected suggestion 2756 can be animated to move from wherever it appeared in suggestions interface 2650 to the position shown in FIG. 27 next to command receipt confirmation 490 (e.g., as shown by the arrow), and other unselected suggestions can be hidden from the display.

Figure 28A:
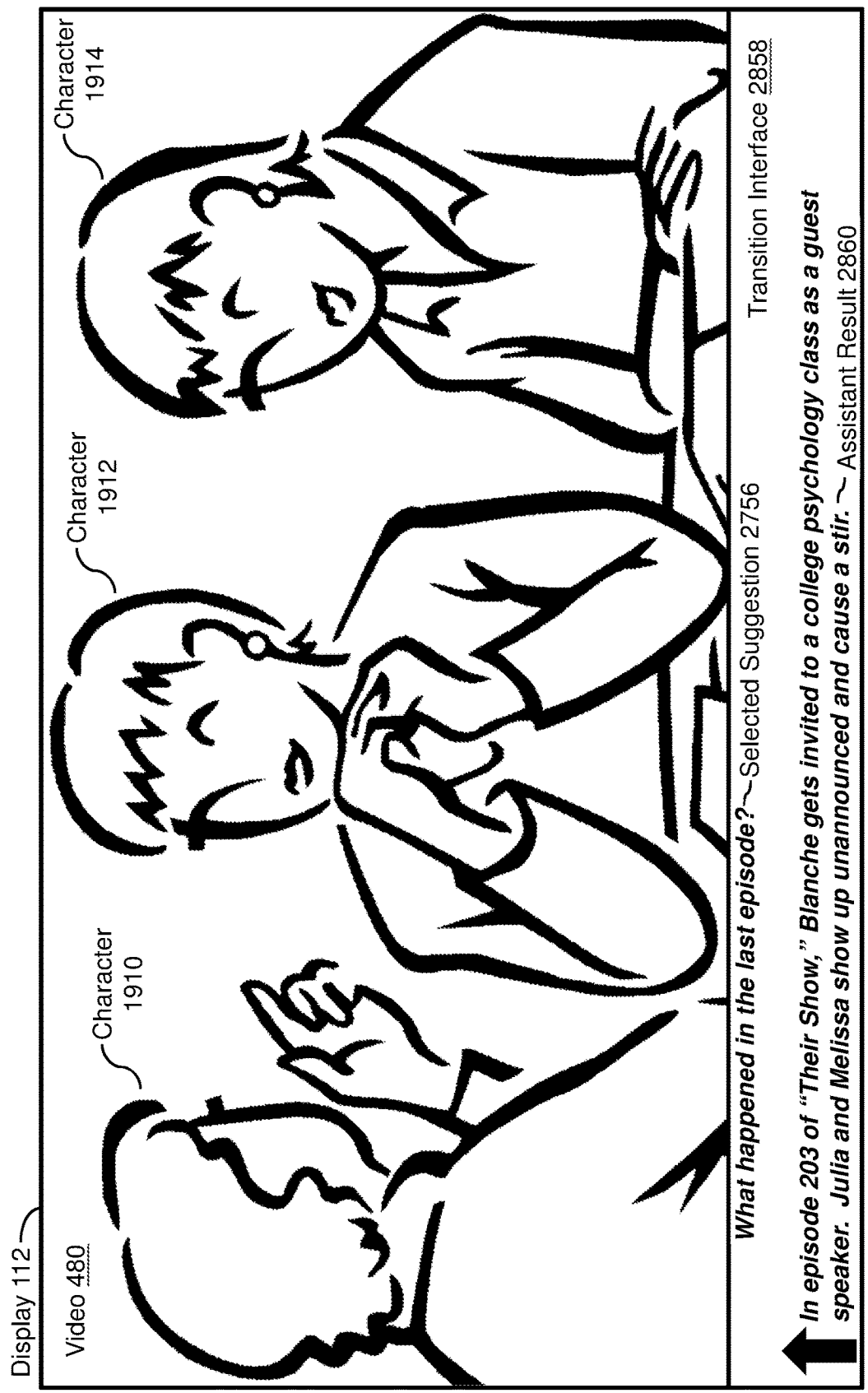
FIGS. 28A-28B illustrate an exemplary virtual assistant answer interface based on a selected query.
Figure 28B:
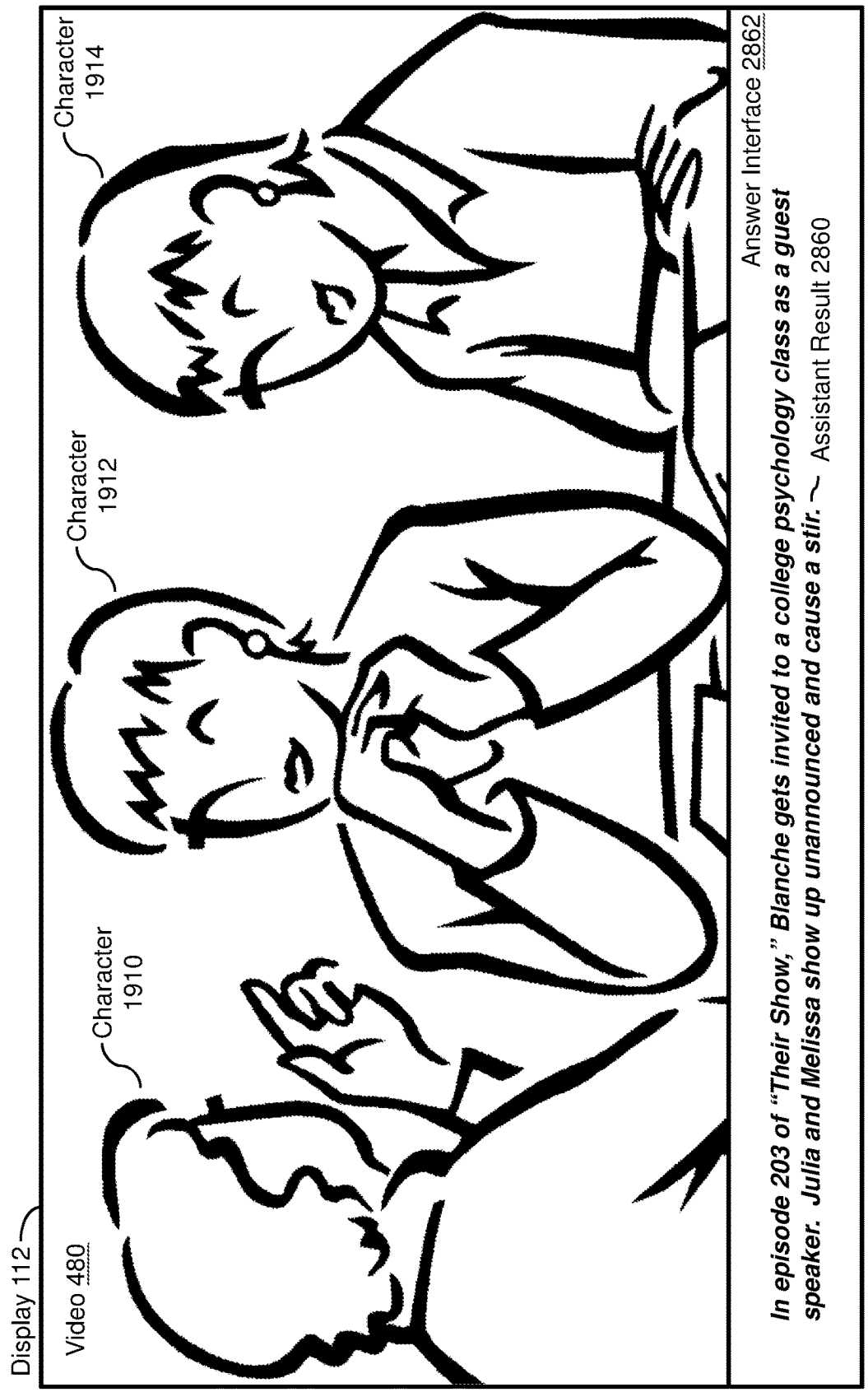

FIGS. 28A-28B illustrate exemplary virtual assistant answer interface 2862 based on a selected query. In some examples, informational answers to a selected query can be displayed in an answer interface, such as answer interface 2862. In switching from either suggestions interface 2650 or selection interface 2754, transition interface 2858 can be shown as illustrated in FIG. 28A. In particular, previously displayed content within the interface can be scrolled upward out of the interface as the next content scrolls upward from the bottom of display 112. Selected suggestion 2756, for example, can be slid or scrolled upward until it disappears at the top edge of the virtual assistant interface, and assistant result 2860 can be slid or scrolled upward from the bottom of display 112 until it arrives at the position shown in FIG. 28B.

Answer interface 2862 can include informational answers and/or media results responsive to a selected query suggestion (or responsive to any other query). For example, in response to selected query suggestion 2756, assistant result 2860 can be determined and provided. In particular, in response to a request for a synopsis of a prior episode, the prior episode can be identified based on displayed content, and an associated description or synopsis can be identified and provided to the user. In the illustrated example, assistant result 2860 can describe a previous episode of the program corresponding to video 480 on display 112 (e.g., "In episode 203 of 'Their Show,' Blanche gets invited to a college psychology class as a guest speaker. Julia and Melissa show up unannounced and cause a stir."). Informational answers and media results (e.g., selectable video links) can also be presented in any of the other ways discussed herein, or results can be presented in various other ways (e.g., speaking answers aloud, playing content immediately, showing an animation, displaying an image, etc.).

Figure 29:
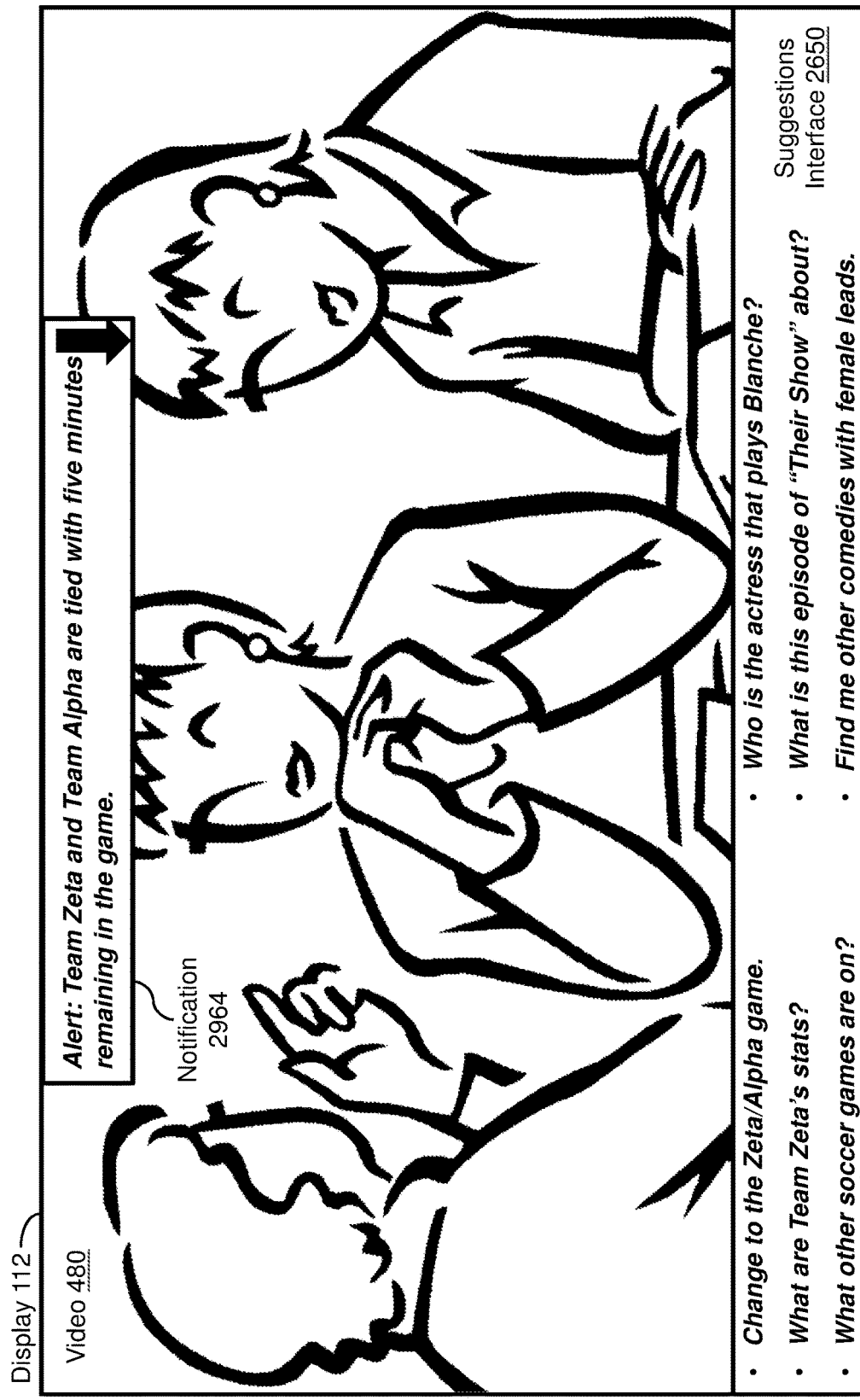
FIG. 29 illustrates a media content notification and an exemplary interface with virtual assistant query suggestions based on the notification.

In another example, a notification or alert can be used to determine virtual assistant query suggestions. FIG. 29 illustrates a media content notification 2964 (although any notification can be taken into account in determining suggestions) and suggestions interface 2650 with both notification-based suggestions 2966 and content-based suggestions 2652 (which can include some of the same concepts as discussed above with reference to FIG. 26). In some examples, the content of a notification can be analyzed to identify relevant media related names, titles, subjects, actions, or the like. In the illustrated example, notification 2964 includes an alert notifying the user about alternative media content available for display—specifically that a sporting event is live, and the content of the game may be of interest to the user (e.g., "Team Zeta and Team Alpha are tied with five minutes remaining in the game."). In some examples, notifications can be displayed momentarily at the top of display 112. Notifications can be slid down from the top of display 112 (as indicated by the arrow) into the position shown in FIG. 29, displayed for a certain amount of time, and slid back up to disappear again at the top of display 112.

Notifications or alerts can notify the user of a variety of information, such as available alternative media content (e.g., alternatives to what may be shown currently on display 112), available live television programs, newly downloaded media content, recently added subscription content, suggestions received from friends, receipt of media sent from another device, or the like. Notifications can also be personalized based on a household or an identified user watching media (e.g., identified based on user authentication using account selections, voice recognition, passwords, etc.). In one example, the system can interrupt a show and display a notification based on likely desired content, such as displaying notification 2964 for a user who—based on a user profile, favorite team(s), preferred sport(s), viewing history, and the like—can be likely to desire the content of the notification. For example, sporting event scores, game status, time remaining, and the like can be obtained from a sport data feed, news outlet, social media discussions, or the like, and can be used to identify possible alternative media content for notifying the user.

In other examples, popular media content (e.g., across many users) can be provided via alerts or notifications to suggest alternatives to currently viewed content (e.g., notifying a user that a popular show or a show in a genre the user likes just started or is otherwise available for viewing). In the illustrated example, the user might follow one or both of Team Zeta and Team Alpha (or might follow soccer or a particular sport, league, etc.). The system can determine that available live content matches the user's preferences (e.g., a game on another channel matches a user's preferences, the game has little time remaining, and the score is close). The system can then determine to alert the user via notification 2964 of the likely desired content. In some examples, a user can select notification 2964 (or a link within notification 2964) to switch to the suggested content (e.g., using a remote control button, cursor, spoken request, etc.).

Virtual assistant query suggestions can be determined based on notifications by analyzing notification content to identify relevant media related terms, names, titles, subjects, actions, or the like. The identified information can then be used to formulate appropriate virtual assistant query suggestions, such as notification-based suggestions 2966 based on notification 2964. For example, a notification about an exciting end of a live sporting event can be displayed. Should the user then request query suggestions, suggestions interface 2650 can be displayed, including query suggestions to view the sporting event, inquire about team statistics, or find content related to the notification (e.g., change to the Zeta/Alpha game, what are team Zeta's stats, what other soccer games are on, etc.). Based on the particular terms of interest identified in the notification, various other query suggestions can likewise be determined and provided to the user.

Figures 30, 31:
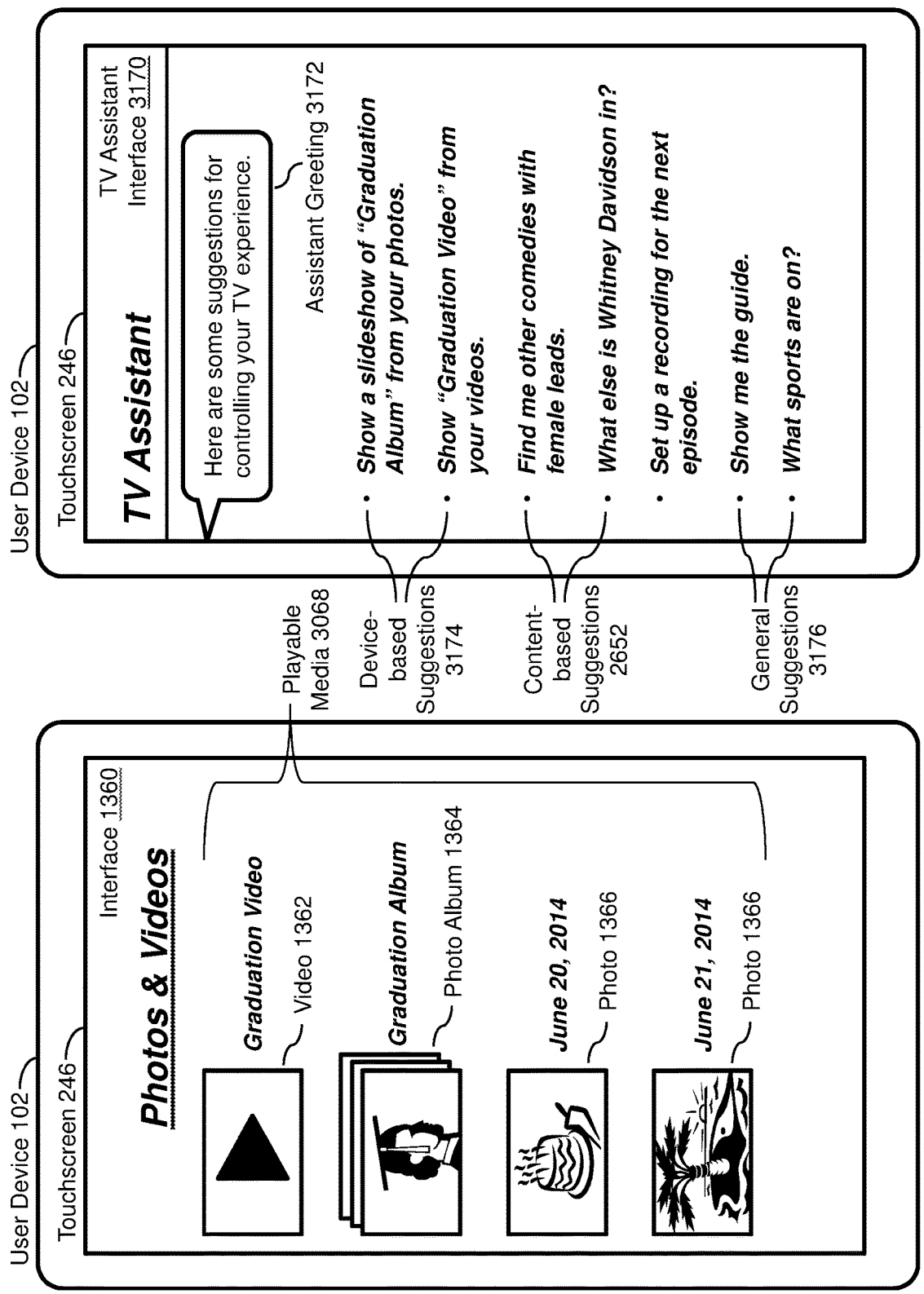
FIG. 30 illustrates a mobile user device with exemplary picture and video content that is playable on a media control device.
FIG. 31 illustrates an exemplary mobile user device interface with virtual assistant query suggestions based on playable user device content and based on video content shown on a separate display

Virtual assistant query suggestions related to media content (e.g., for consumption via television set-top box 104) can also be determined from content on a user device, and suggestions can also be provided on a user device. In some examples, playable device content can be identified on user devices that are connected to or in communication with television set-top box 104. FIG. 30 illustrates user device 102 with exemplary picture and video content in interface 1360. A determination can be made as to what content is available for playback on a user device, or what content is likely to be desired for playback. For example, playable media 3068 can be identified based on an active application (e.g., a photos and videos application), or can be identified based on stored content whether displayed on interface 1360 or not (e.g., content can be identified from an active application in some examples or without being displayed at a given time in other examples). Playable media 3068 can include, for example, video 1362, photo album 1364, and photos 1366, each of which can include personal user content that can be transmitted to television set-top box 104 for display or playback. In other examples, any photo, video, music, game interface, application interface, or other media content stored or displayed on user device 102 can be identified and used for determining query suggestions.

With playable media 3068 identified, virtual assistant query suggestions can be determined and provided to the user. FIG. 31 illustrates exemplary TV assistant interface 3170 on user device 102 with virtual assistant query suggestions based on playable user device content and based on video content shown on a separate display (e.g., display 112 associated with television set-top box 104). TV assistant interface 3170 can include a virtual assistant interface specifically for interacting with media content and/or television set-top box 104. Users can request query suggestions on user device 102 by, for example, a double click of a physical button when viewing interface 3170. Other inputs can similarly be used to indicate a request for query suggestions. As shown, assistant greeting 3172 can introduce the provided query suggestions (e.g., "Here are some suggestions for controlling your TV experience.").

Virtual assistant query suggestions provided on user device 102 can include suggestions based on a variety of source devices as well as general suggestions. For example, device-based suggestions 3174 can include query suggestions based on content stored on user device 102 (including content displayed on user device 102). Content-based suggestions 2652 can be based on content displayed on display 112 associated with television set-top box 104. General suggestions 3176 can include general suggestions that may not be associated with particular media content or a particular device with media content.

Device-based suggestions 3174 can be determined, for example, based on playable content identified on user device 102 (e.g., videos, music, photographs, game interfaces, application interfaces, etc.). In the illustrated example, device-based suggestions 3174 can be determined based on playable media 3068 shown in FIG. 30. For example, given that photo album 1364 was identified as playable media 3068, the details of photo album 1364 can be used to formulate a query. The system can identify the content as an album of multiple photos that can be shown in a slideshow, and can then use the title of the album (in some instances) to formulate a query suggestion to show a slideshow of the particular album of photos (e.g., "Show a slideshow of 'Graduation Album' from your photos."). In some examples, the suggestion can include an indication of the source of the content (e.g., "from your photos," "from Jennifer's phone," "from Daniel's tablet," etc.). The suggestion can also use other details to refer to particular content, such as a suggestion to view a photograph from a particular date (e.g., display your photo from June 21st). In another example, video 1362 can be identified as playable media 3068, and the title of the video (or other identifying information) can be used to formulate a query suggestion to play the video (e.g., "Show 'Graduation Video' from your videos.").

In other examples, content available on other connected devices can be identified and used to formulate virtual assistant query suggestions. For example, content from each of two user devices 102 connected to a common television set-top box 104 can be identified and used in formulating virtual assistant query suggestions. In some examples, users can select which content to make visible to the system for sharing, and can hide other content from the system so as not to include it in query suggestions or otherwise make it available for playback.

Content-based suggestions 2652 shown in interface 3170 of FIG. 31 can be determined, for example, based on content displayed on display 112 associated with television set-top box 104. In some examples, content-based suggestions 2652 can be determined in the same manner as described above with reference to FIG. 26. In the illustrated example, content-based suggestions 2652 shown in FIG. 31 can be based on video 480 shown on display 112 (e.g., as in FIG. 26). In this manner, virtual assistant query suggestions can be derived based on content that is displayed or available on any number of connected devices. In addition to targeted suggestions, general suggestions 3176 can be predetermined and provided (e.g., show me the guide, what sports are on, what's on channel three, etc.).

Figure 32:
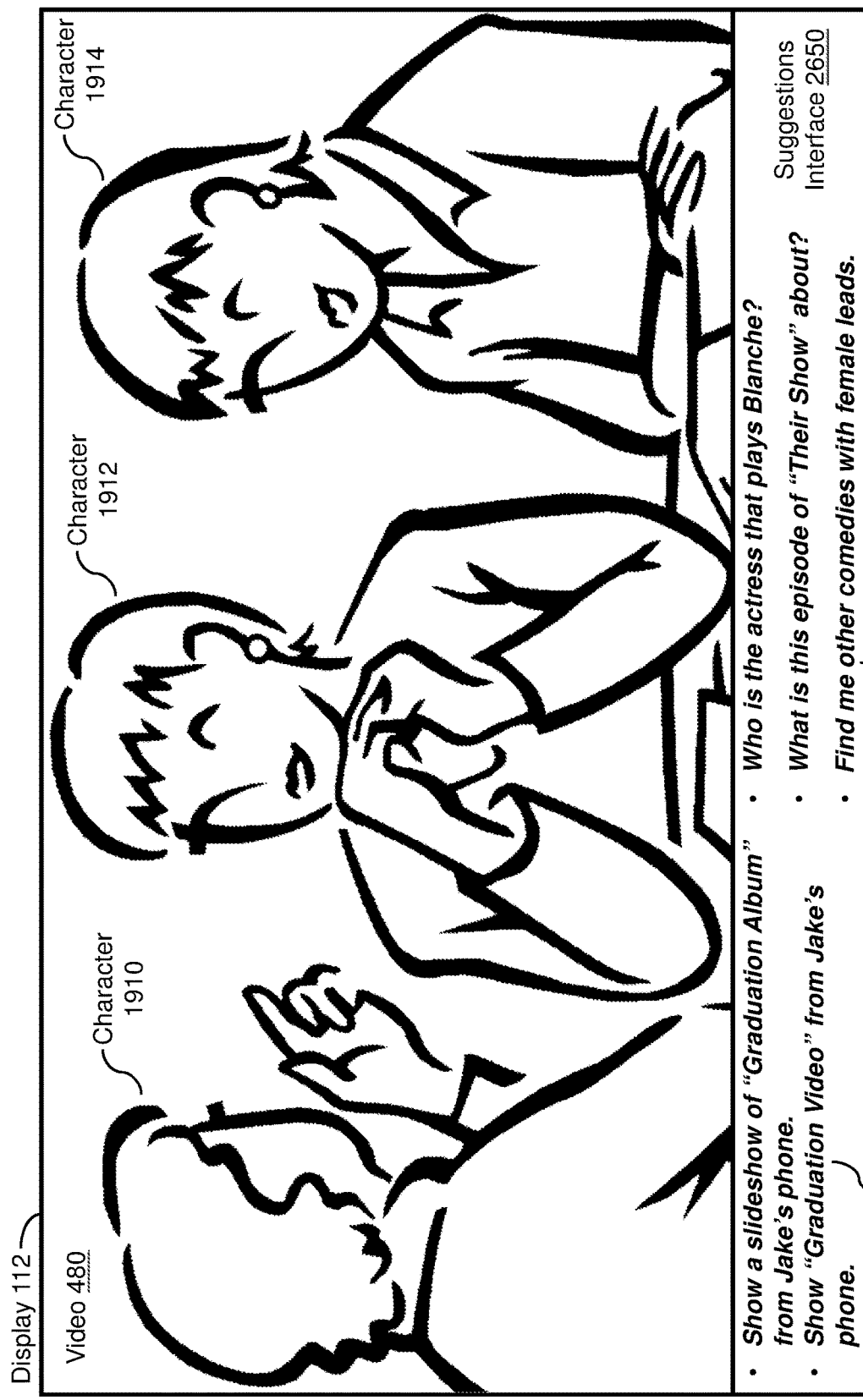
FIG. 32 illustrates an exemplary interface with virtual assistant query suggestions based on playable content from a separate user device.

FIG. 32 illustrates exemplary suggestions interface 2650 with connected device-based suggestions 3275 along with content-based suggestions 2652 shown on display 112 associated with television set-top box 104. In some examples, content-based suggestions 2652 can be determined in the same manner as described above with reference to FIG. 26. As noted above, virtual assistant query suggestions can be formulated based on content on any number of connected devices, and the suggestions can be provided on any number of connected devices. FIG. 32 illustrates connected device-based suggestions 3275 that can be derived from content on user device 102. For example, playable content can be identified on user device 102, such as photo and video content shown in interface 1360 as playable media 3068 in FIG. 30. The identified playable content on user device 102 can then be used to formulate suggestions that can be displayed on display 112 associated with television set-top box 104. In some examples, connected device-based suggestions 3275 can be determined in the same manner as device-based suggestions 3174 described above with reference to FIG. 31. In addition, as noted above, in some examples identifying source information can be included in a suggestion, such as "from Jake's phone" as shown in connected device-based suggestions 3275. Virtual assistant query suggestions provided on one device can thus be derived based on content from another device (e.g., displayed content, stored content, etc.). It should be appreciated that a connected device can include a remote storage device accessible to television set-top box 104 and/or user device 102 (e.g., accessing media content stored in the cloud to formulate suggestions).

It should be understood that any combination of virtual assistant query suggestions from various sources can be provided in response to a request for suggestions. For example, suggestions from various sources can be combined randomly, or can be presented based on popularity, user preference, selection history, or the like. Moreover, queries can be determined in a variety of other ways and presented based on a variety of other factors, such as a query history, a user preference, a query popularity, or the like. In addition, in some examples, query suggestions can be cycled automatically by replacing displayed suggestions with new alternative suggestions after a delay. It should further be understood that users can select displayed suggestions on any interface by, for example, tapping on a touchscreen, speaking the query, selecting a query with navigation keys, selecting a query with a button, selecting a query with a cursor, or the like, and an associated response can then be provided (e.g., an informational and/or media response).

In any of the various examples, virtual assistant query suggestions can also be filtered based on available content. For example, potential query suggestions that would result in unavailable media content (e.g., no cable subscription) or that may not have an associated informational answer can be disqualified as suggestions and held back from being displayed. On the other hand, potential query suggestions that would result in immediately playable media content to which the user has access can be weighted over other potential suggestions or otherwise biased for display. In this manner, the availability of media content for user viewing can also be used in determining virtual assistant query suggestions for display.

In addition, in any of the various examples, pre-loaded query answers can be provided instead of or in addition to suggestions (e.g., in suggestions interface 2650). Such pre-loaded query answers can be selected and provided based on personal use and/or current context. For example, a user watching a particular program can tap a button, double-click a button, long-press a button, or the like to receive suggestions. Instead of or in addition to query suggestions, context-based information can be provided automatically, such as identifying a playing song or soundtrack (e.g., "This song is Performance Piece"), identifying cast members of a currently playing episode (e.g., "Actress Janet Quinn plays Genevieve"), identifying similar media (e.g., "Show Q is similar to this"), or providing results of any of the other queries discussed herein.

Moreover, affordances can be provided in any of the various interfaces for users to rate media content to inform the virtual assistant of user preferences (e.g., a selectable rating scale). In other examples, users can speak rating information as a natural language command (e.g., "I love this," "I hate this," "I don't like this show," etc.). In still other examples, in any of the various interfaces illustrated and described herein, a variety of other functional and informational elements can be provided. For example, interfaces can further include links to important functions and places, such as search links, purchase links, media links, and the like. In another example, interfaces can further include recommendations of what else to watch next based on currently playing content (e.g., selecting similar content). In yet another example, interfaces can further include recommendations of what else to watch next based on personalized taste and/or recent activity (e.g., selecting content based on user ratings, user-entered preferences, recently watched programs, etc.). In still other examples, interfaces can further include instructions for user interactions (e.g., "Press and hold to talk to the Virtual Assistant," "Tap once to get suggestions," etc.). In some examples, providing pre-loaded answers, suggestions, or the like can provide an enjoyable user experience while also making content readily available to a wide variety of users (e.g., to users of various skill levels irrespective of language or other control barriers).

Figure 33:
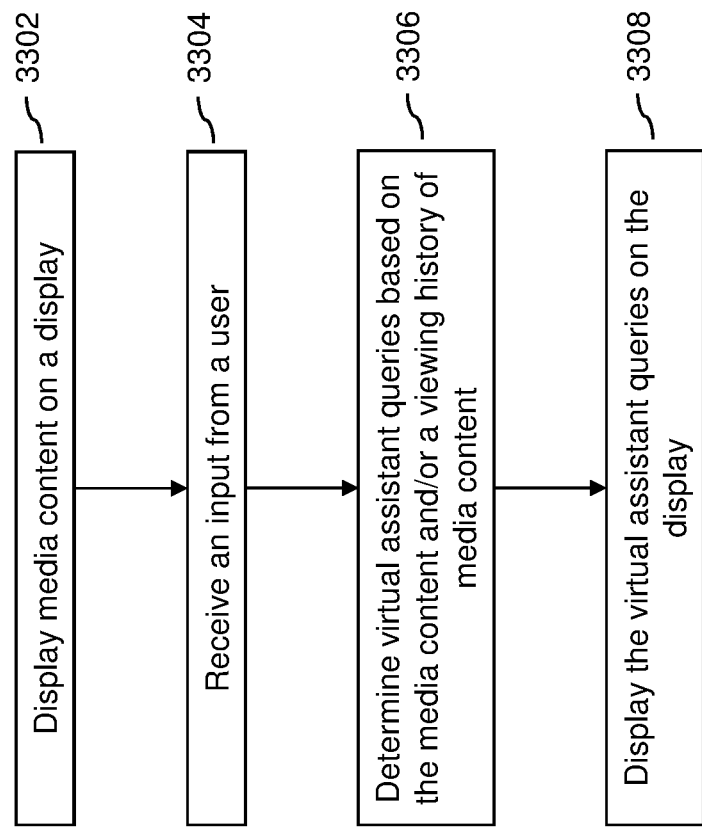
FIG. 33 illustrates an exemplary process for suggesting virtual assistant interactions for controlling media content.

FIG. 33 illustrates exemplary process 3300 for suggesting virtual assistant interactions for controlling media content (e.g., virtual assistant queries). At block 3302, media content can be displayed on a display. For example, as shown in FIG. 26, video 480 can be displayed on display 112 via television set-top box 104, or interface 1360 can be displayed on touchscreen 246 of user device 102 as shown in FIG. 30. At block 3304, an input can be received from a user. The input can include a request for virtual assistant query suggestions. The input can include a button press, a double click of a button, a menu selection, a spoken query for suggestions, or the like.

At block 3306, virtual assistant queries can be determined based on the media content and/or a viewing history of media content. For example, virtual assistant queries can be determined based on a displayed program, menu, application, list of media content, notification, or the like. In one example, content-based suggestions 2652 can be determined based on video 480 and associated metadata as described with reference to FIG. 26. In another example, notification-based suggestions 2966 can be determined based on notification 2964 as described with reference to FIG. 29. In yet another example, device-based suggestions 3174 can be determined based on playable media 3068 on user device 102 as described with reference to FIG. 30 and FIG. 31. In still other examples, connected device-based suggestions 3275 can be determined based on playable media 3068 on user device 102 as described with reference to FIG. 32.

Referring again to process 3300 of FIG. 33, at block 3308, the virtual assistant queries can be displayed on the display. For example, determined query suggestions can be displayed as shown in and described with reference to FIGS. 26, 27, 29, 31, and 32. As discussed above, query suggestions can be determined and displayed based on a variety of other information. Moreover, virtual assistant query suggestions provided on one display can be derived based on content from another device with another display. Targeted virtual assistant query suggestions can thus be provided to users, thereby assisting users to learn of potential queries as well as providing desirable content suggestions, among other benefits.

In addition, in any of the various examples discussed herein, various aspects can be personalized for a particular user. User data, including contacts, preferences, location, favorite media, and the like, can be used to interpret voice commands and facilitate user interaction with the various devices discussed herein. The various processes discussed herein can also be modified in various other ways according to user preferences, contacts, text, usage history, profile data, demographics, or the like. In addition, such preferences and settings can be updated over time based on user interactions (e.g., frequently uttered commands, frequently selected applications, etc.). Gathering and use of user data that is available from various sources can be used to improve the delivery to users of invitational content or any other content that may be of interest to them. The present disclosure contemplates that in some instances, this gathered data can include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data as private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select not to provide precise location information, but permit the transfer of location zone information.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

Figure 34:
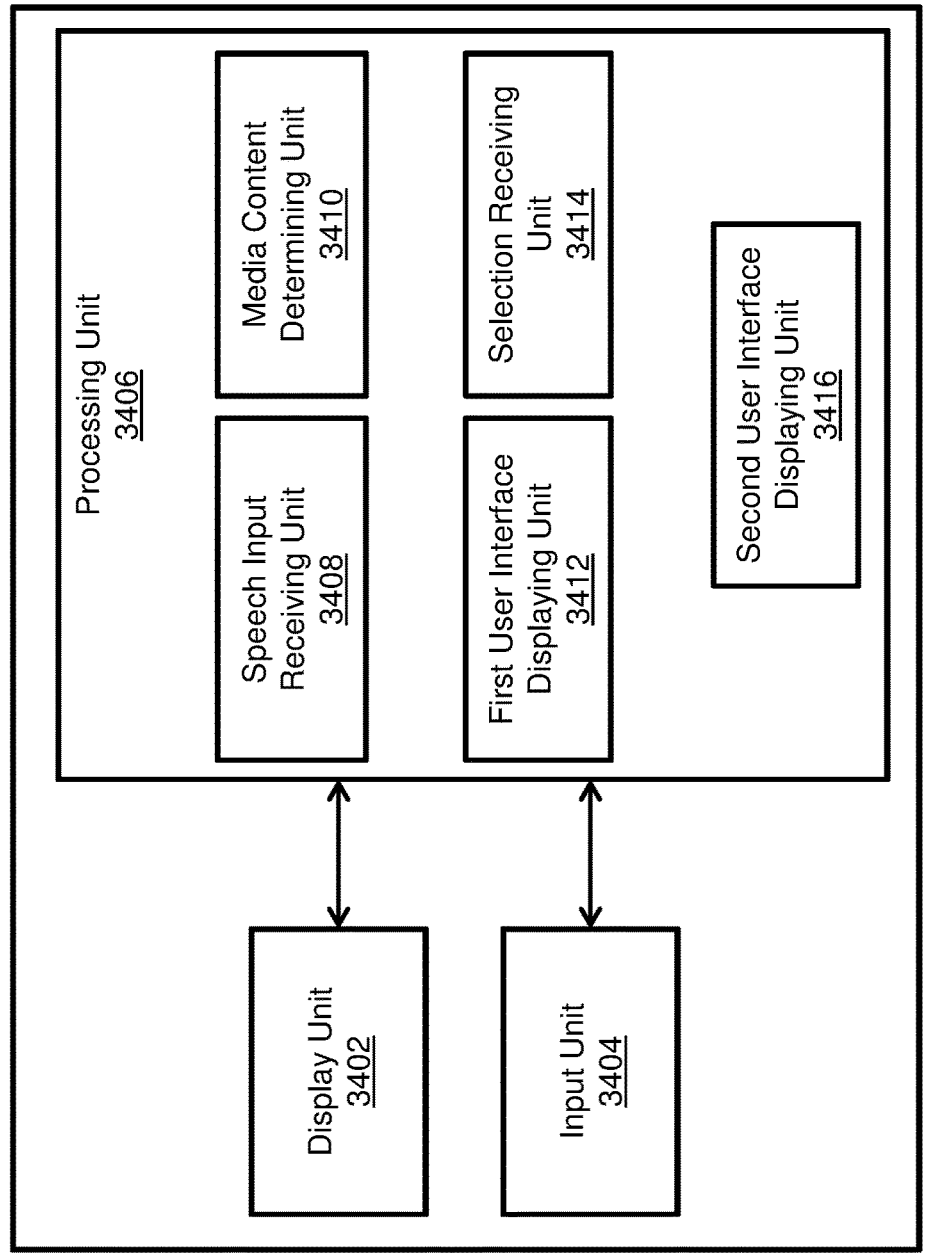
FIG. 34 illustrates a functional block diagram of an electronic device configured to control television interactions using a virtual assistant and display associated information using different interfaces according to various examples.

In accordance with some examples, FIG. 34 shows a functional block diagram of an electronic device 3400 configured in accordance with the principles of various described examples to, for example, control television interactions using a virtual assistant and display associated information using different interfaces. The functional blocks of the device can be implemented by hardware, software, or a combination of hardware and software to carry out the principles of the various described examples. It is understood by persons of skill in the art that the functional blocks described in FIG. 34 can be combined or separated into sub-blocks to implement the principles of the various described examples. Therefore, the description herein optionally supports any possible combination or separation or further definition of the functional blocks described herein.

As shown in FIG. 34, electronic device 3400 can include a display unit 3402 configured to display media, interfaces, and other content (e.g., display 112, touchscreen 246, or the like). Electronic device 3400 can further include input unit 3404 configured to receive information, such as speech input, tactile input, gesture input, and the like (e.g., a microphone, a receiver, a touchscreen, a button, or the like). Electronic device 3400 can further include processing unit 3406 coupled to display unit 3402 and input unit 3404. In some examples, processing unit 3406 can include a speech input receiving unit 3408, a media content determining unit 3410, a first user interface displaying unit 3412, a selection receiving unit 3414, and a second user interface displaying unit 3416.

Processing unit 3406 can be configured to receive speech input from a user (e.g., via input unit 3404). Processing unit 3406 can be further configured to determine (e.g., using media content determining unit 3410) media content based on the speech input. Processing unit 3406 can be further configured to display (e.g., on display unit 3402 using first user interface displaying unit 3412) a first user interface having a first size, wherein the first user interface comprises one or more selectable links to the media content. Processing unit 3406 can be further configured to receive (e.g., from input unit 3404 using selection receiving unit 3414) a selection of one of the one or more selectable links. Processing unit 3406 can be further configured to, in response to the selection, display (e.g., on display unit 3402 using second user interface displaying unit 3416) a second user interface having a second size larger than the first size, wherein the second user interface comprises the media content associated with the selection.

In some examples, the first user interface (e.g., of first user interface displaying unit 3412) expands into the second user interface (e.g., of second user interface displaying unit 3416) in response to the selection (e.g., of selection receiving unit 3414). In other examples, the first user interface is overlaid on playing media content. In one example, the second user interface is overlaid on playing media content. In another example, the speech input (e.g., of speech input receiving unit 3408 from input unit 3404) comprises a query, and the media content (e.g., of media content determining unit 3410) comprises a result of the query. In still another example, the first user interface comprises a link to results of the query beyond the one or more selectable links to the media content. In other examples, the query comprises a query about weather, and the first user interface comprises a link to media content associated with the query about the weather. In another example, the query comprises a location, and the link to the media content associated with the query about the weather comprises a link to a portion of media content associated with weather at the location.

In some examples, in response to the selection, processing unit 3406 can be configured to play the media content associated with the selection. In one example, the media content comprises a movie. In another example, the media content comprises a television show. In another example, the media content comprises a sporting event. In some examples, the second user interface (e.g., of second user interface displaying unit 3416) comprises a description of the media content associated with the selection. In other examples, the first user interface comprises a link to purchase media content.

Processing unit 3406 can be further configured to receive additional speech input from the user (e.g., via input unit 3404), wherein the additional speech input comprises a query associated with displayed content. Processing unit 3406 can be further configured to determine a response to the query associated with the displayed content based on metadata associated with the displayed content. Processing unit 3406 can be further configured to, in response to receiving the additional speech input, display (e.g., on display unit 3402) a third user interface, wherein the third user interface comprises the determined response to the query associated with the displayed content.

Processing unit 3406 can be further configured to receive an indication to initiate receipt of speech input (e.g., via input unit 3404). Processing unit 3406 can be further configured to, in response to receiving the indication, display a readiness confirmation (e.g., on display unit 3402). Processing unit 3406 can be further configured to, in response to receiving the speech input, display a listening confirmation. Processing unit 3406 can be further configured to detect the end of the speech input, and, in response to detecting the end of the speech input, display a processing confirmation. In some examples, processing unit 3406 can be further configured to display a transcription of the speech input.

In some examples, electronic device 3400 comprises a television. In other examples, electronic device 3400 comprises a television set-top box. In other examples, electronic device 3400 comprises a remote control. In still other examples, electronic device 3400 comprises a mobile telephone.

In one example, the one or more selectable links in the first user interface (e.g., of first user interface displaying unit 3412) comprise moving images associated with the media content. In some examples, the moving images associated with the media content comprise live feeds of the media content. In other examples, the one or more selectable links in the first user interface comprise still images associated with the media content.

In some examples, processing unit 3406 can be further configured to determine whether currently displayed content comprises a moving image or a control menu; in response to a determination that currently displayed content comprises a moving image, select a small size as the first size for the first user interface (e.g., of first user interface displaying unit 3412); and, in response to a determination that currently displayed content comprises a control menu, select a large size, larger than the small size, as the first size for the first user interface (e.g., of first user interface displaying unit 3412). In other examples, processing unit 3406 can be further configured to determine alternative media content for display based on one or more of a user preference, a show popularity, and a status of a live sporting event, and to display a notification comprising the determined alternative media content.

Figure 35:
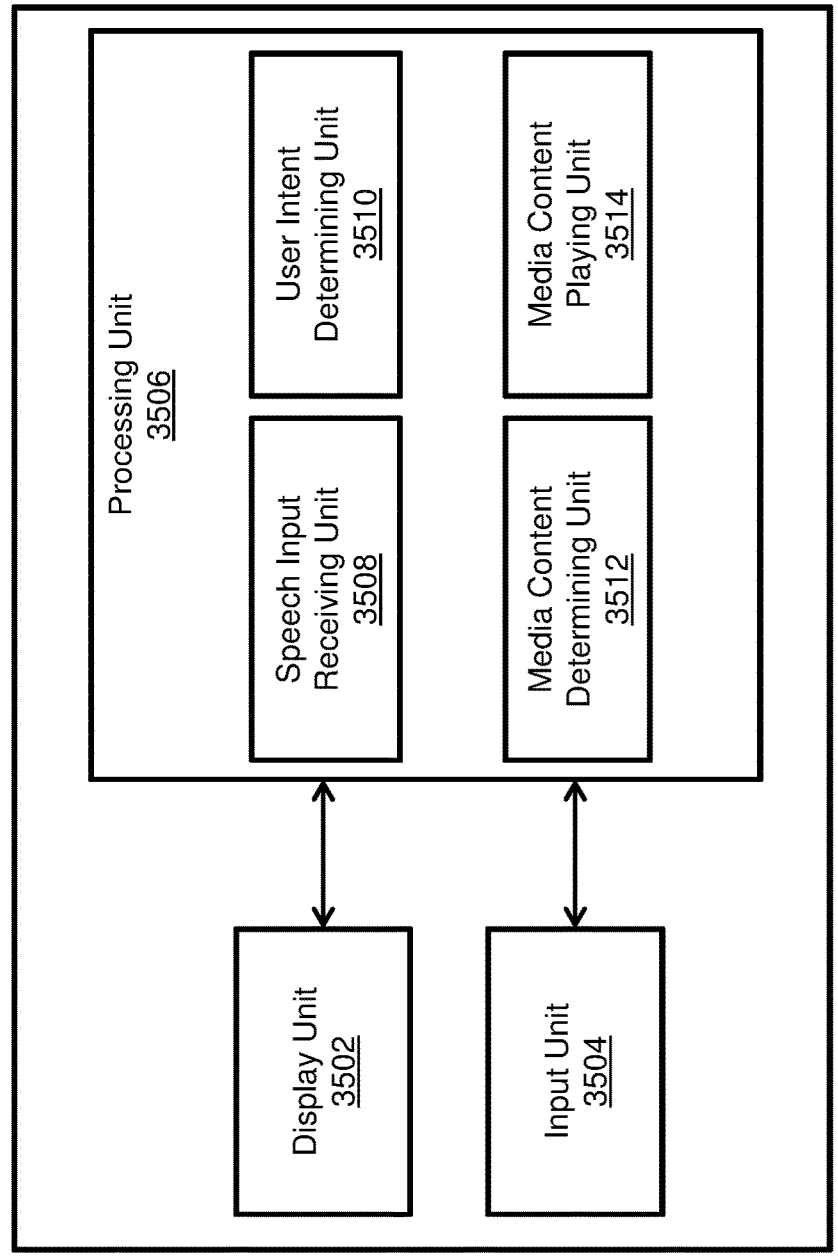
FIG. 35 illustrates a functional block diagram of an electronic device configured to control television interactions using a virtual assistant and multiple user devices according to various examples.

In accordance with some examples, FIG. 35 shows a functional block diagram of an electronic device 3500 configured in accordance with the principles of various described examples to, for example, control television interactions using a virtual assistant and multiple user devices. The functional blocks of the device can be implemented by hardware, software, or a combination of hardware and software to carry out the principles of the various described examples. It is understood by persons of skill in the art that the functional blocks described in FIG. 35 can be combined or separated into sub-blocks to implement the principles of the various described examples. Therefore, the description herein optionally supports any possible combination or separation or further definition of the functional blocks described herein.

As shown in FIG. 35, electronic device 3500 can include a display unit 3502 configured to display media, interfaces, and other content (e.g., display 112, touchscreen 246, or the like). Electronic device 3500 can further include input unit 3504 configured to receive information, such as speech input, tactile input, gesture input, and the like (e.g., a microphone, a receiver, a touchscreen, a button, or the like). Electronic device 3500 can further include processing unit 3506 coupled to display unit 3502 and input unit 3504. In some examples, processing unit 3506 can include a speech input receiving unit 3508, a user intent determining unit 3510, a media content determining unit 3512, and a media content playing unit 3514.

Processing unit 3506 can be configured to receive (e.g., from input unit 3504 using speech input receiving unit 3508) speech input from a user at a first device (e.g., device 3500) having a first display (e.g., display unit 3502 in some examples). Processing unit 3506 can be further configured to determine (e.g., using user intent determining unit 3510) a user intent of the speech input based on content displayed on the first display. Processing unit 3506 can be further configured to determine (e.g., using media content determining unit 3512) media content based on the user intent. Processing unit 3506 can be further configured to play (e.g., using media content playing unit 3514) the media content on a second device associated with a second display (e.g., display unit 3502 in some examples).

In one example, the first device comprises a remote control. In another example, the first device comprises a mobile telephone. In another example, the first device comprises a tablet computer. In some examples, the second device comprises a television set-top box. In other examples, the second display comprises a television.

In some examples, the content displayed on the first display comprises an application interface. In one example, the speech input (e.g., of speech input receiving unit 3508 from input unit 3504) comprises a request to display media associated with the application interface. In one example, the media content comprises the media associated with the application interface. In another example, the application interface comprises a photo album, and the media comprises one or more photos in the photo album. In yet another example, the application interface comprises a list of one or more videos, and the media comprises one of the one or more videos. In still other examples, the application interface comprises a television program listing, and the media comprises a television program in the television program listing.

In some examples, processing unit 3506 can be further configured to determine whether the first device is authorized; wherein the media content is played on the second device in response to a determination that the first device is authorized. Processing unit 3506 can be further configured to identify the user based on the speech input, and determine (e.g., using user intent determining unit 3510) the user intent of the speech input based on data associated with the identified user. Processing unit 3506 can be further configured to determine whether the user is authorized based on the speech input; wherein the media content is played on the second device in response to a determination that the user is an authorized user. In one example, determining whether the user is authorized comprises analyzing the speech input using voice recognition.

In other examples, processing unit 3506 can be further configured to, in response to determining that the user intent comprises a request for information, display information associated with the media content on the first display of the first device. Processing unit 3506 can be further configured to, in response to determining that the user intent comprises a request to play the media content, play the media content on the second device.

In some examples, the speech input comprises a request to play content on the second device, and the media content is played on the second device in response to the request to play content on the second device. Processing unit 3506 can be further configured to determine whether the determined media content should be displayed on the first display or the second display based on a media format, a user preference, or a default setting. In some examples, the media content is displayed on the second display in response to a determination that the determined media content should be displayed on the second display. In other examples, the media content is displayed on the first display in response to a determination that the determined media content should be displayed on the first display.

In other examples, processing unit 3506 can be further configured to determine a proximity of each of two or more devices, including the second device and a third device. In some examples, the media content is played on the second device associated with the second display based on the proximity of the second device relative to the proximity of the third device. In some examples, determining the proximity of each of the two or more devices comprises determining the proximity based on Bluetooth LE.

In some examples, processing unit 3506 can be further configured to display a list of display devices, including the second device associated with the second display, and receive a selection of the second device in the list of display devices. In one example, the media content is displayed on the second display in response to receiving the selection of the second device. Processing unit 3506 can be further configured to determine whether headphones are attached to the first device. Processing unit 3506 can be further configured to, in response to a determination that headphones are attached to the first device, display the media content on the first display. Processing unit 3506 can be further configured to, in response to a determination that headphones are not attached to the first device, display the media content on the second display. In other examples, processing unit 3506 can be further configured to determine alternative media content for display based on one or more of a user preference, a show popularity, and a status of a live sporting event, and to display a notification comprising the determined alternative media content.

Figure 36:
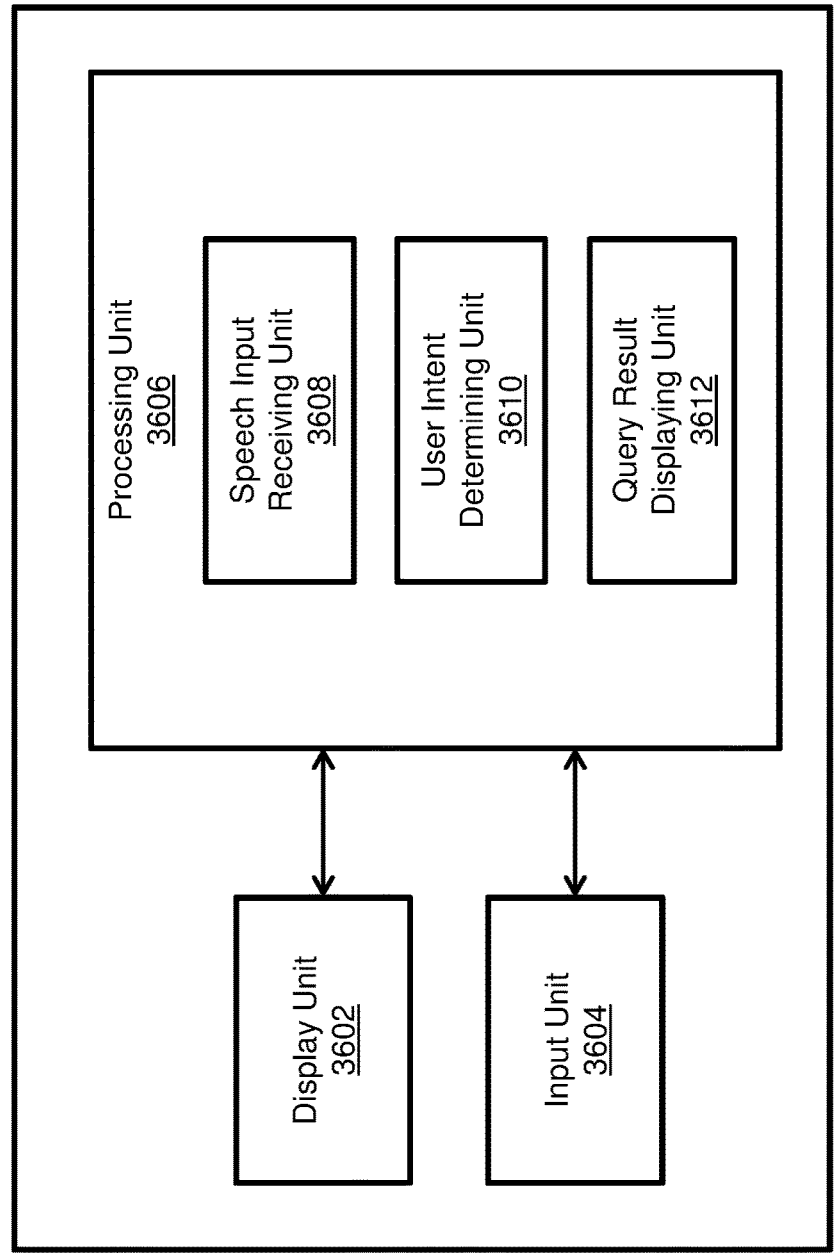
FIG. 36 illustrates a functional block diagram of an electronic device configured to control television interactions using media content shown on a display and a viewing history of media content according to various examples.

In accordance with some examples, FIG. 36 shows a functional block diagram of an electronic device 3600 configured in accordance with the principles of various described examples to, for example, control television interactions using media content shown on a display and a viewing history of media content. The functional blocks of the device can be implemented by hardware, software, or a combination of hardware and software to carry out the principles of the various described examples. It is understood by persons of skill in the art that the functional blocks described in FIG. 36 can be combined or separated into sub-blocks to implement the principles of the various described examples. Therefore, the description herein optionally supports any possible combination or separation or further definition of the functional blocks described herein.

As shown in FIG. 36, electronic device 3600 can include a display unit 3602 configured to display media, interfaces, and other content (e.g., display 112, touchscreen 246, or the like). Electronic device 3600 can further include input unit 3604 configured to receive information, such as speech input, tactile input, gesture input, and the like (e.g., a microphone, a receiver, a touchscreen, a button, or the like). Electronic device 3600 can further include processing unit 3606 coupled to display unit 3602 and input unit 3604. In some examples, processing unit 3606 can include a speech input receiving unit 3608, a user intent determining unit 3610, and a query result displaying unit 3612.

Processing unit 3606 can be configured to receive (e.g., from input unit 3604 using speech input receiving unit 3608) speech input from a user, wherein the speech input comprises a query associated with content shown on a television display (e.g., display unit 3602 in some examples). Processing unit 3606 can be further configured to determine (e.g., using user intent determining unit 3610) a user intent of the query based on one or more of the content shown on the television display and a viewing history of media content. Processing unit 3606 can be further configured to display (e.g., using query result displaying unit 3612) a result of the query based on the determined user intent.

In one example, the speech input is received at a remote control. In another example, the speech input is received at a mobile telephone. In some examples, the result of the query is displayed on the television display. In another example, the content shown on the television display comprises a movie. In yet another example, the content shown on the television display comprises a television show. In still another example, the content shown on the television display comprises a sporting event.

In some examples, the query comprises a request for information about a person associated with the content shown on the television display, and the result (e.g., of query result displaying unit 3612) of the query comprises information about the person. In one example, the result of the query comprises media content associated with the person. In another example, the media content comprises one or more of a movie, a television show, or a sporting event associated with the person. In some examples, the query comprises a request for information about a character in the content shown on the television display, and the result of the query comprises information about the character or information about the actor who plays the character. In one example, the result of the query comprises media content associated with the actor who plays the character. In another example, the media content comprises one or more of a movie, a television show, or a sporting event associated with the actor who plays the character.

In some examples, processing unit 3606 can be further configured to determine the result of the query based on metadata associated with the content shown on the television display or the viewing history of media content. In one example, the metadata comprises one or more of a title, a description, a list of characters, a list of actors, a list of players, a genre, or a display schedule associated with the content shown on the television display or the viewing history of media content. In another example, the content shown on the television display comprises a list of media content, and the query comprises a request to display one of the items in the list. In yet another example, the content shown on the television display further comprises an item in the list of media content having focus, and determining (e.g., using user intent determining unit 3610) the user intent of the query comprises identifying the item having focus. In some examples, processing unit 3606 can be further configured to determine (e.g., using user intent determining unit 3610) the user intent of the query based on menu or search content recently displayed on the television display. In one example, the content shown on the television display comprises a page of listed media, and the recently displayed menu or search content comprises a previous page of listed media. In another example, the content shown on the television display comprises one or more categories of media, and one of the one or more categories of media has focus. In one example, processing unit 3606 can be further configured to determine (e.g., using user intent determining unit 3610) the user intent of the query based on the one of the one or more categories of media having focus. In another example, the categories of media comprise movies, television programs, and music. In other examples, processing unit 3606 can be further configured to determine alternative media content for display based on one or more of a user preference, a show popularity, and a status of a live sporting event, and to display a notification comprising the determined alternative media content.

Figure 37:
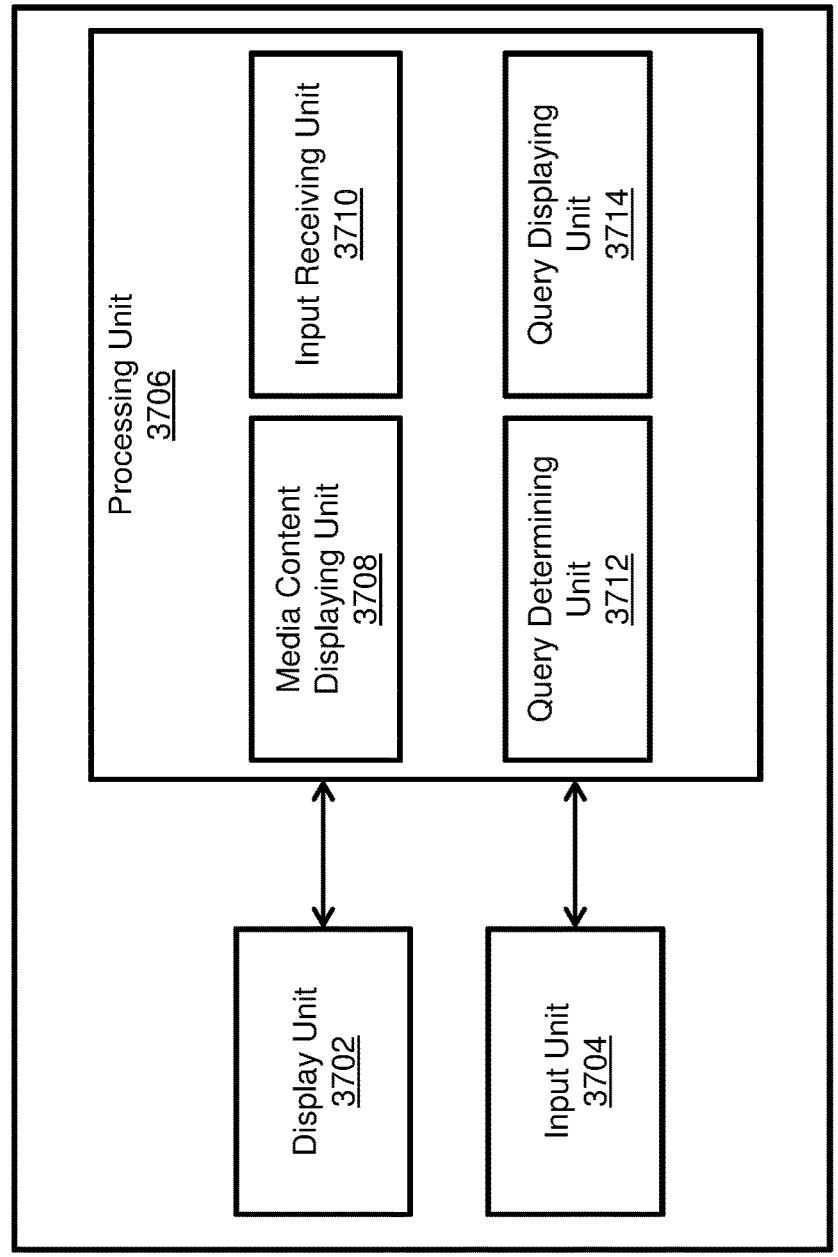
FIG. 37 illustrates a functional block diagram of an electronic device configured to suggest virtual assistant interactions for controlling media content according to various examples.

In accordance with some examples, FIG. 37 shows a functional block diagram of an electronic device 3700 configured in accordance with the principles of various described examples to, for example, suggest virtual assistant interactions for controlling media content. The functional blocks of the device can be implemented by hardware, software, or a combination of hardware and software to carry out the principles of the various described examples. It is understood by persons of skill in the art that the functional blocks described in FIG. 37 can be combined or separated into sub-blocks to implement the principles of the various described examples. Therefore, the description herein optionally supports any possible combination or separation or further definition of the functional blocks described herein.

As shown in FIG. 37, electronic device 3700 can include a display unit 3702 configured to display media, interfaces, and other content (e.g., display 112, touchscreen 246, or the like). Electronic device 3700 can further include input unit 3704 configured to receive information, such as speech input, tactile input, gesture input, and the like (e.g., a microphone, a receiver, a touchscreen, a button, or the like).

Electronic device 3700 can further include processing unit 3706 coupled to display unit 3702 and input unit 3704. In some examples, processing unit 3706 can include a media content displaying unit 3708, an input receiving unit 3710, a query determining unit 3712, and a query displaying unit 3714.

Processing unit 3706 can be configured to display (e.g., using media content displaying unit 3708) media content on a display (e.g., display unit 3702). Processing unit 3706 can be further configured to receive (e.g., from input unit 3704 using input receiving unit 3710) an input from a user. Processing unit 3706 can be further configured to determine (e.g., using query determining unit 3712) one or more virtual assistant queries based on one or more of the media content and a viewing history of media content. Processing unit 3706 can be further configured to display (e.g., using query displaying unit 3714) the one or more virtual assistant queries on the display.

In one example, the input is received from the user on a remote control. In another example, the input is received from the user on a mobile telephone. In some examples, the one or more virtual assistant queries are overlaid on a moving image. In another example, the input comprises a double click of a button. In one example, the media content comprises a movie. In another example, the media content comprises a television show. In yet another example, the media content comprises a sporting event.

In some examples, the one or more virtual assistant queries comprise a query about a person appearing in the media content. In other examples, the one or more virtual assistant queries comprise a query about a character appearing in the media content. In another example, the one or more virtual assistant queries comprise a query for media content associated with a person appearing in the media content. In some examples, the media content or the viewing history of media content comprise an episode of a television show, and the one or more virtual assistant queries comprise a query about another episode of the television show. In another example, the media content or the viewing history of media content comprise an episode of a television show, and the one or more virtual assistant queries comprise a request to set a reminder to watch or record a subsequent episode of the media content. In still another example, the one or more virtual assistant queries comprise a query for descriptive details of the media content. In one example, the descriptive details comprise one or more of a show title, a character list, an actor list, an episode description, a team roster, a team ranking, or a show synopsis.

In some examples, processing unit 3706 can be further configured to receive a selection of one of the one or more virtual assistant queries. Processing unit 3706 can be further configured to display a result of the selected one of the one or more virtual assistant queries. In one example, determining the one or more virtual assistant queries comprises determining the one or more virtual assistant queries based on one or more of a query history, a user preference, or a query popularity. In another example, determining the one or more virtual assistant queries comprises determining the one or more virtual assistant queries based on media content available to the user for viewing. In yet another example, determining the one or more virtual assistant queries comprises determining the one or more virtual assistant queries based on a received notification. In still another example, determining the one or more virtual assistant queries comprises determining the one or more virtual assistant queries based on an active application. In other examples, processing unit 3706 can be further configured to determine alternative media content for display based on one or more of a user preference, a show popularity, and a status of a live sporting event, and to display a notification comprising the determined alternative media content.

Although examples have been fully described with reference to the accompanying drawings, it is to be noted that various changes and modifications will become apparent to those skilled in the art (e.g., modifying any of the systems or processes discussed herein according to the concepts described in relation to any other system or process discussed herein). Such changes and modifications are to be understood as being included within the scope of the various examples as defined by the appended claims.

What is claimed is:

1. An electronic device, comprising:
   one or more processors;
   a memory; and
   one or more programs, wherein the one or more programs are stored in the memory and configured to be executed by the one or more processors, the one or more programs including instructions for:
   receiving a speech input from a user;
   determining a user intent of the speech input based on previously displayed search result content in response to a previous speech input;
   determining media content based on the user intent;
   determining a size corresponding to the determined media content;
   determining a second device based on the determined size; and
   causing the media content to be displayed on a display associated with the second device.

2. The electronic device of claim 1, wherein causing the media content to be displayed on the display associated with the second device comprises:
   determining, from a plurality of devices, the second device based on at least one criterion.

3. The electronic device of claim 2, wherein determining, from a plurality of devices, the second device based on at least one criterion comprises:
   determining a distance between the electronic device and each device of the plurality of devices; and
   determining the second device based on the determined distances.

4. The electronic device of claim 1, the one or more programs including instructions for:
   identifying the user based on the speech input; and
   determining the user intent of the speech input based on data associated with the identified user.

5. The electronic device of claim 4, wherein determining whether the user is an authorized user comprises analyzing the speech input using voice recognition.

6. The electronic device of claim 1, the one or more programs including instructions for:
   in response to determining that the user intent comprises a request for information, providing information at the device in accordance with the user intent; and
   in response to determining that the user intent comprises a request to play the media content, playing the media content on the second device.

7. The electronic device of claim 1, wherein the speech input comprises a request to play content on the second device, and wherein the media content is played on the second device in response to the request to play content on the second device.

8. The electronic device of claim 7, wherein the speech input comprising a request to play content on the second device includes a reference to a location.

9. The electronic device of claim 7, wherein the speech input comprising a request to play content on the second device includes a reference to a device type.

10. The electronic device of claim 1, the one or more programs including instructions for:
 determining whether the determined media content should be displayed on a second display or on the display associated with the second device based on a media format, a user preference, or a default setting;
 wherein the media content is displayed on the display associated with the second device in response to a determination that the determined media content should be displayed on the display associated with the second device; and
 wherein the media content is displayed on the second display in response to a determination that the determined media content should be displayed on the second display.

11. The electronic device of claim 1, the one or more programs including instructions for:
 determining a proximity of each of two or more devices, including the second device and a third device, wherein the media content is played on the display associated with the second device based on the proximity of the second device relative to the proximity of the third device.

12. The electronic device of claim 11, wherein the proximity of each of two or more devices is determined based on frequency.

13. The electronic device of claim 12, wherein the frequency is determined based on at least one time of flight measurement.

14. The electronic device of claim 11, wherein the proximity of each of two or more devices is determined based on at least one sound travel measurement.

15. The electronic device of claim 1, wherein causing the media content to be displayed on the display associated with the second device comprises:
 obtaining a user preference associated with the user; and
 identifying the second device based on the user preference.

16. The electronic device of claim 15, wherein the user preference indicates a preference to display a first content type on a first respective device and a second content type on a second respective device.

17. The electronic device of claim 15, wherein the user preference indicates a preference to display a first content type on a first respective device in accordance with a determination that the speech input includes a first respective query.

18. A computer-implemented method, comprising:
 at an electronic device with one or more processors and memory:
  receiving a speech input from a user;
  determining a user intent of the speech input based on previously displayed search result content in response to a previous speech input;
  determining media content based on the user intent;
  determining a size corresponding to the determined media content;
  determining a second device based on the determined size; and
  causing the media content to be displayed on a display associated with the second device.

19. The method of claim 18, wherein causing the media content to be displayed on the display associated with the second device comprises:
 determining, from a plurality of devices, the second device based on at least one criterion.

20. The method of claim 19, wherein determining, from a plurality of devices, the second device based on at least one criterion comprises:
 determining a distance between the electronic device and each device of the plurality of devices; and
 determining the second device based on the determined distances.

21. The method of claim 18, comprising:
 identifying the user based on the speech input; and
 determining the user intent of the speech input based on data associated with the identified user.

22. The method of claim 21, wherein determining whether the user is an authorized user comprises analyzing the speech input using voice recognition.

23. The method of claim 18, comprising:
 in response to determining that the user intent comprises a request for information, provide information at the device in accordance with the user intent; and
 in response to determining that the user intent comprises a request to play the media content, play the media content on the second device.

24. The method of claim 18, wherein the speech input comprises a request to play content on the second device, and wherein the media content is played on the second device in response to the request to play content on the second device.

25. The method of claim 24, wherein the speech input comprising a request to play content on the second device includes a reference to a location.

26. The method of claim 24, wherein the speech input comprising a request to play content on the second device includes a reference to a device type.

27. The method of claim 18, the one or more programs including instructions for:
 determining whether the determined media content should be displayed on a second display or on the display associated with the second device based on a media format, a user preference, or a default setting;
 wherein the media content is displayed on the display associated with the second device in response to a determination that the determined media content should be displayed on the display associated with the second device; and
 wherein the media content is displayed on the second display in response to a determination that the determined media content should be displayed on the second display.

28. The method of claim 18, comprising:
 determining a proximity of each of two or more devices, including the second device and a third device, wherein the media content is played on the display associated with the second device based on the proximity of the second device relative to the proximity of the third device.

29. The method of claim 28, wherein the proximity of each of two or more devices is determined based on frequency.

30. The method of claim 29, wherein the frequency is determined based on at least one time of flight measurement.

31. The method of claim 28, wherein the proximity of each of two or more devices is determined based on at least one sound travel measurement.

32. The method of claim 18, wherein causing the media content to be displayed on the display associated with the second device comprises:
  obtaining a user preference associated with the user; and
  identifying the second device based on the user preference.

33. The method of claim 32, wherein the user preference indicates a preference to display a first content type on a first respective device and a second content type on a second respective device.

34. The method of claim 32, wherein the user preference indicates a preference to display a first content type on a first respective device in accordance with a determination that the speech input includes a first respective query.

35. A non-transitory computer-readable storage medium storing one or more programs, the one or more programs comprising instructions, which when executed by one or more processors of a first electronic device, cause the first electronic device to:
  receive a speech input from a user;
  determine a user intent of the speech input based on previously displayed search result content in response to a previous speech input;
  determine media content based on the user intent; and
  determine a size corresponding to the determined media content;
  determine a second device based on the determined size; and
  cause the media content to be displayed on a display associated with the second device.

36. The computer readable medium of claim 35, wherein causing the media content to be displayed on the display associated with the second device comprises:
  determining, from a plurality of devices, the second device based on at least one criterion.

37. The computer readable medium of claim 36, wherein determining, from a plurality of devices, the second device based on at least one criterion comprises:
  determining a distance between the electronic device and each device of the plurality of devices; and
  determining the second device based on the determined distances.

38. The computer readable medium of claim 35, comprising:
  identifying the user based on the speech input; and
  determining the user intent of the speech input based on data associated with the identified user.

39. The computer readable medium of claim 38, wherein determining whether the user is an authorized user comprises analyzing the speech input using voice recognition.

40. The computer readable medium of claim 35, comprising:
  in response to determining that the user intent comprises a request for information, provide information at the device in accordance with the user intent; and
  in response to determining that the user intent comprises a request to play the media content, play the media content on the second device.

41. The computer readable medium of claim 35, wherein the speech input comprises a request to play content on the second device, and wherein the media content is played on the second device in response to the request to play content on the second device.

42. The computer readable medium of claim 41, wherein the speech input comprising a request to play content on the second device includes a reference to a location.

43. The computer readable medium of claim 41, wherein the speech input comprising a request to play content on the second device includes a reference to a device type.

44. The computer readable medium of claim 35, the one or more programs including instructions for:
  determining whether the determined media content should be displayed on a second display or on the display associated with the second device based on a media format, a user preference, or a default setting;
  wherein the media content is displayed on the display associated with the second device in response to a determination that the determined media content should be displayed on the display associated with the second device; and
  wherein the media content is displayed on the second display in response to a determination that the determined media content should be displayed on the second display.

45. The computer readable medium of claim 35, comprising:
  determining a proximity of each of two or more devices, including the second device and a third device, wherein the media content is played on the display associated with the second device based on the proximity of the second device relative to the proximity of the third device.

46. The computer readable medium of claim 45, wherein the proximity of each of two or more devices is determined based on frequency.

47. The computer readable medium of claim 46, wherein the frequency is determined based on at least one time of flight measurement.

48. The computer readable medium of claim 45, wherein the proximity of each of two or more devices is determined based on at least one sound travel measurement.

49. The computer readable medium of claim 35, wherein causing the media content to be displayed on the display associated with the second device comprises:
  obtaining a user preference associated with the user; and
  identifying the second device based on the user preference.

50. The computer readable medium of claim 49, wherein the user preference indicates a preference to display a first content type on a first respective device and a second content type on a second respective device.

51. The computer readable medium of claim 49, wherein the user preference indicates a preference to display a first content type on a first respective device in accordance with a determination that the speech input includes a first respective query.

* * * * *